(12) United States Patent
Ensworth et al.

(10) Patent No.: US 9,877,440 B2
(45) Date of Patent: Jan. 30, 2018

(54) ELASTOMERIC EMITTER AND METHODS RELATING TO SAME

(71) Applicant: Rain Bird Corporation, Azusa, CA (US)

(72) Inventors: Mark M. Ensworth, Orange, CA (US); Jae Yung Kim, Los Angeles, CA (US); Mark Richard Edris, Glendora, CA (US); Joseph Nazari, La Crescenta, CA (US)

(73) Assignee: Rain Bird Corporation, Azusa, CA (US)

( * ) Notice: Subject to any disclaimer, the term of this patent is extended or adjusted under 35 U.S.C. 154(b) by 68 days.

(21) Appl. No.: 14/385,564

(22) PCT Filed: Mar. 26, 2013

(86) PCT No.: PCT/US2013/033866
§ 371 (c)(1),
(2) Date: Sep. 16, 2014

(87) PCT Pub. No.: WO2013/148672
PCT Pub. Date: Oct. 3, 2013

(65) Prior Publication Data
US 2015/0041564 A1 Feb. 12, 2015

Related U.S. Application Data

(63) Continuation-in-part of application No. 13/430,249, filed on Mar. 26, 2012, now Pat. No. 9,485,923.

(51) Int. Cl.
*A01G 25/02* (2006.01)

(52) U.S. Cl.
CPC ........... *A01G 25/023* (2013.01); *A01G 25/02* (2013.01); *A01G 25/026* (2013.01); *Y10T 29/49826* (2015.01)

(58) Field of Classification Search
CPC .... A01G 25/02; A01G 25/023; A01G 25/026; A01G 2025/006
(Continued)

(56) References Cited

U.S. PATENT DOCUMENTS

| 2,174,515 A | 10/1939 | Hughes |
| 2,449,731 A | 9/1948 | Therrien |

(Continued)

FOREIGN PATENT DOCUMENTS

| AU | 2004208646 | 3/2006 |
| CA | 1053726 | 5/1979 |

(Continued)

OTHER PUBLICATIONS

State Intellectual Property Office, First Office Action issued in Chinese Application No. 201380016629.9, dated Nov. 4, 2015, 16 pp.

(Continued)

*Primary Examiner* — Alexander Valvis
(74) *Attorney, Agent, or Firm* — Fitch, Even, Tabin & Flannery, LLP

(57) ABSTRACT

An irrigation drip emitter, and methods relating to same, are provided for delivering irrigation water from a supply tube to an emitter outlet at a reduced and relatively constant flow rate. The emitter having at least one movable member for compensating for fluctuations in supply line fluid pressure. In one form the movable member includes a tapered baffle section movable between a first position wherein fluid is allowed to flow over the tapered baffle section and a second position wherein fluid is prevented from flowing over at least a portion of the tapered baffle section and the tapered baffle section effectively lengthening the extent of a pressure reduction passage. In another form, first and second movable members are provided for compensating for such pressure (Continued)

fluctuations. In another form, a plurality of inputs are provided which are movable between first and second positions to compensate for such pressure fluctuations.

13 Claims, 28 Drawing Sheets

(58) Field of Classification Search
USPC .................................................. 239/542, 547
See application file for complete search history.

(56) References Cited

U.S. PATENT DOCUMENTS

| | | | |
|---|---|---|---|
| 2,508,403 A | 5/1950 | Knauss |
| 2,625,429 A | 1/1953 | Coles |
| 2,639,194 A | 5/1953 | Wahlin |
| 2,683,061 A | 7/1954 | Tuttle, Jr. |
| 2,794,321 A | 6/1957 | Warner |
| 2,873,030 A | 2/1959 | Ashton |
| 2,970,923 A | 2/1961 | Sparman |
| 3,004,330 A | 10/1961 | Wilkins |
| 3,155,612 A | 11/1964 | Weber |
| 3,182,916 A | 5/1965 | Schulz |
| 3,199,901 A | 8/1965 | Jeppsson |
| 3,302,450 A | 2/1967 | Wakar |
| 3,323,550 A | 6/1967 | Lee |
| 3,361,359 A | 1/1968 | Chapin |
| 3,420,064 A | 1/1969 | Blass et al. |
| 3,426,544 A | 2/1969 | Curtis |
| 3,434,500 A | 3/1969 | Burrows |
| 3,467,142 A | 9/1969 | Boyle et al. |
| 3,586,291 A | 6/1971 | Malec |
| 3,672,571 A | 6/1972 | Goodricke |
| 3,693,888 A | 9/1972 | Rondas et al. |
| 3,697,002 A | 10/1972 | Parkison |
| 3,698,195 A | 10/1972 | Chapin |
| 3,719,327 A | 3/1973 | McMahan |
| 3,729,142 A | 4/1973 | Rangel-Garza et al. |
| 3,753,527 A | 8/1973 | Galbraith et al. |
| 3,777,980 A | 12/1973 | Allport |
| 3,777,987 A | 12/1973 | Allport |
| 3,779,468 A | 12/1973 | Spencer |
| 3,780,946 A | 12/1973 | Smith et al. |
| 3,791,587 A | 2/1974 | Drori |
| 3,797,741 A | 3/1974 | Spencer |
| 3,804,334 A | 4/1974 | Curry |
| 3,807,430 A | 4/1974 | Keller |
| 3,814,377 A | 6/1974 | Todd |
| 3,815,636 A | 6/1974 | Menzel |
| RE28,095 E | 7/1974 | Chapin |
| 3,851,896 A | 12/1974 | Olson |
| 3,856,333 A | 12/1974 | Cox |
| 3,863,845 A | 2/1975 | Bumpstead |
| 3,866,833 A | 2/1975 | Kojimoto |
| 3,870,236 A | 3/1975 | Sahagun-Barragan |
| 3,873,030 A | 3/1975 | Barragan |
| 3,874,598 A | 4/1975 | Havens |
| 3,882,892 A | 5/1975 | Menzel |
| 3,885,743 A | 5/1975 | Wake |
| 3,895,085 A | 7/1975 | Suzuki et al. |
| 3,896,999 A | 7/1975 | Barragan |
| 3,903,929 A | 9/1975 | Mock |
| 3,940,066 A | 2/1976 | Hunter |
| 3,948,285 A | 4/1976 | Flynn |
| 3,954,223 A | 5/1976 | Wichman et al. |
| 3,970,251 A | 7/1976 | Harmony |
| 3,973,732 A | 8/1976 | Diggs |
| 3,981,452 A | 9/1976 | Eckstein |
| 3,993,248 A | 11/1976 | Harmony |
| 3,995,436 A | 12/1976 | Diggs |
| 3,998,244 A | 12/1976 | Bentley |
| 3,998,391 A | 12/1976 | Lemelshtrich |
| 3,998,427 A | 12/1976 | Bentley |
| 4,008,853 A | 2/1977 | Tregillus |
| 4,022,384 A | 5/1977 | Hoyle |
| 4,036,435 A | 7/1977 | Pecaro |
| 4,037,791 A | 7/1977 | Mullett et al. |
| 4,047,995 A | 9/1977 | Leal-Diaz |
| 4,058,257 A | 11/1977 | Spencer |
| 4,059,228 A | 11/1977 | Werner |
| 4,077,570 A | 3/1978 | Harmony |
| 4,077,571 A | 3/1978 | Harmony |
| 4,084,749 A | 4/1978 | Drori |
| 4,092,002 A | 5/1978 | Grosse |
| 4,095,750 A | 6/1978 | Gilead |
| 4,105,162 A | 8/1978 | Drori |
| 4,121,771 A | 10/1978 | Hendrickson |
| 4,143,820 A | 3/1979 | Bright, Sr. |
| 4,160,323 A | 7/1979 | Tracy |
| 4,161,291 A | 7/1979 | Bentley |
| 4,177,946 A | 12/1979 | Sahagun-Barragan |
| 4,177,947 A | 12/1979 | Menzel |
| 4,196,853 A | 4/1980 | Delmer |
| 4,209,133 A | 6/1980 | Mehoudar |
| 4,210,287 A | 7/1980 | Mehoudar |
| 4,223,838 A | 9/1980 | Maria-Vittorio-Torrisi |
| 4,225,307 A | 9/1980 | Magera |
| 4,226,368 A | 10/1980 | Hunter |
| 4,235,380 A | 11/1980 | Delmer |
| 4,247,051 A | 1/1981 | Allport |
| 4,250,915 A | 2/1981 | Rikuta |
| 4,273,286 A | 6/1981 | Menzel |
| 4,274,597 A | 6/1981 | Dobos |
| 4,281,798 A | 8/1981 | Lemelstrich |
| 4,307,841 A | 12/1981 | Mehoudar |
| 4,331,293 A | 5/1982 | Rangel-Garza |
| 4,344,576 A | 8/1982 | Smith |
| 4,354,639 A | 10/1982 | Delmer |
| 4,366,926 A | 1/1983 | Mehoudar |
| 4,369,923 A | 1/1983 | Bron |
| 4,384,680 A | 5/1983 | Mehoudar |
| 4,385,727 A | 5/1983 | Spencer |
| 4,385,757 A | 5/1983 | Muller |
| 4,392,616 A | 7/1983 | Olson |
| 4,413,786 A | 11/1983 | Mehoudar |
| 4,413,787 A | 11/1983 | Gilead |
| 4,424,936 A | 1/1984 | Marc |
| 4,430,020 A | 2/1984 | Robbins |
| 4,460,129 A | 7/1984 | Olson |
| 4,473,191 A | 9/1984 | Chapin |
| 4,473,525 A | 9/1984 | Drori |
| 4,502,631 A | 3/1985 | Christen |
| 4,508,140 A | 4/1985 | Harrison |
| 4,513,777 A | 4/1985 | Wright |
| 4,519,546 A | 5/1985 | Gorney |
| 4,522,339 A | 6/1985 | Costa |
| 4,533,083 A | 8/1985 | Tucker |
| 4,534,515 A | 8/1985 | Chapin |
| 4,545,784 A | 10/1985 | Sanderson |
| 4,572,756 A | 2/1986 | Chapin |
| 4,573,640 A | 3/1986 | Mehoudar |
| 4,593,857 A | 6/1986 | Raz |
| 4,613,080 A | 9/1986 | Benson |
| 4,626,130 A | 12/1986 | Chapin |
| 4,627,903 A | 12/1986 | Chapman |
| 4,642,152 A | 2/1987 | Chapin |
| 4,653,695 A | 3/1987 | Eckstein |
| 4,687,143 A | 8/1987 | Gorney |
| 4,702,787 A | 10/1987 | Ruskin |
| 4,718,608 A | 1/1988 | Mehoudar |
| 4,722,481 A | 2/1988 | Lemkin |
| 4,722,759 A | 2/1988 | Roberts |
| 4,726,520 A | 2/1988 | Brown |
| 4,726,527 A | 2/1988 | Mendenhall |
| 4,728,042 A | 3/1988 | Gorney |
| 4,735,363 A | 4/1988 | Shfaram |
| 4,749,130 A | 6/1988 | Utzinger |
| 4,753,394 A | 6/1988 | Goodman |
| 4,756,339 A | 7/1988 | Buluschek |
| 4,765,541 A | 8/1988 | Mangels |
| 4,775,046 A | 10/1988 | Gramarossa |
| 4,781,217 A | 11/1988 | Rosenberg |
| 4,789,005 A | 12/1988 | Griffiths |
| 4,796,660 A | 1/1989 | Bron |

(56) References Cited

U.S. PATENT DOCUMENTS

| | | | |
|---|---|---|---|
| 4,807,668 | A | 2/1989 | Roberts |
| 4,817,875 | A | 4/1989 | Karmeli |
| 4,824,019 | A | 4/1989 | Lew |
| 4,824,025 | A | 4/1989 | Miller |
| 4,850,531 | A | 7/1989 | Littleton |
| 4,856,552 | A | 8/1989 | Hiemstra |
| 4,859,264 | A | 8/1989 | Buluschek |
| 4,874,132 | A | 10/1989 | Gilead |
| 4,880,167 | A | 11/1989 | Langa et al. |
| 4,900,437 | A | 2/1990 | Savall |
| 4,909,411 | A | 3/1990 | Uchida |
| 4,948,295 | A | 8/1990 | Pramsoler |
| 4,984,739 | A | 1/1991 | Allport |
| 5,022,940 | A | 6/1991 | Mehoudar |
| 5,031,837 | A | 7/1991 | Hanish |
| 5,040,770 | A | 8/1991 | Rajster |
| 5,052,625 | A | 10/1991 | Ruskin |
| 5,096,206 | A | 3/1992 | Andre |
| 5,111,995 | A | 5/1992 | Dumitrascu et al. |
| 5,111,996 | A * | 5/1992 | Eckstein ............... A01G 25/023 137/110 |
| 5,116,414 | A | 5/1992 | Burton |
| 5,118,042 | A | 6/1992 | Delmer et al. |
| 5,122,044 | A | 6/1992 | Mehoudar |
| 5,123,984 | A | 6/1992 | Allport |
| 5,137,216 | A | 8/1992 | Hanish |
| 5,141,360 | A | 8/1992 | Zeman |
| 5,163,622 | A | 11/1992 | Cohen |
| 5,181,952 | A | 1/1993 | Burton |
| 5,183,208 | A | 2/1993 | Cohen |
| 5,192,027 | A | 3/1993 | Delmer |
| 5,200,132 | A | 4/1993 | Shfaram |
| 5,203,503 | A | 4/1993 | Cohen |
| 5,207,386 | A | 5/1993 | Mehoudar |
| 5,232,159 | A | 8/1993 | Abbate, Sr. |
| 5,232,160 | A | 8/1993 | Hendrickson |
| 5,236,130 | A | 8/1993 | Hadar |
| 5,246,171 | A | 9/1993 | Roberts |
| 5,252,162 | A | 10/1993 | Delmer |
| 5,271,786 | A | 12/1993 | Gorney |
| 5,279,462 | A | 1/1994 | Mehoudar |
| 5,282,578 | A | 2/1994 | DeFrank |
| 5,282,916 | A | 2/1994 | Bloom |
| 5,283,916 | A | 2/1994 | Haro |
| 5,294,058 | A | 3/1994 | Einav |
| 5,310,438 | A | 5/1994 | Ruskin |
| 5,314,116 | A | 5/1994 | Krauth |
| 5,316,220 | A | 5/1994 | Dinur |
| 5,318,657 | A | 6/1994 | Roberts |
| 5,324,371 | A | 6/1994 | Mehoudar |
| 5,324,379 | A | 6/1994 | Eckstein |
| 5,327,941 | A | 7/1994 | Bitsakis |
| 5,330,107 | A | 7/1994 | Karathanos |
| 5,332,160 | A | 7/1994 | Ruskin |
| 5,333,793 | A | 8/1994 | DeFrank |
| 5,337,597 | A | 8/1994 | Peake |
| 5,353,993 | A | 10/1994 | Rosenberg |
| 5,364,032 | A | 11/1994 | DeFrank |
| 5,399,160 | A | 3/1995 | Dunberger |
| 5,400,973 | A | 3/1995 | Cohen |
| 5,413,282 | A | 5/1995 | Boswell |
| 5,441,203 | A | 8/1995 | Swan |
| 5,442,001 | A | 8/1995 | Jones |
| 5,443,212 | A | 8/1995 | Dinur |
| 5,449,250 | A | 9/1995 | Burton |
| 5,522,551 | A | 6/1996 | DeFrank |
| 5,531,381 | A | 7/1996 | Ruttenberg |
| 5,535,778 | A | 7/1996 | Zakai |
| 5,584,952 | A | 12/1996 | Rubenstein |
| 5,586,727 | A | 12/1996 | Shekalim |
| 5,591,293 | A | 1/1997 | Miller |
| 5,601,381 | A | 2/1997 | Hadar |
| 5,609,303 | A | 3/1997 | Cohen |
| 5,615,833 | A | 4/1997 | Robillard et al. |
| 5,615,838 | A | 4/1997 | Eckstein et al. |
| 5,620,143 | A | 4/1997 | Delmer |
| 5,628,462 | A | 5/1997 | Miller |
| 5,634,594 | A | 6/1997 | Cohen |
| 5,636,797 | A | 6/1997 | Cohen |
| 5,641,113 | A | 6/1997 | Somaki |
| 5,673,852 | A | 10/1997 | Roberts |
| 5,676,897 | A | 10/1997 | Dermitzakis |
| 5,695,127 | A | 12/1997 | Delmer |
| 5,722,601 | A | 3/1998 | DeFrank |
| 5,732,887 | A | 3/1998 | Roberts |
| 5,744,423 | A | 4/1998 | Voris |
| 5,744,779 | A | 4/1998 | Buluschek |
| 5,785,785 | A | 7/1998 | Delmer |
| 5,820,028 | A | 10/1998 | Dinur |
| 5,820,029 | A | 10/1998 | Marans |
| 5,829,685 | A * | 11/1998 | Cohen ............... A01G 25/023 239/533.1 |
| 5,829,686 | A | 11/1998 | Cohen |
| 5,855,324 | A | 1/1999 | DeFrank et al. |
| 5,865,377 | A | 2/1999 | DeFrank |
| 5,871,325 | A | 2/1999 | Schmidt |
| 5,875,815 | A | 3/1999 | Ungerecht |
| 5,898,019 | A | 4/1999 | VanVoris |
| 5,944,260 | A | 8/1999 | Wang |
| 5,957,391 | A | 9/1999 | DeFrank et al. |
| 5,972,375 | A | 10/1999 | Truter |
| 6,015,102 | A | 1/2000 | Daigle |
| 6,026,850 | A | 2/2000 | Newton |
| 6,027,048 | A | 2/2000 | Mehoudar |
| 6,039,270 | A | 3/2000 | Dermitzakis |
| 6,062,245 | A | 5/2000 | Berglind |
| 6,095,185 | A | 8/2000 | Rosenberg |
| 6,109,296 | A | 8/2000 | Austin |
| 6,116,523 | A | 9/2000 | Cabahug |
| 6,120,634 | A | 9/2000 | Harrold |
| 6,179,949 | B1 | 1/2001 | Buluschek |
| 6,180,162 | B1 | 1/2001 | Shigeru |
| 6,206,305 | B1 | 3/2001 | Mehoudar |
| 6,213,408 | B1 | 4/2001 | Shekalim |
| 6,238,081 | B1 | 5/2001 | Sand |
| 6,250,571 | B1 | 6/2001 | Cohen |
| 6,280,554 | B1 | 8/2001 | Lambert et al. |
| 6,302,338 | B1 | 10/2001 | Cohen |
| 6,308,902 | B1 | 10/2001 | Huntley |
| 6,334,958 | B1 | 1/2002 | Ruskin |
| 6,343,616 | B1 | 2/2002 | Houtchens |
| 6,371,390 | B1 | 4/2002 | Cohen |
| 6,382,530 | B1 | 5/2002 | Perkins |
| 6,394,412 | B2 | 5/2002 | Zakai et al. |
| 6,403,013 | B1 | 6/2002 | Man |
| 6,449,872 | B1 | 9/2002 | Olkku |
| 6,460,786 | B1 | 10/2002 | Roberts |
| 6,461,468 | B1 | 10/2002 | Cohen |
| 6,461,486 | B2 | 10/2002 | Lorincz et al. |
| 6,464,152 | B1 | 10/2002 | Bolinis |
| 6,499,872 | B2 | 12/2002 | Sand |
| 6,513,734 | B2 | 2/2003 | Bertolotti |
| 6,543,509 | B1 | 4/2003 | Harrold |
| 6,557,819 | B2 | 5/2003 | Austin |
| 6,561,443 | B2 | 5/2003 | Delmer |
| 6,568,607 | B2 | 5/2003 | Boswell et al. |
| 6,581,262 | B1 | 6/2003 | Myers |
| 6,581,854 | B2 | 6/2003 | Eckstein et al. |
| 6,581,902 | B2 | 6/2003 | Michau |
| 6,620,278 | B1 | 9/2003 | Harrold |
| 6,622,427 | B2 | 9/2003 | Breitner |
| 6,622,946 | B2 | 9/2003 | Held |
| 6,691,739 | B2 | 2/2004 | Rosenberg |
| 6,736,337 | B2 | 5/2004 | Vildibill et al. |
| 6,750,760 | B2 | 6/2004 | Albritton |
| 6,764,029 | B2 | 7/2004 | Rosenberg |
| 6,817,548 | B2 * | 11/2004 | Krauth ............... A01G 25/023 239/533.1 |
| 6,821,928 | B2 | 11/2004 | Ruskin |
| 6,827,298 | B2 | 12/2004 | Sacks |
| 6,830,203 | B2 | 12/2004 | Neyestani |
| 6,875,491 | B2 | 4/2005 | Miyamoto |
| 6,886,761 | B2 | 5/2005 | Cohen |
| 6,894,250 | B2 | 5/2005 | Kertscher |

(56) References Cited

U.S. PATENT DOCUMENTS

| | | |
|---|---|---|
| 6,896,758 B1 | 5/2005 | Giuffre |
| 6,920,907 B2 | 7/2005 | Harrold |
| 6,933,337 B2 | 8/2005 | Lang |
| 6,936,126 B2 | 8/2005 | DeFrank |
| 6,945,476 B2 | 9/2005 | Giuffre |
| 6,996,932 B2 | 2/2006 | Kruer |
| 6,997,402 B2 | 2/2006 | Kruer |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,530,382 B2 | 5/2009 | Kertscher et al. |
| 7,648,085 B2 | 1/2010 | Mavrakis |
| 7,681,805 B2 | 3/2010 | Belford |
| 7,681,810 B2 | 3/2010 | Keren |
| 7,695,587 B2 | 4/2010 | Kertscher |
| 7,735,758 B2 * | 6/2010 | Cohen ................ A01G 25/023 239/533.1 |
| 7,775,237 B2 | 8/2010 | Keren |
| 7,802,592 B2 | 9/2010 | McCarty |
| 7,887,664 B1 | 2/2011 | Mata |
| 7,954,732 B2 | 6/2011 | Shekalim |
| 7,988,076 B2 | 8/2011 | Mamo |
| 8,002,496 B2 | 8/2011 | Giuffre |
| 8,033,300 B2 | 10/2011 | McCarty |
| 8,079,385 B2 | 12/2011 | Hatton |
| 8,091,800 B2 | 1/2012 | Retter |
| 8,096,491 B2 | 1/2012 | Lutzki |
| 8,141,589 B2 | 3/2012 | Socolsky |
| 8,267,115 B2 | 9/2012 | Giuffre' |
| 8,286,667 B2 | 10/2012 | Ruskin |
| 8,302,887 B2 | 11/2012 | Park |
| 8,317,111 B2 | 11/2012 | Cohen |
| 8,381,437 B2 | 2/2013 | Ciudaj |
| 8,439,282 B2 | 5/2013 | Allen |
| 8,454,786 B2 | 6/2013 | Guichard |
| 8,469,294 B2 | 6/2013 | Mata |
| 8,475,617 B2 | 7/2013 | Kertscher |
| 8,511,586 B2 | 8/2013 | Einav |
| 8,628,032 B2 | 1/2014 | Feith |
| 8,663,525 B2 | 3/2014 | Mamo |
| 8,689,484 B2 | 4/2014 | Ruskin |
| 8,714,205 B2 | 5/2014 | Loebinger |
| 8,870,098 B2 | 10/2014 | Lutzki |
| 8,882,004 B2 | 11/2014 | Gorney |
| 8,998,112 B2 | 4/2015 | Cohen |
| 8,998,113 B2 | 4/2015 | Keren |
| 9,022,059 B2 | 5/2015 | Cohen |
| 9,022,764 B2 | 5/2015 | Wisler |
| 9,027,856 B2 | 5/2015 | DeFrank et al. |
| 9,192,108 B2 | 11/2015 | Kertscher |
| 9,258,950 B2 | 2/2016 | Kidachi |
| 9,485,923 B2 | 11/2016 | Ensworth |
| 2002/0064935 A1 | 5/2002 | Honda |
| 2002/0070297 A1 | 6/2002 | Bolinis |
| 2002/0074434 A1 | 6/2002 | Delmer |
| 2002/0088877 A1 | 7/2002 | Bertolotti |
| 2002/0104902 A1 | 8/2002 | Eckstein et al. |
| 2002/0104903 A1 | 8/2002 | Eckstein et al. |
| 2002/0113147 A1 | 8/2002 | Huntley |
| 2003/0029937 A1 | 2/2003 | Dermitzakis |
| 2003/0042335 A1 | 3/2003 | Krauth |
| 2003/0050372 A1 | 3/2003 | Stanhope |
| 2003/0057301 A1 | 3/2003 | Cohen |
| 2003/0089409 A1 | 5/2003 | Morimoto |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber et al. |
| 2004/0018263 A1 | 1/2004 | Hashimshony |
| 2004/0164185 A1 | 8/2004 | Giuffre |
| 2005/0029231 A1 | 2/2005 | Kertscher |
| 2005/0077396 A1 | 4/2005 | Rabinowitz |
| 2005/0103409 A1 | 5/2005 | Weber |
| 2005/0133613 A1 | 6/2005 | Mayer |
| 2005/0224607 A1 | 10/2005 | Dinur et al. |
| 2005/0224962 A1 | 10/2005 | Akamatsu |
| 2005/0258278 A1 | 11/2005 | Cohen |
| 2005/0258279 A1 | 11/2005 | Harrold |
| 2005/0279866 A1 | 12/2005 | Belford |
| 2005/0284966 A1 | 12/2005 | DeFrank |
| 2006/0032949 A1 | 2/2006 | Lo |
| 2006/0043219 A1 | 3/2006 | Raanan |
| 2006/0144965 A1 | 7/2006 | Keren |
| 2006/0163388 A1 | 7/2006 | Mari |
| 2006/0169805 A1 | 8/2006 | Dabir |
| 2006/0186228 A1 | 8/2006 | Belford et al. |
| 2006/0202381 A1 | 9/2006 | Bach et al. |
| 2006/0237561 A1 | 10/2006 | Park et al. |
| 2006/0255186 A1 | 11/2006 | Ruskin |
| 2007/0095950 A1 | 5/2007 | Kim |
| 2007/0108318 A1 | 5/2007 | Mamo |
| 2007/0138323 A1 | 6/2007 | Lee |
| 2007/0187031 A1 | 8/2007 | Kertscher |
| 2007/0194149 A1 | 8/2007 | Mavrakis |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0237374 A1 | 10/2008 | Belford |
| 2008/0257991 A1 | 10/2008 | Einav et al. |
| 2009/0020634 A1 | 1/2009 | Schweitzer |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney et al. |
| 2009/0261183 A1 | 10/2009 | Mavrakis |
| 2009/0266919 A1 | 10/2009 | Mavrakis |
| 2009/0302127 A1 | 12/2009 | Lutzki |
| 2009/0314377 A1 | 12/2009 | Giuffre |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155508 A1 | 6/2010 | Keren |
| 2010/0163651 A1 | 7/2010 | Feith |
| 2010/0175408 A1 | 7/2010 | Korda |
| 2010/0219265 A1 | 9/2010 | Feld |
| 2010/0237170 A1 | 9/2010 | Rosenberg |
| 2010/0244315 A1 | 9/2010 | Mamo |
| 2010/0252126 A1 | 10/2010 | Roes |
| 2010/0282873 A1 | 11/2010 | Mattlin |
| 2011/0186652 A1 | 8/2011 | Cohen |
| 2012/0012678 A1 | 1/2012 | Gregory |
| 2012/0012682 A1 | 1/2012 | Einav |
| 2012/0074345 A1 | 3/2012 | Hatton |
| 2012/0104648 A1 | 5/2012 | Yiflach |
| 2013/0181066 A1 | 7/2013 | Dermitzakis |
| 2013/0248616 A1 | 9/2013 | Ensworth |
| 2013/0248622 A1 | 9/2013 | Kim |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0263758 A1 | 9/2014 | Turk |
| 2015/0014446 A1 | 1/2015 | Cohen |
| 2015/0041563 A1 | 2/2015 | Ensworth |
| 2015/0041564 A1 | 2/2015 | Ensworth |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0201568 A1 | 7/2015 | Einav |
| 2015/0296723 A1 | 10/2015 | Jain |
| 2015/0351333 A1 | 12/2015 | Eberle |

(56) References Cited

U.S. PATENT DOCUMENTS

| | | | |
|---|---|---|---|
| 2016/0057947 A1 | 3/2016 | Ensworth |
| 2016/0075070 A1 | 3/2016 | Verelis |
| 2016/0076965 A1 | 3/2016 | Edris |
| 2016/0088806 A1 | 3/2016 | Haub |
| 2016/0198643 A1 | 7/2016 | Cohen |
| 2016/0219802 A1 | 8/2016 | Ensworth |
| 2016/0219803 A1 | 8/2016 | Keren |
| 2016/0286741 A1 | 10/2016 | Kidachi |
| 2016/0286743 A1 | 10/2016 | Einav |
| 2016/0309669 A1 | 10/2016 | Kidachi |
| 2016/0330917 A1 | 11/2016 | Kidachi |
| 2017/0035005 A1 | 2/2017 | Kidachi |
| 2017/0035006 A1 | 2/2017 | Kim |
| 2017/0112078 A1 | 4/2017 | Ensworth |

FOREIGN PATENT DOCUMENTS

| | | |
|---|---|---|
| CN | 102057823 | 5/2011 |
| CN | 201821716 | 5/2011 |
| CN | 201871438 | 6/2011 |
| DE | 112706 | 5/1975 |
| EP | 0444425 A1 | 9/1991 |
| EP | 0480632 A2 | 4/1992 |
| EP | 0549515 A1 | 6/1993 |
| EP | 636309 A1 | 2/1995 |
| EP | 0709020 A1 | 5/1996 |
| EP | 0730822 A2 | 9/1996 |
| EP | 493299 | 5/1997 |
| FR | 2366790 | 5/1978 |
| GB | 1498545 | 1/1978 |
| GB | 2057960 A | 4/1991 |
| IL | 53463 A | 3/1983 |
| IL | 97564 A | 7/1996 |
| IT | 1255120 | 10/1995 |
| JP | 2000228417 | 8/2000 |
| RU | 2415565 | 4/2011 |
| WO | 9205689 A1 | 4/1992 |
| WO | 9221228 A1 | 12/1992 |
| WO | 9427728 A1 | 12/1994 |
| WO | 9614939 | 5/1996 |
| WO | 9810635 | 3/1998 |
| WO | 9810635 A1 | 3/1998 |
| WO | 9902273 A1 | 1/1999 |
| WO | 9918771 A1 | 4/1999 |
| WO | 9955141 A1 | 11/1999 |
| WO | 0001219 A1 | 1/2000 |
| WO | 0010378 A1 | 3/2000 |
| WO | 0030760 | 6/2000 |
| WO | 0136106 A1 | 5/2001 |
| WO | 0204130 A1 | 1/2002 |
| WO | 2002015670 | 2/2002 |
| WO | 03045577 A1 | 6/2003 |
| WO | 03066228 A1 | 8/2003 |
| WO | 2004028778 A1 | 4/2004 |
| WO | 2006030419 | 3/2006 |
| WO | 2006038246 | 4/2006 |
| WO | 2007046105 | 4/2007 |
| WO | 2007068523 A1 | 6/2007 |
| WO | 2010048063 | 4/2010 |
| WO | 2011092557 | 8/2011 |
| WO | 2013148672 | 10/2013 |
| WO | 2013155173 A1 | 10/2013 |
| WO | 2013192321 | 12/2013 |
| WO | 2014064452 | 5/2014 |
| WO | 2015023624 | 2/2015 |
| WO | 2015098412 | 7/2015 |

OTHER PUBLICATIONS

European Patent Office, Extended European Search Report issued in Application No. 13770084.5, dated Feb. 11, 2016, 7 pp.
Arduini, I. et al., "Influence of Copper on Root http://syncids.com/IDSgraphics/OtherDocumentGuessBackgroundOrange.gifGrowth and Morphology of Pinus Pinea L. and Pinus Pinaster Ait. Seedlings", Tree Physiology, 15, 1995, pp. 411-415.
Bernard, H., et al., Assessment of herbicide leaching risk in two tropical soils of Reunion Island (France), J Environ Qual 34:534-543, (2005).
Borkow, G., et al., "A Novel Anti-Influenza Copper Oxide Containing Respiratory Face Mask", PLoS ONE, www.plosone.org, Jun. 2010, vol. 5, Issue 6, pp. 1-8.
Borkow, G., et al., "Copper as a Biocidal Tool", Current Medicinal Chemistry, 2005, 12, 2163-2175.
Borkow, G., et al., "Endowing Textiles with Permanent Potent Biocidal Properties by Impregnating Them with Copper Oxide", ResearchGate, Jan. 2006.
Borkow, G., et al., "Putting copper into action:copperimpregnated products with potent biocidal activities", FASEB J, 18:1728-1730, (2004).
Eason, Audra, et al., "Integrated modeling environment for state-wide assessment of groundwater vulnerability from pesticide use in agriculture", Pest Manag Sci, 60:739-745 (online:2004).
Mastin, BJ, et al., "Toxicity and bioavailability of copper herbicides (Clearigate, Cutrine-Plus, and copper sulfate) to freshwater animals", Arch Environ Contam Toxicol, 39:445-451, (2000).
Murray-Gulde, CL, et al., "Algicidal effectiveness of Clearigate, Cutrine-Plus, and copper sulfate and margins of safety associated with their use", Arch Environ Contam Toxicol 42:19-27, (2002).
Netafim Ltd., Inhibition of root penetration in subsurface driplines by impregnating the drippers with copper oxide particles.
Spera, G., et al., Subsurface drip irrigation with micro-encapsulated trifluralin. Trifluralin residues in soils and cultivations. Commun Agric Appl Biol Sci 71:161-170, (2006).
USPTO; U.S. Appl. No. 14/475,435; Office Action dated Jan. 26, 2017.
European Patent Office, Extended European Search Report for European Application No. 13770084.5 dated Feb. 11, 2016, 7 pages.
Rain Bird Corporation, Agriculture Irrigation Equipment 1981 Catalog, 1979, 3 pages.
Rain Bird Corporation, Landscape Irrigation Products 1993-1994 Catalog, Feb. 1993, 5 pages.
Rain Bird Corporation, Landscape Irrigation Products 2001-2001 Catalog, Mar. 2001, 9 pages.
Rain Bird Corporation, Landscape Irrigation Products 2005-2006 Catalog, Jun. 2004, 13 pages.
Rain Bird Corporation, Nursery Equipment Catalog 1986/1987, 1986, 3 pages.
Rain Bird Corporation, Turf Irrigation Equipment 1982 Catalog, 1982, 4 pages.
Rain Bird Corporation, Turf Irrigation Equipment 1983 Catalog, 1983, 4 pages.
Rain Bird Corporation, Turf Irrigation Equipment 1985 Catalog, 1985, 3 pages.
Rain Bird Corporation, Turf Irrigation Equipment 1987 Catalog, 1987, 6 pages.
USPTO; U.S. Appl. No. 13/839,726; Notice of Allowance dated Dec. 1, 2016; 5 pages.
USPTO; U.S. Appl. No. 12/495,178; Office Action dated Apr. 18, 2014; 12 pages.
USPTO; U.S. Appl. No. 12/495,178; Office Action dated Mar. 11, 2015; 6 pages.
USPTO; U.S. Appl. No. 12/495,178; Office Action dated Nov. 18, 2014; 8 pages.
USPTO; U.S. Appl. No. 12/495,178; Office Action dated Oct. 6, 2015; 8 pages.
USPTO; U.S. Appl. No. 12/495,193; Notice of Allowance dated Oct. 14, 2016; 7 pages.
USPTO; U.S. Appl. No. 12/495,193; Office Action dated Apr. 18, 2014; 23 pages.
USPTO; U.S. Appl. No. 12/495,193; Office Action dated Jan. 15, 2015; 11 pages.
USPTO; U.S. Appl. No. 12/495,193; Office Action dated Oct. 1, 2015; 9 pages.
USPTO; U.S. Appl. No. 13/430,249; Notice of Allowance dated Apr. 14, 2016; 7 pages.

(56) References Cited

OTHER PUBLICATIONS

USPTO; U.S. Appl. No. 13/430,249; Notice of Allowance dated Sep. 19, 2016; 6 pages.
USPTO; U.S. Appl. No. 13/430,249; Office Action dated Mar. 24, 2015; 10 pages.
USPTO; U.S. Appl. No. 13/430,249; Office Action dated Oct. 26, 2015; 10 pages.
USPTO; U.S. Appl. No. 13/800,354; Office Action dated Sep. 25, 2014; 13 pages.
USPTO; U.S. Appl. No. 13/839,726; Notice of Allowance dated Aug. 15, 2016; 5 pages.
USPTO; U.S. Appl. No. 13/839,726; Notice of Allowance dated Dec. 31, 2015; 5 pages.
USPTO; U.S. Appl. No. 13/839,726; Office Action dated Apr. 26, 2016; 4 pages.
USPTO; U.S. Appl. No. 13/839,726; Office Action dated May 28, 2015; 5 pages.
USPTO; U.S. Appl. No. 13/964,903; Office Action dated Jun. 3, 2015; 21 pages.
USPTO; U.S. Appl. No. 13/964,903; Office Action dated Mar. 7, 2016; 21 pages.
USPTO; U.S. Appl. No. 14/047,489; Office Action dated Jun. 29, 2015; 7 pages.
USPTO; U.S. Appl. No. 14/047,489; Office Action dated Oct. 7, 2015; 9 pages.
USPTO; U.S. Appl. No. 14/139,217; Office Action dated Apr. 8, 2015; 9 pages.
USPTO; U.S. Appl. No. 14/139,217; Office Action dated Sep. 18, 2015; 11 pages.
USPTO; U.S. Appl. No. 14/475,435; Office Action dated Jul. 20, 2016; 9 pages.
USPTO; U.S. Appl. No. 13/964,903; Office Action dated Oct. 31, 2016; 22 pages.
Alam, M. et al., 'Subsurface Drip Irrigation for Alfalfa', Kansas State University, 2009, pp. 1-8.
Arduini, I. et al., 'Influence of Copper on Root Growth and Morphology of Pinus Pinea L. and Pinus Pinaster Ait. Seedlings', Tree Physiology, 15, 1995, pp. 411-415.
Beverage, K., 'Drip Irrigation for Row Crops', New Mexico State University, 2001, pp. 1-43.
Coder, K., 'Tree Root Growth Control Series: Root Control Barriers', The University of Georgia, Mar. 1998, pp. 1-7.
Crawford, M., 'Copper-Coated Containers and Their Impact on the Environment', Spin Out, 2003, pp. 76-78.
Crawford, M., 'Update on Copper Root Control', Spin Out, 1997.
Diver, S. et al., 'Sustainable Small-Scale Nursery Production', ATTRA, Nov. 2001, pp. 1-31.
Duke, K. et al., 'Sewer Line Chemical Root Control with Emphasis on Foaming Methods Using Metam-Sodium and Dichiobenil', EPA United States Environmental Protection Agency, Sep. 1995.
EPO Office Action for EPO Application No. 10 160 675.4-2313 dated Mar. 27, 2012.
EPO search report, EPO Application No. 10160675.4, dated Aug. 6, 2010.
Giles-Parker, C, EPA, Pesticide Fact Sheet, pp. 1-4.
Hetzler, Mark W., Fitch, Even, Tabin & Flannery; Letter, Apr. 23, 2008, 1 p.
http://aasystems.eu/products11.html; Advanced Automation Systems Ltd., (1 p., dated Jun. 20, 2013).
http://metzerplas.com/en-US/50/845/; Meterplas Cooperative Agricultural Organization Ltd., (2 pp., dated Jun. 20, 2013).
Jaffe, E., Netafim, Ltd., Patent Dept.; Letter with attached invoice May 7, 2008, 2 pages.
Jaffe, E., Netafim Ltd., Patent Dept.; Letter w/attached claim charts, Feb. 4, 2008, 6 pp.
Jaffe, E., Netafim Ltd., Patent Dept.; Letter w/attachment, Feb. 4, 2008, 7 pp.
Jaffe, E., Netafim Ltd., Patent Dept.; Letter w/attachment, May 7, 2008, 2 pp.
Jaffe, E., Netafim Ltd., Patent Dept.; Letter with attached claim charts, Jul. 12, 2009, 4 pages.
Jaffe, E. Netafim Ltd., Patent Dept., Letter with attached Appendices A-B, Aug, 1, 2010, 35 pages.
Jiang, W. et al., 'Effects of Copper on Root Growth, Cell Division, and Nucleolus of *Zea mays*', Biologia Plantarum, 44(1), 2001, pp. 105-109.
Kuhns, L. et al., 'Copper Toxicity in Woody Ornamentals', Journal of Arboriculture, Apr. 1976. pp. 68-78.
Nanda K. Alapati, Letter dated Mar. 30, 2012 with appendices.
Netafim International—Netafim USA—Internet site, 2003, 5 pages.
Netafim Letter dated Mar. 30, 2012 with appendices.
Netafim Ltd., Appendix A, images of Netafim's Drip Net product, 1 page.
Netafim Ltd., Appendix A, marked-up images of Netafim's Ram product, 1 p.
Netafim Ltd., Appendix B, Invoice, Jan. 31, 1991, 1 p.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim RAM Catalog Figures.
Netafim USA, Triton X Heavywall Dripperline Catalog, May 2007, 8 pages.
Office Action, U.S. Appl. No. 12/495,178, dated Feb. 3, 2010.
Office Action, U.S. Appl. No. 12/347,266, dated Mar. 7, 2011.
Office Action, U.S. Appl. No. 12/347,266, dated Nov. 17, 2010.
Office Action, U.S. Appl. No. 12/347,266, dated Sep. 7, 2010.
Office Action, U.S. Appl. No. 12/367,295, dated Feb. 11, 2011.
Office Action, U.S. Appl. No. 12/367,295, dated Jul. 15, 2011.
Office Action, U.S. Appl. No. 12/495,193, dated May 11, 2011.
Office Action, U.S. Appl. No. 11/394,755, dated Feb. 7, 2008.
Office Action, U.S. Appl. No. 11/394,755, dated Mar. 31, 2009.
Office Action, U.S. Appl. No. 11/394,755, dated May 12, 2011.
Office Action, U.S. Appl. No. 11/394,755, dated Jul. 17, 2007.
Office Action, U.S. Appl. No. 11/394,755, dated Jul. 17, 2009.
Office Action, U.S. Appl. No. 11/394,755, dated Aug. 14, 2008.
Office Action, U.S. Appl. No. 12/495,178, dated Apr. 18, 2014.
Office Action, U.S. Appl. No. 12/495,193, dated Apr. 18, 2014.
Office Action dated Apr. 18, 2014 for U.S. Appl. No. 12/495,193.
Office Action dated Jun. 12, 2012, for U.S. Appl. No. 12/495,178, filed Jun. 30, 2009.
Patent Cooperation Treaty, International Searching Authority, Notification of Transmittal of the International Search Report and the Written Opinion of the International Searching Authority, or the Declaration, issued in International Application No. PCT/US2013/033866, dated Jun. 17, 2013, 10 pp.
Patent Cooperation Treaty, International Searching Authority, Notification of Transmittal of the International Search Report and the Written Opinion of the International Searching Authority, or the Declaration, issued in International Application No. PCT/US2013/033866, dated Jun. 19, 2013, 38 pages.
PCT Application No. PCT/US13/33866 dated Mar. 26, 2013.
Rain Bird Corporation, Drip Watering System 1994 Catalog, 1993, 16 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, PC Dripline Pressure Compensating Inline Emitter Tubing Catalog, Oct. 1998, 16 pages.
Rain Bird Corporation, Turf Irrigation Equipment 1985 Catalog, p. 73, 1985, 3 pages.
RAM Invoice Jan. 31, 1991.
Smiley, E. T., 'Root Growth Near Vertical Root Barriers', International Society of Arboriculture, 1995, pp. 150-152.
The Clean Estuary Partnership, 'Copper Sources in Urban Runoff and Shoreline Activities', TDC Environmental, LLC, 2004, pp. 1-72.

(56) References Cited

OTHER PUBLICATIONS

U.S. Appl. No. 11/359,181, filed Feb. 22, 2006 and dated Jan. 19, 2010 now U.S. Pat. No. 7,648,085, entitled 'Drip Emitter'.
U.S. Appl. No. 12/347,266, filed Dec. 31, 2008, entitled 'Low Flow Irrigation Emitter'.
U.S. Appl. No. 12/367,295, filed Feb. 6, 2009, entitled 'Low Flow Irrigation Emitter'.
U.S. Appl. No. 12/436,394, filed May 6, 2009, entitled 'Drip Emitter and Methods of Assembly and Mounting'.
U.S. Appl. No. 12/495,178, filed Jun. 30, 2009, entitled 'Drip Emitter,' which is a continuation of U.S. Appl. No. 11/359,181.
U.S. Appl. No. 13/430,249, filed Mar. 26, 2012.
U.S. Appl. No. 13/964,903, filed Aug. 12, 2013.
U.S. Appl. No. 14/139,217, filed Dec. 23, 2013.
U.S. Appl. No. 11/394,755, filed Mar. 31, 2006, entitled "Drip Emitter".
U.S. Appl. No. 12/495,193, filed Jun. 30, 2009, entitled 'Drip Emitter,' which is a continuation of U.S. Appl. No. 11/359,181.
USPTO Advisory Action in U.S. Appl. No. 12/495,193 dated Sep. 5, 2013.
USPTO Office Action in U.S. Appl. No. 12/495,193, dated Jan. 6, 2012.
USPTO Office Action in U.S. Appl. No. 11/394,755, dated Dec. 19, 2011.
USPTO Office Action in U.S. Appl. No. 12/367,295, dated Jun. 8, 2012.
USPTO Office Action in U.S. Appl. No. 12/495,178, dated Jun. 21, 2012.
USPTO Office Action in U.S. Appl. No. 12/495,193 dated Jun. 18, 2013.
Wagar, et al., "Effectiveness of Three Barrier Materials for Stopping Regenerating Roots of Established Trees", Journal of Arboriculture, 19(6), Nov. 1993, pp. 332-338.
Westgate, P., 'Preliminary Report on Copper Toxicity and Iron Chlorosis in Old Vegetable Fields', Florida State Horticultural Society, 1952, pp. 143-146.
USPTO; U.S. Appl. No. 13/839,726; Office Action dated May 30, 2017; (4 pages).
USPTO; U.S. Appl. No. 14/910,573; Office Action dated Jun. 27, 2017; (10 pages).
European Patent Office, Communication Pursuant to Article 94(3) EPC issued in European Application No. 14 836 360.9, dated Feb. 8, 2017, 7 pp.
European Patent Office, Extended European Search Report issued in Application No. 13768209.2, dated Nov. 24, 2015, 10 pp.
Final Office Action dated Aug. 25, 2015; U.S. Appl. No. 13/430,308; 11 pages.
Final Office Action dated Jul. 21, 2016; U.S. Appl. No. 13/430,308; 9 pages.
Non-Final Office Action dated Feb. 11, 2016; U.S. Appl. No. 13/430,308; 9 pages.
Patent Cooperation Treaty, International Searching Authority, Notification of Transmittal of the International Search Report and the Written Opinion of the International Searching Authority, or the Declaration, issued in International Application No. PCT/US/2014/054533, dated Dec. 25, 2014, 9 pp.
USPTO; U.S. Appl. No. 14/036,881; Corrected Notice of Allowability dated May 22, 2017.
USPTO; U.S. Appl. No. 14/036,881; Notice of Allowance dated May 8, 2017.
USPTO; U.S. Appl. No. 14/036,881; Notice of Allowance dated Dec. 23, 2016.
USPTO; U.S. Appl. No. 14/036,881; Office Action dated Aug. 2, 2016.
USPTO; U.S. Appl. No. 14/036,881; Office Action dated Dec. 9, 2015.
USPTO; U.S. Appl. No. 15/331,407; Office Action dated Apr. 27, 2017.
USPTO; U.S. Appl. No. 12/495,193; Notice of Allowance dated Feb. 10, 2017; 7 pages.
USPTO; U.S. Appl. No. 13/839,726; Office Action dated Mar. 20, 2017; 4 pages.
USPTO; U.S. Appl. No. 14/851,545; Office Action dated Apr. 24, 2017.
USPTO; U.S. Appl. No. 15/344,843; Office Action dated Apr. 28, 2017.
USPTO; U.S. Appl. No. 12/495,193; Notice of Allowance dated May 4, 2017.
USPTO; U.S. Appl. No. 14/518,774; Office Action dated May 10, 2017.
U.S. Appl. No. 14/036,881; Notice of Allowance dated Aug. 24, 2017; (pp. 1-7).
U.S. Appl. No. 13/839,726; Notice of Allowance dated Sep. 14, 2017; (pp. 1-5).
U.S. Appl. No. 13/964,903; Notice of Allowance dated Sep. 18, 2017; (pp. 1-7).
U.S. Appl. No. 14/475,435; Office Action dated Sep. 27, 2017; (pp. 1-9).
U.S. Appl. No. 15/344,843; Notice of Allowance dated Oct. 16, 2017; (pp. 1-7).
U.S. Appl. No. 14/518,774; Notice of Allowance dated Oct. 26, 2017; (pp. 1-7).
U.S. Appl. No. 14/851,545; Office Action dated Oct. 30, 2017; (pp. 1-27).
U.S. Appl. No. 15/331,407; Notice of Allowance dated Oct. 27, 2017; (pp. 1-9).
U.S. Appl. No. 14/036,881; Notice of Allowability dated Nov. 29, 2017; (pp. 1-2).
U.S. Appl. No. 15/331,407; Notice of Allowability dated Nov. 30, 2017; (pp. 1-2).
U.S. Appl. No. 15/344,843; Notice of Allowability dated Nov. 30, 2017; (pp. 1-2).
Patent Cooperation Treaty, Notification of Transmittal of the International Search Report and the Written Opinion of the International Searching Authority, or the Declaration, issued in International Application No. PCT/US2017042378, dated Oct. 26, 2017, 7 pp.

\* cited by examiner

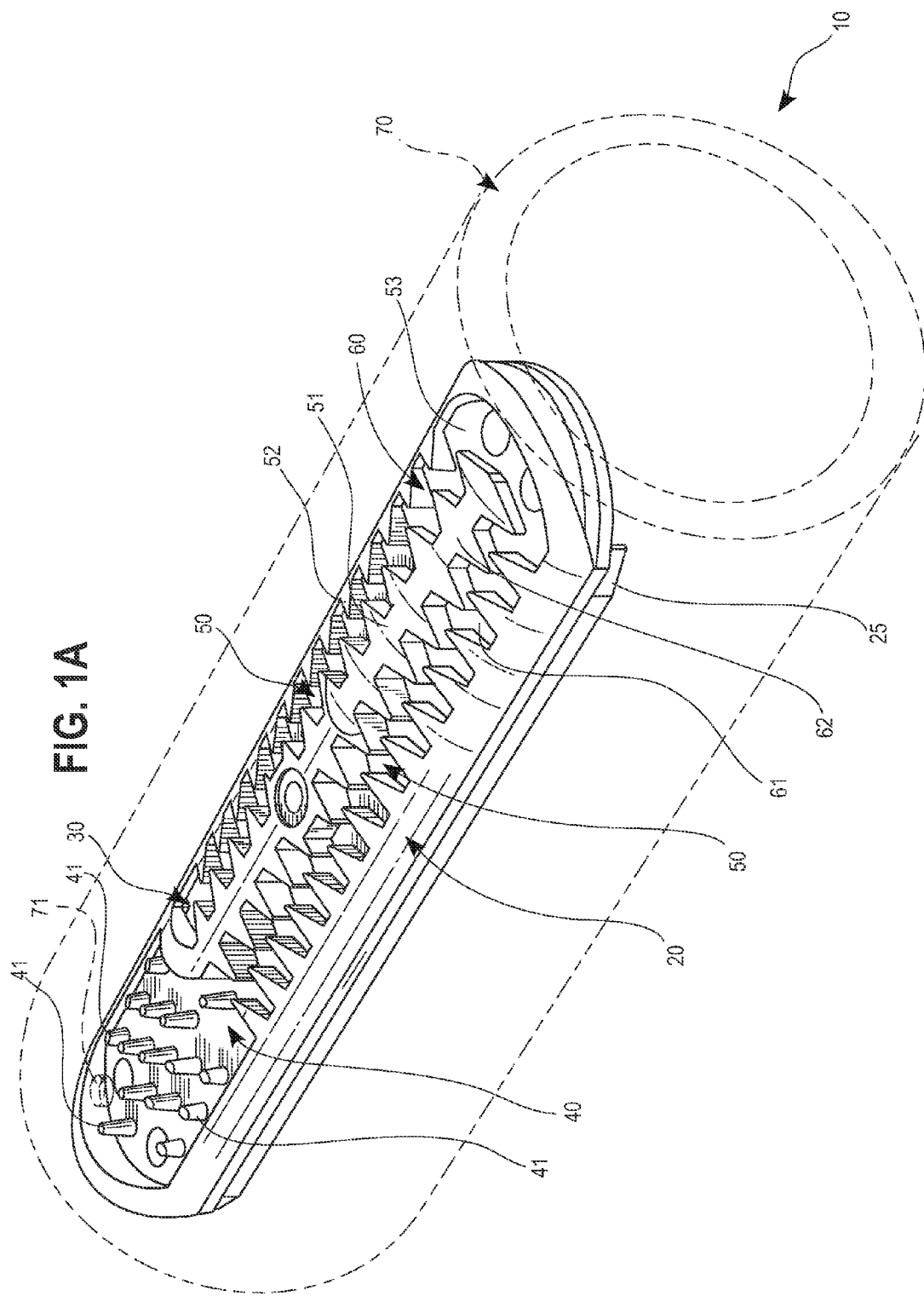

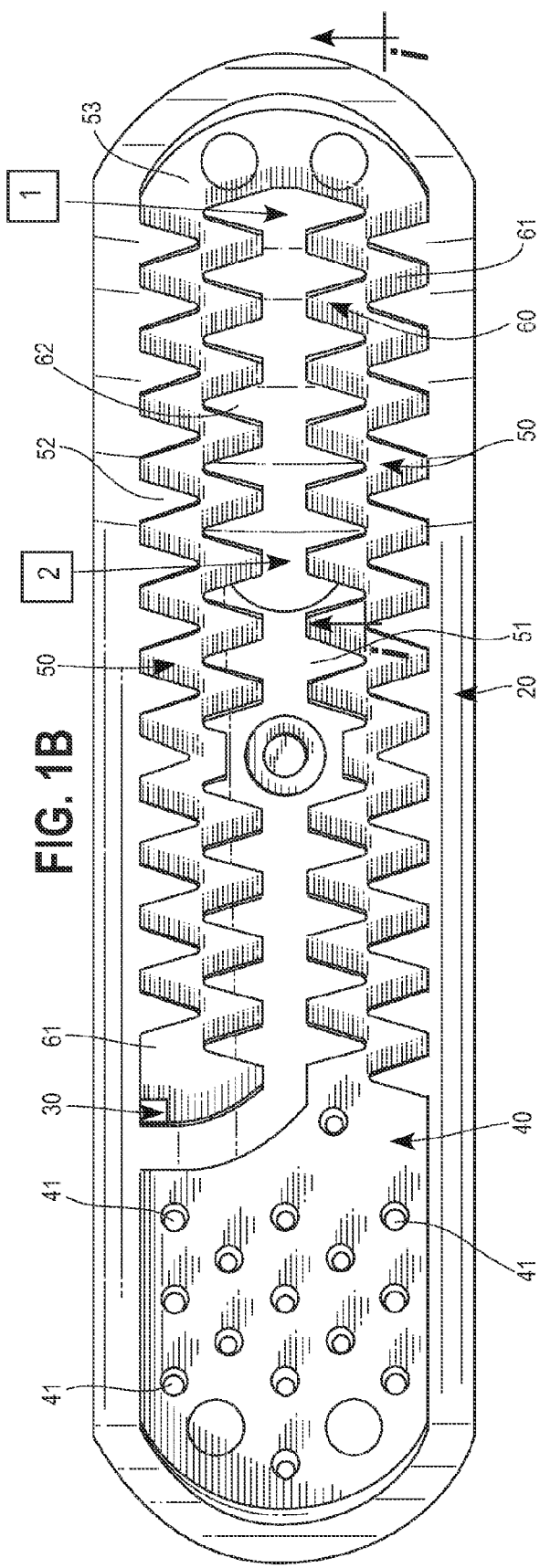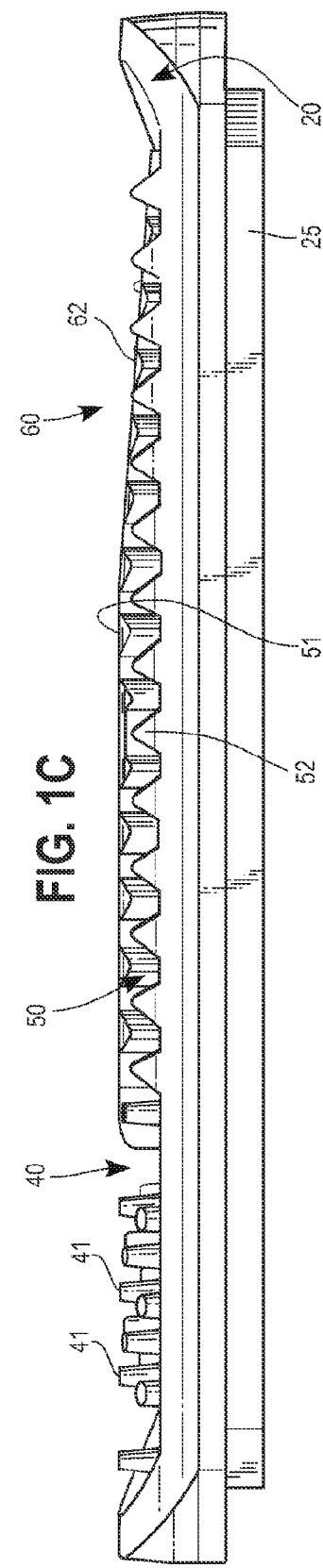

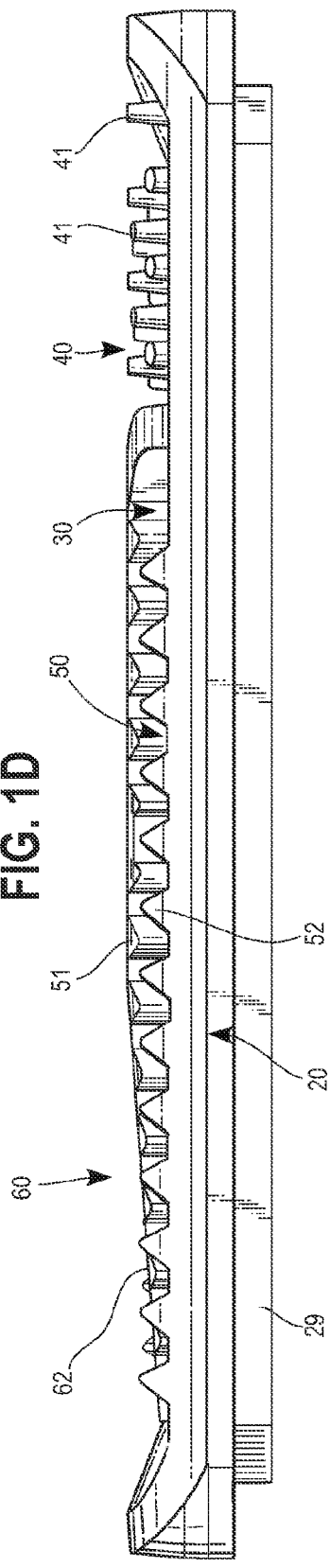
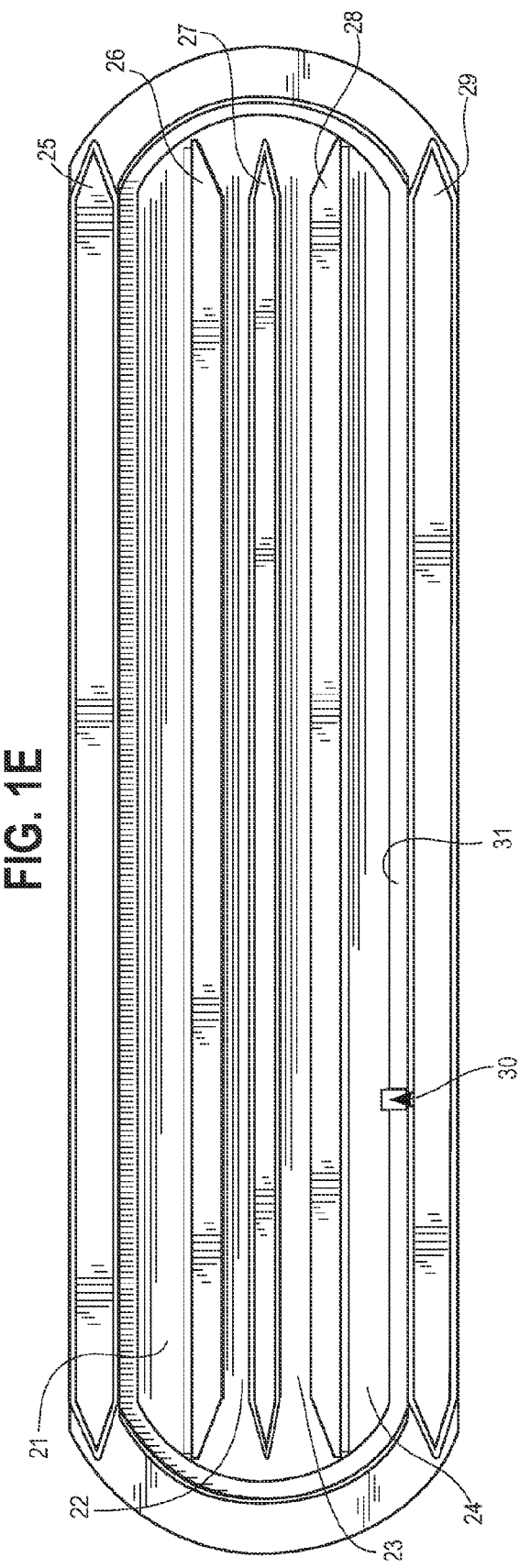
FIG. 1D
FIG. 1E

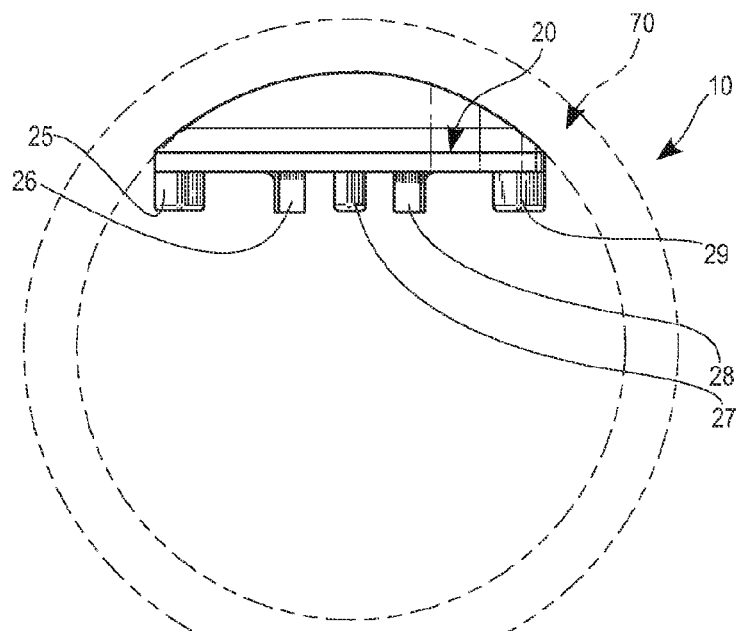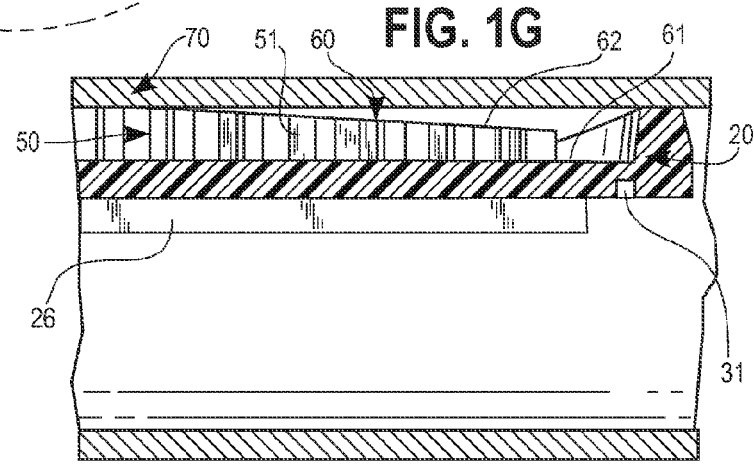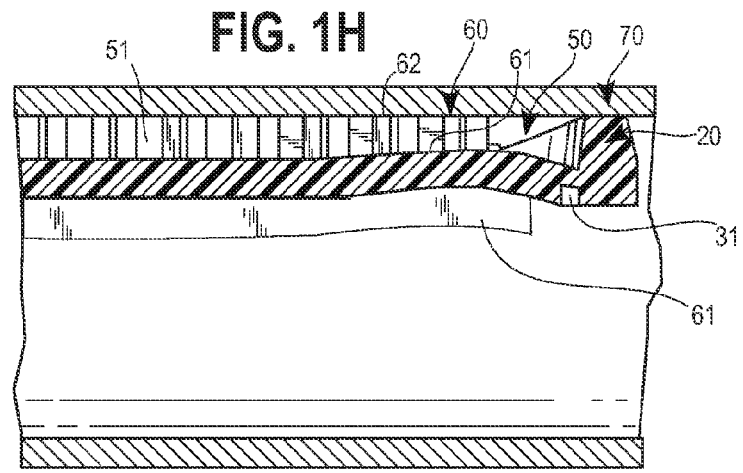

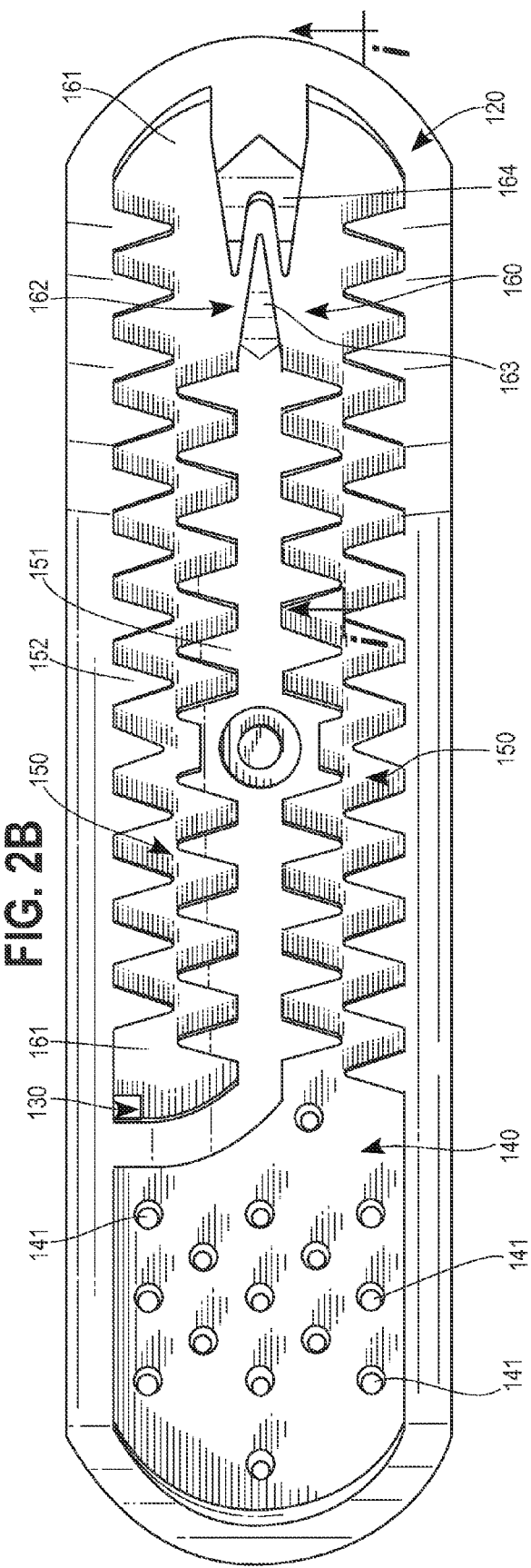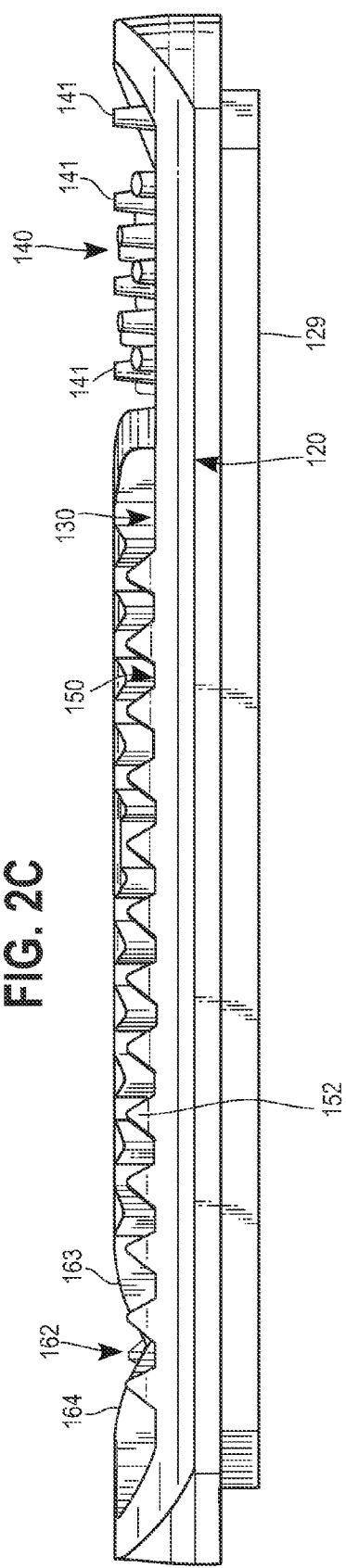

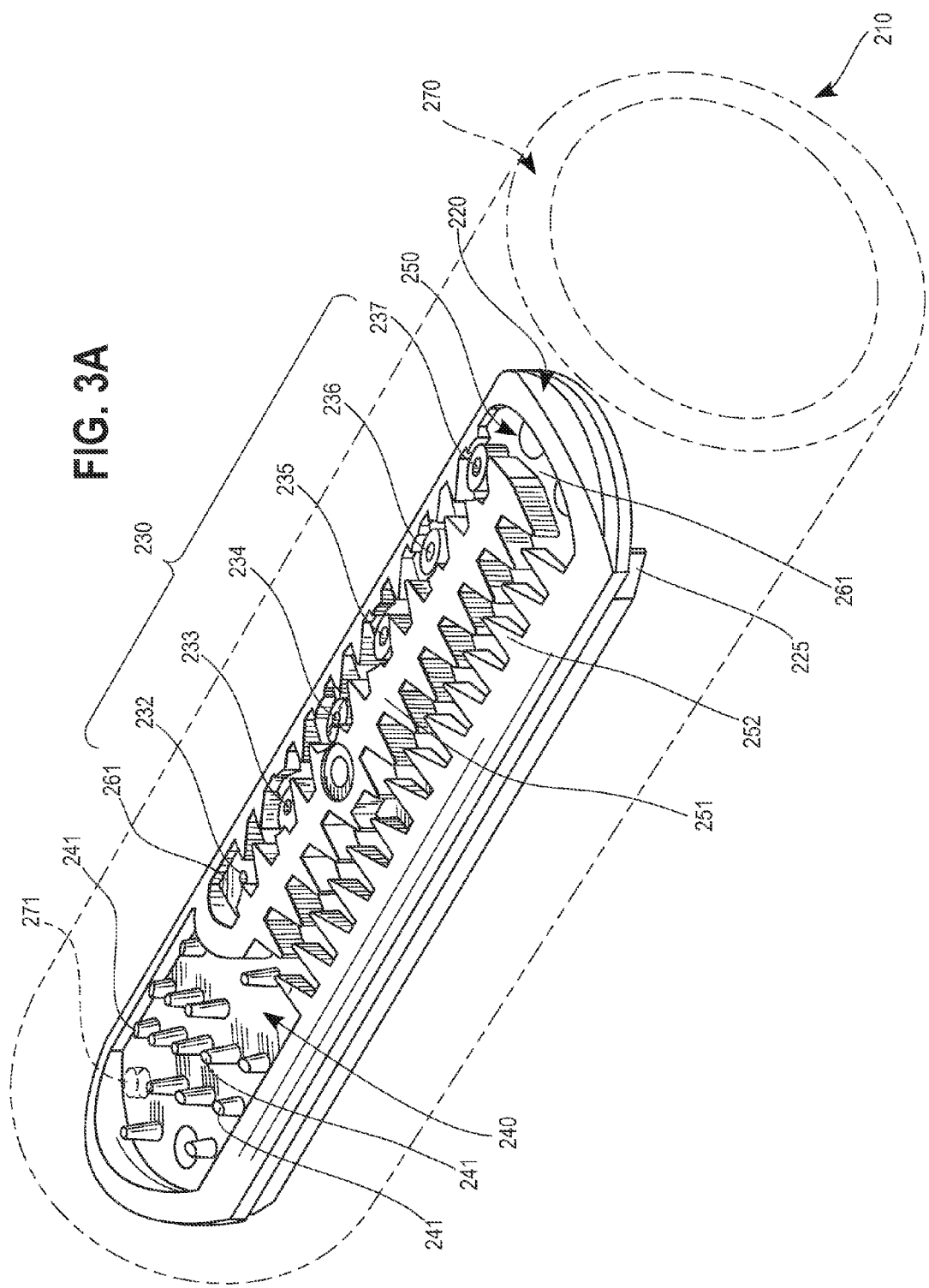

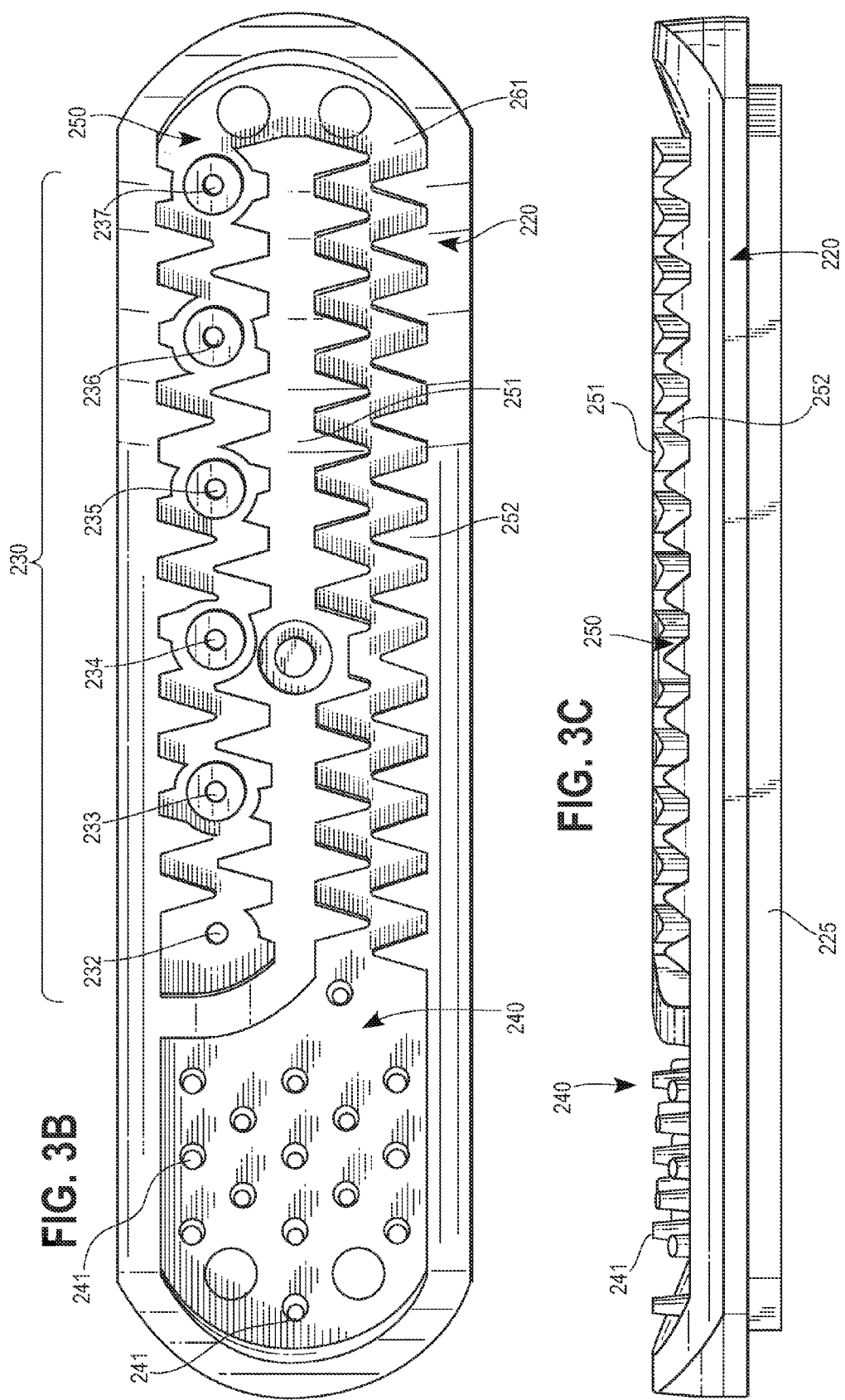

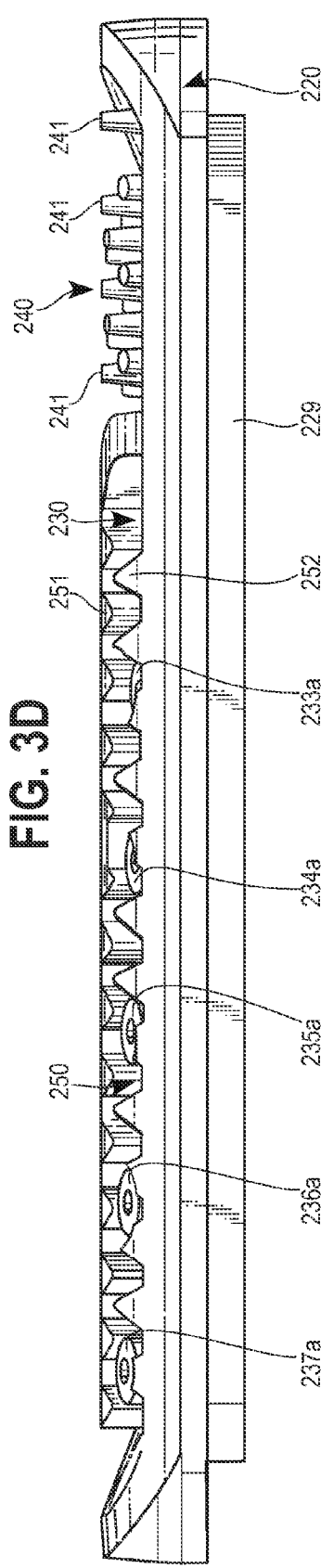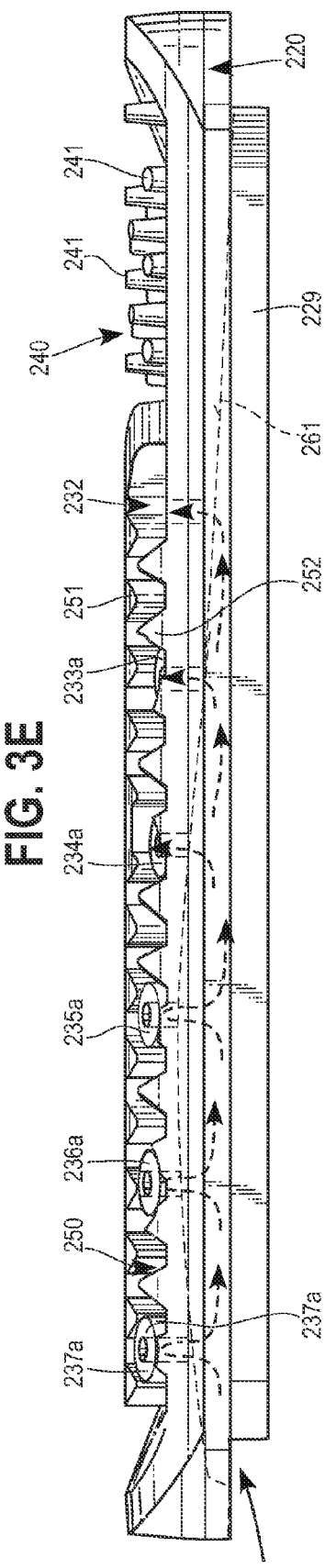

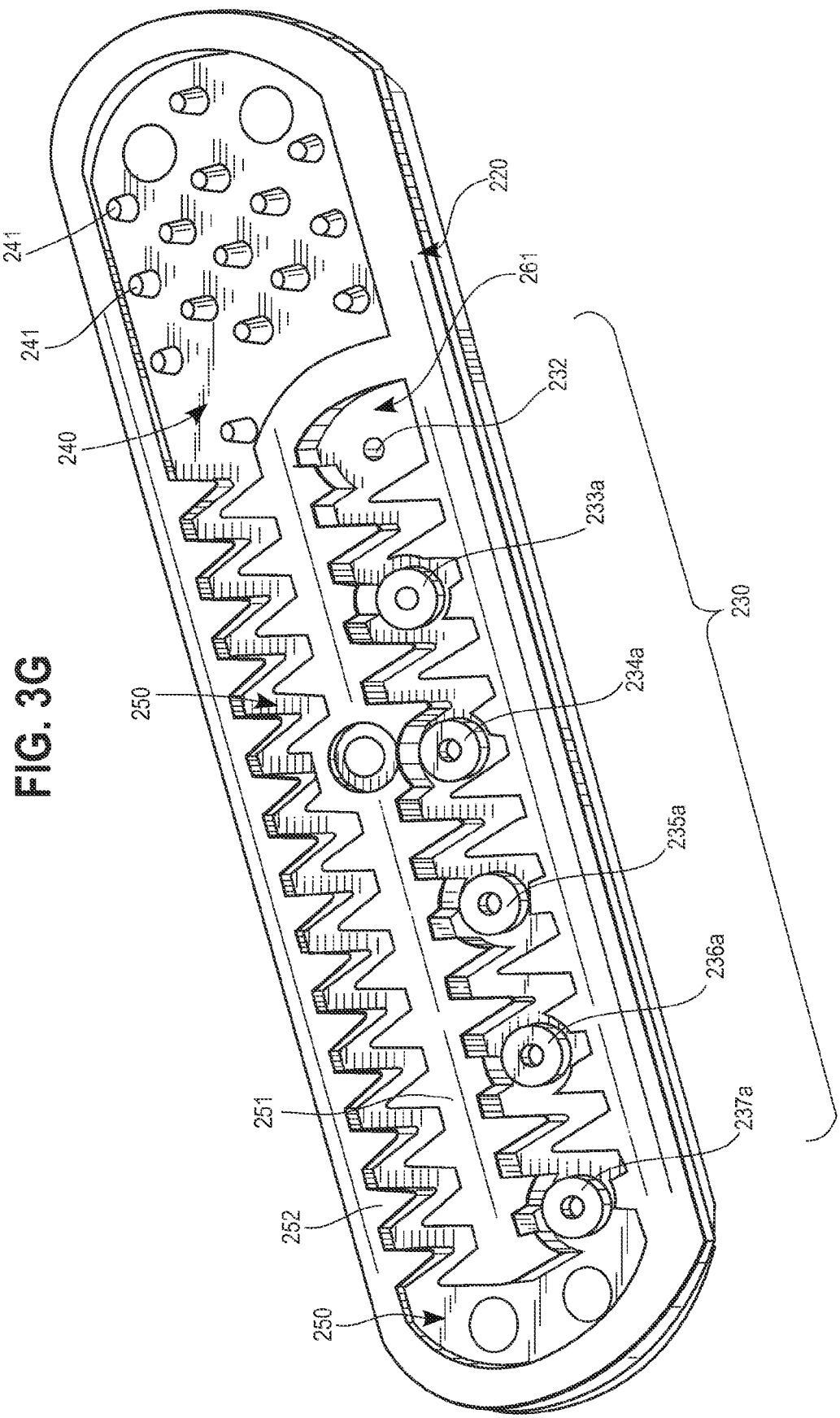

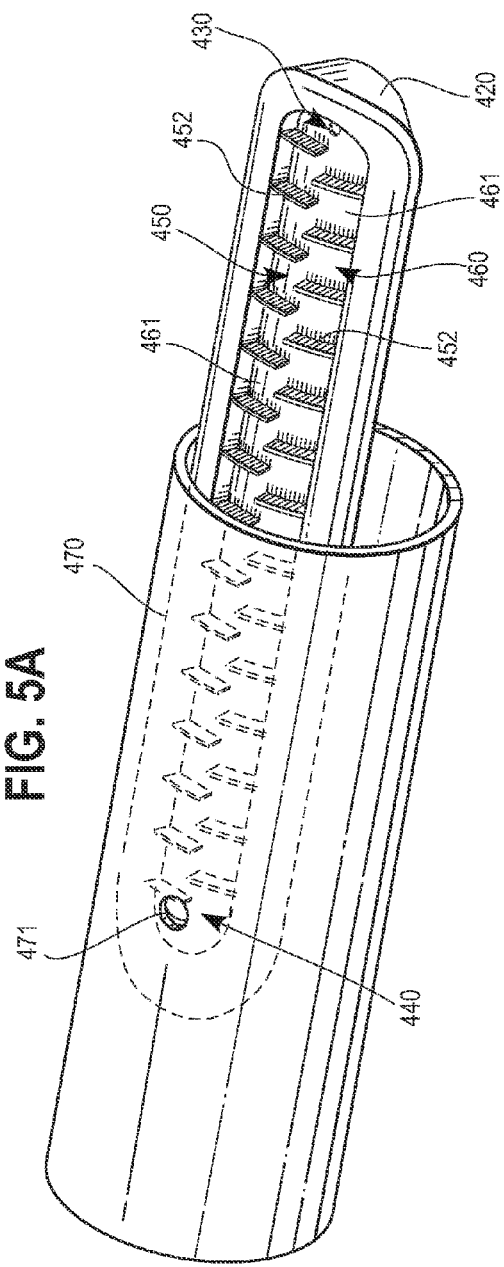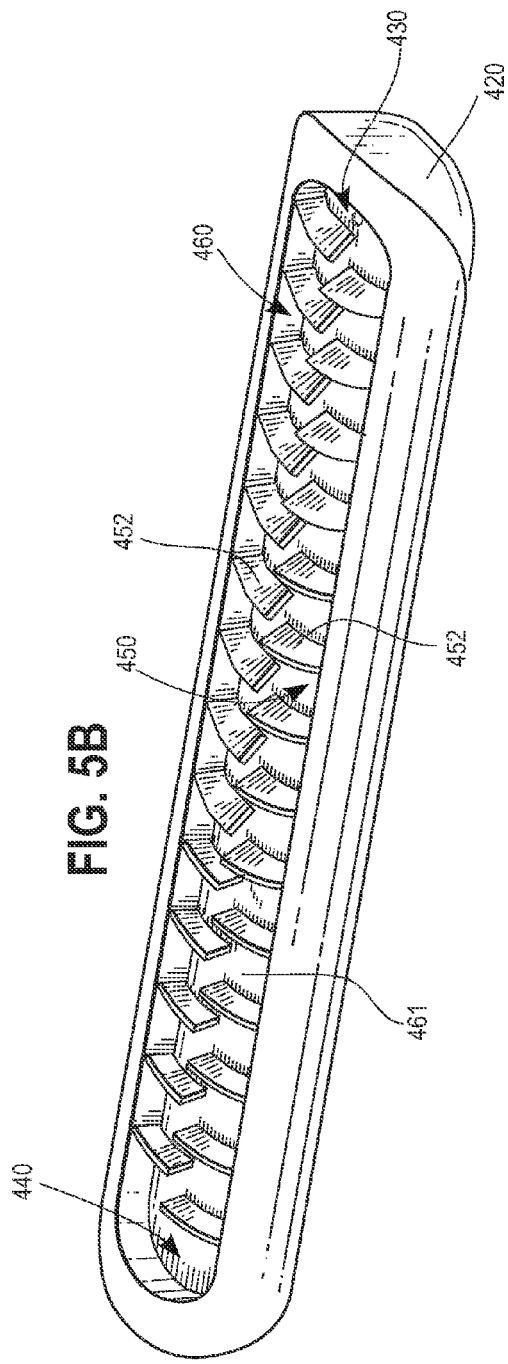

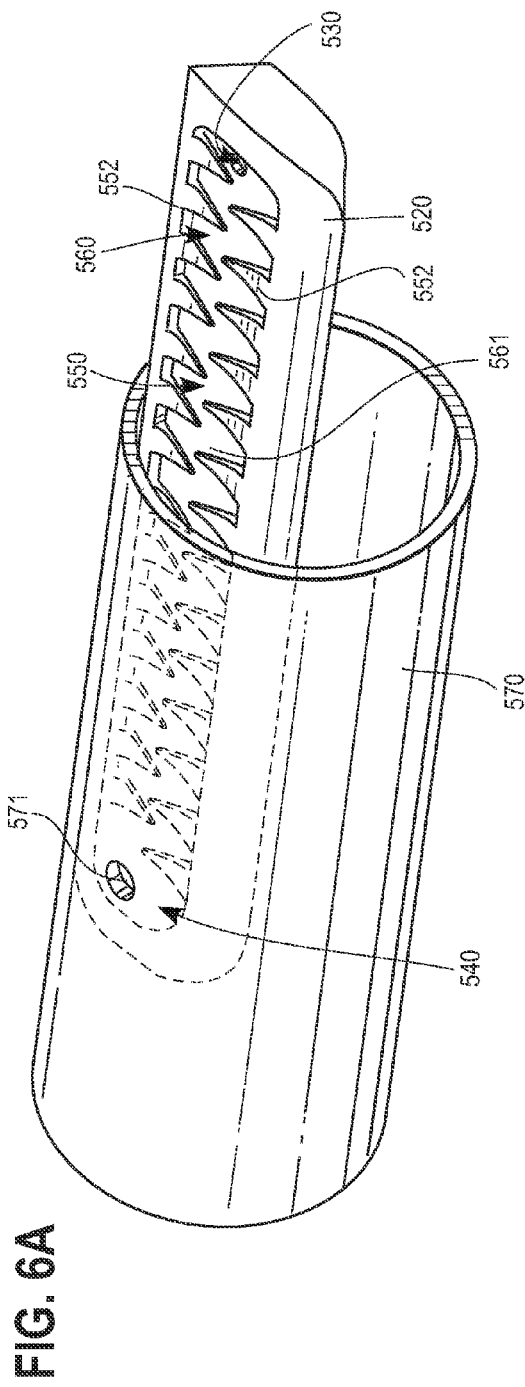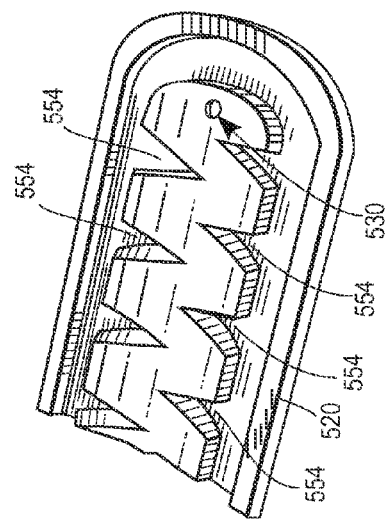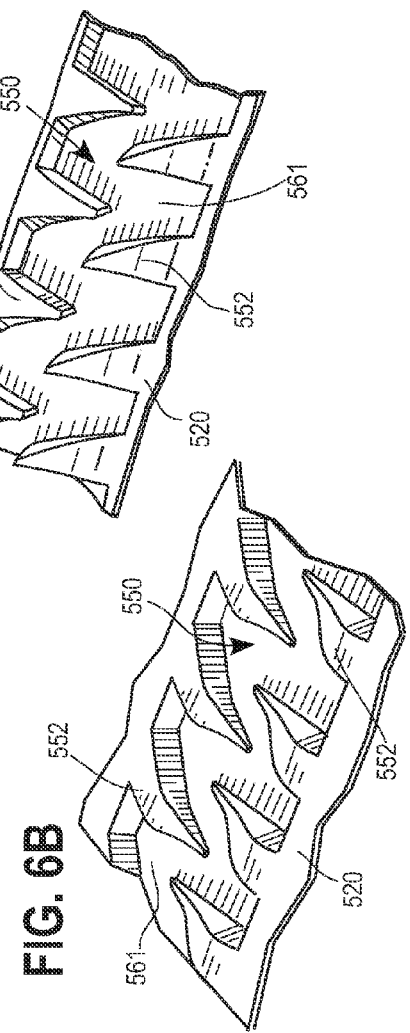

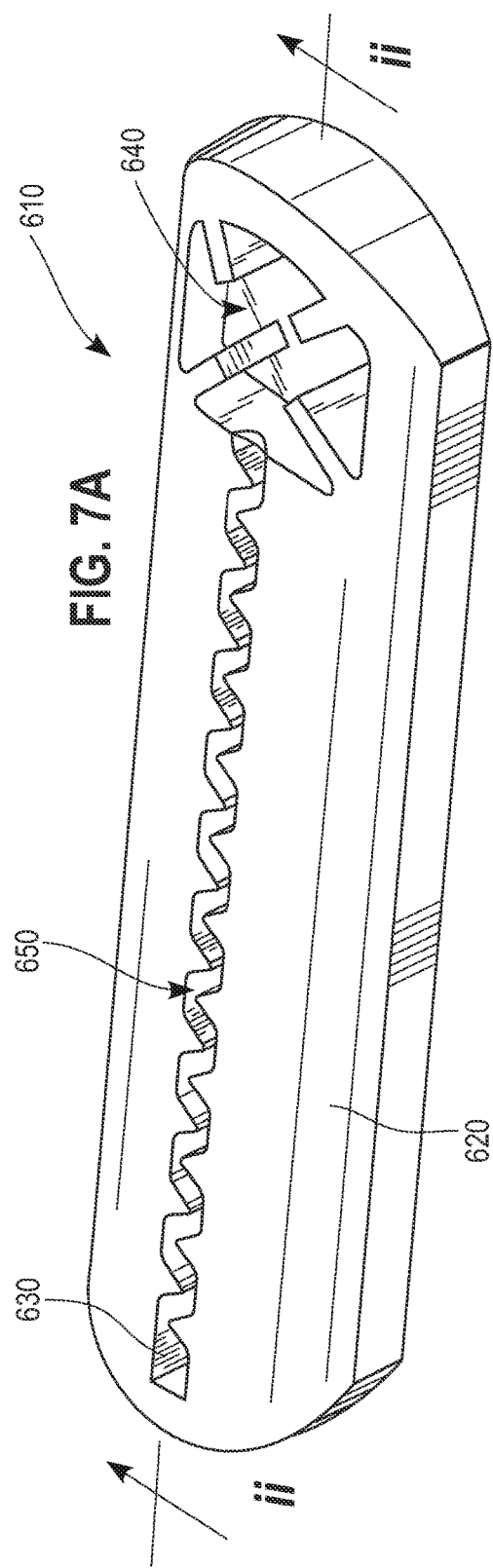
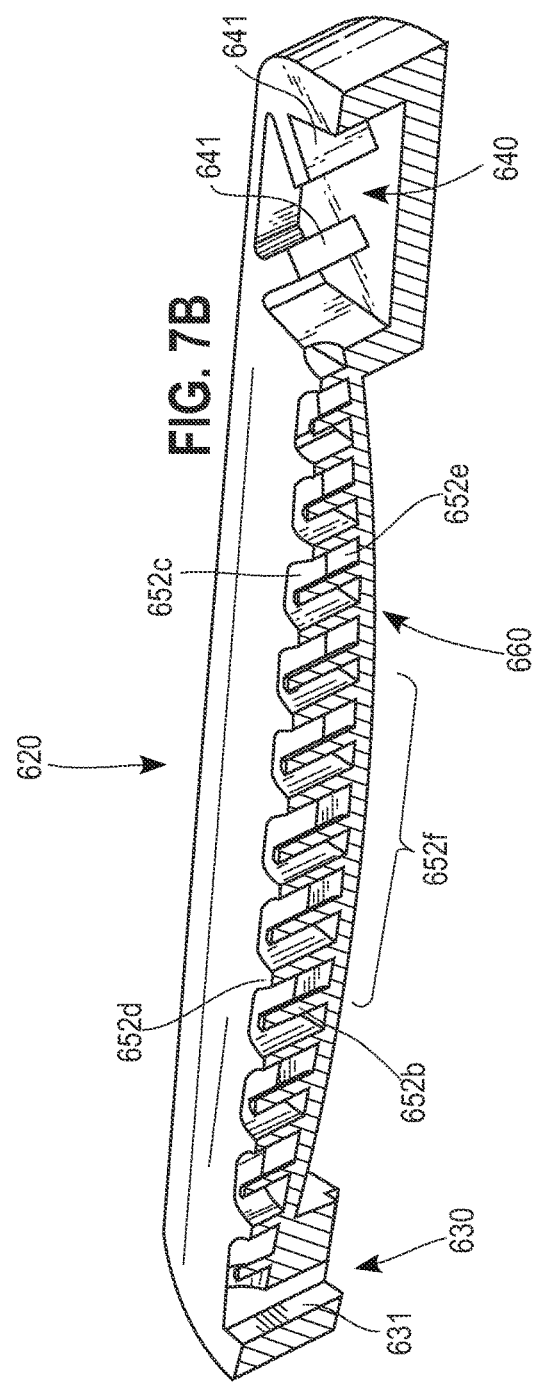

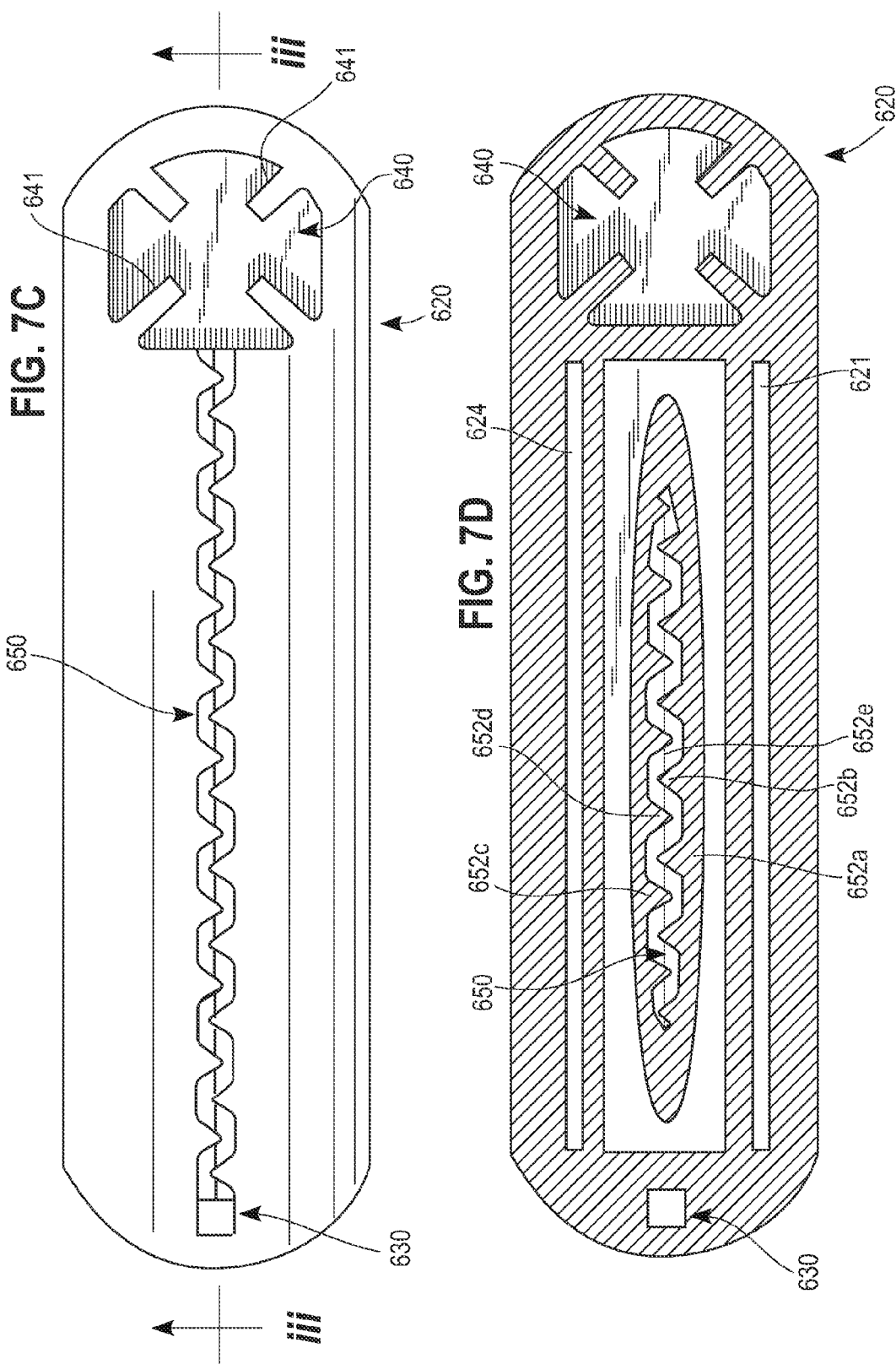

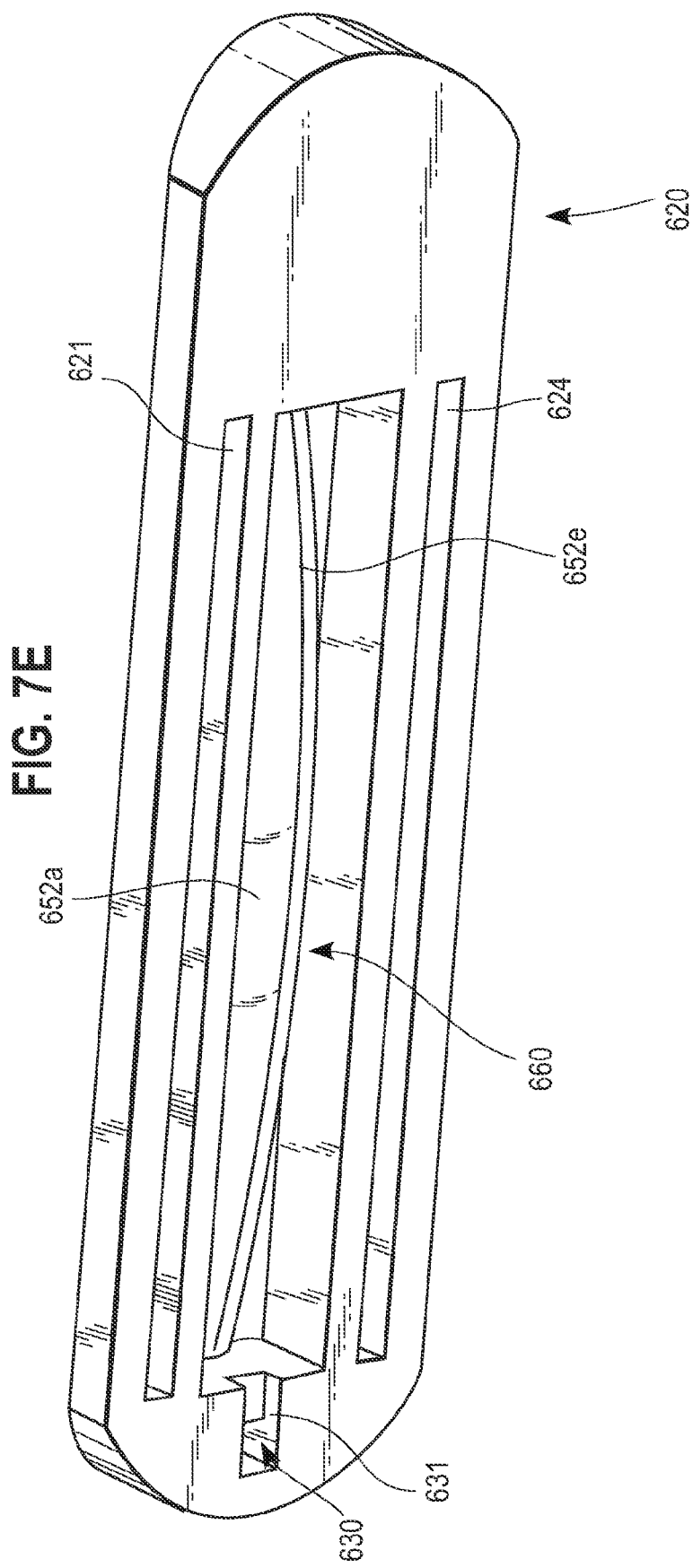

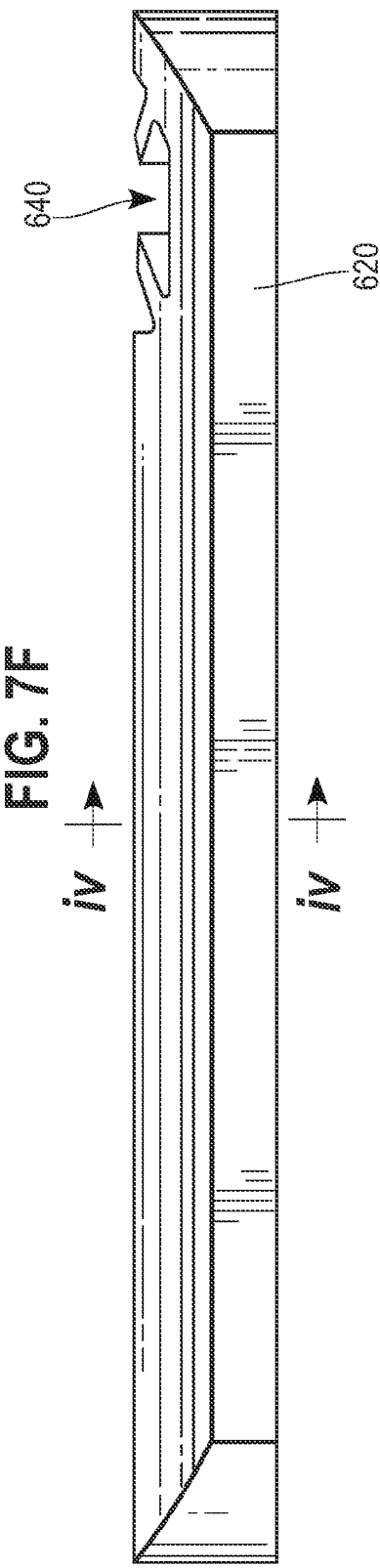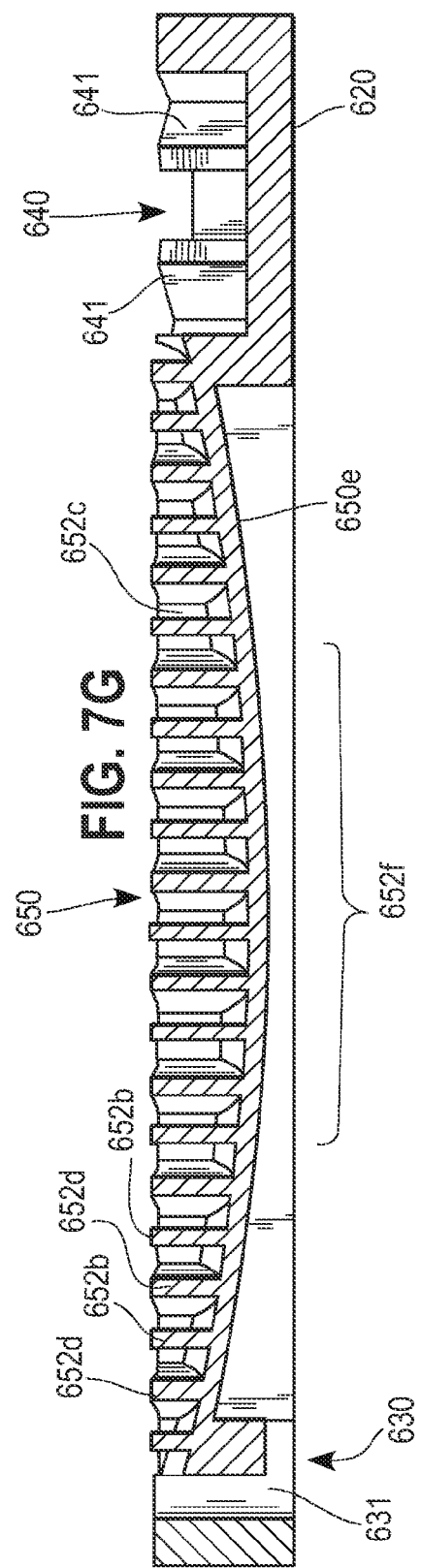

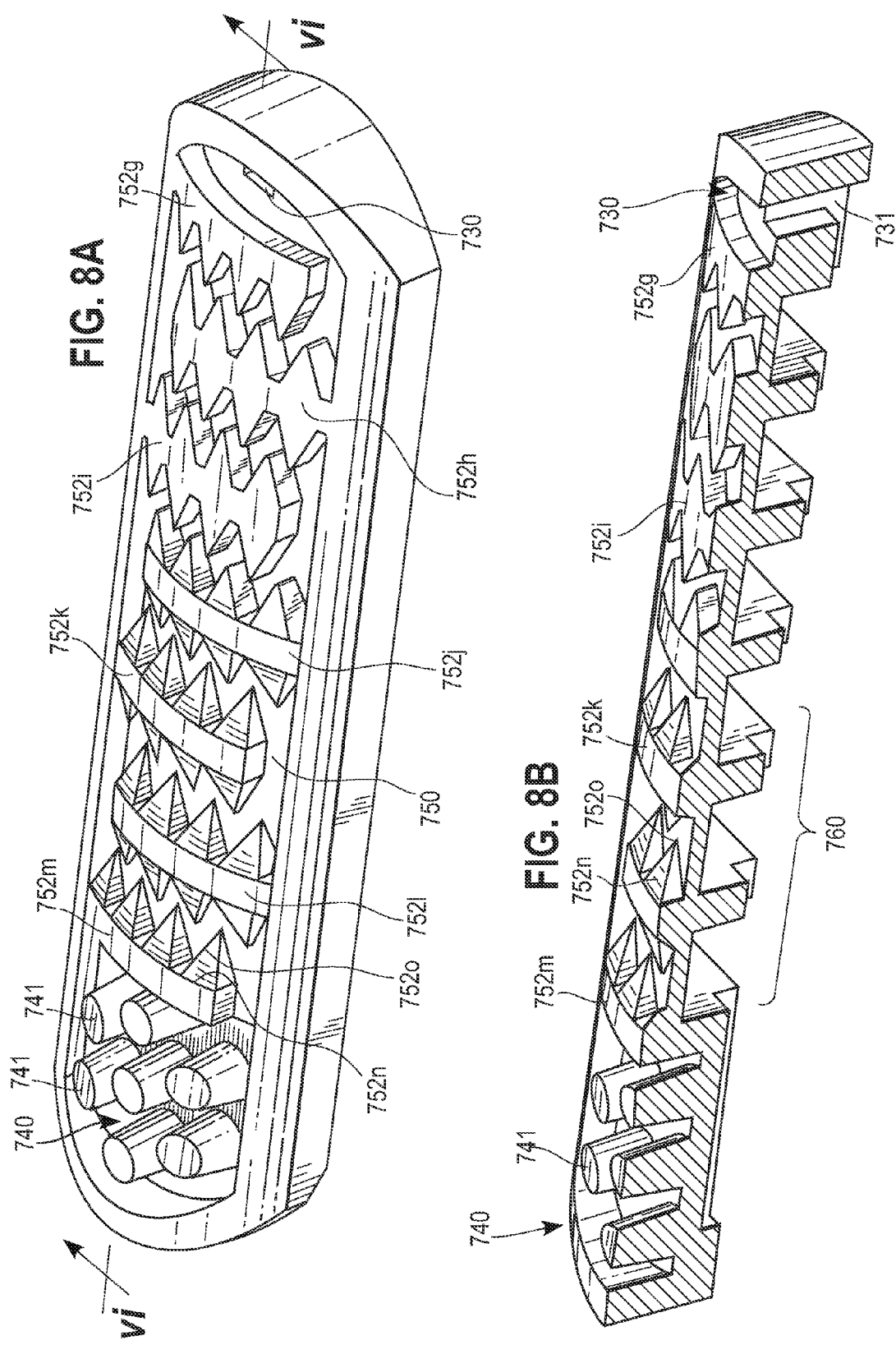

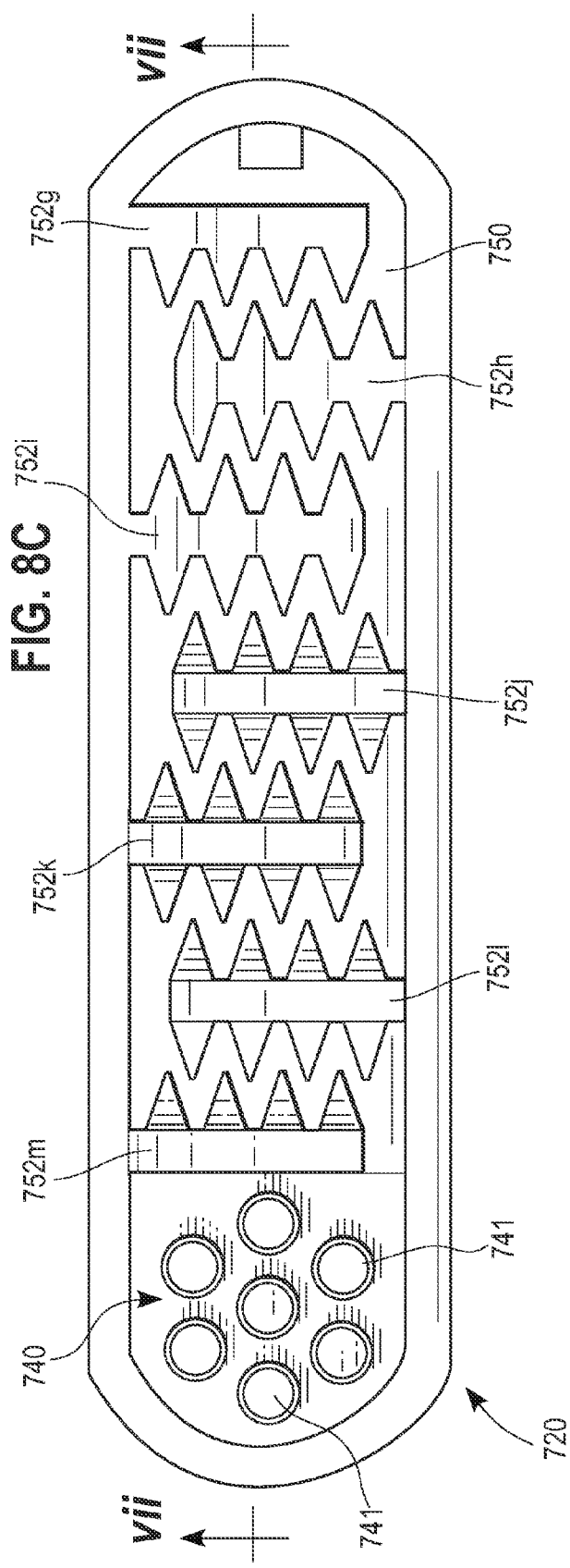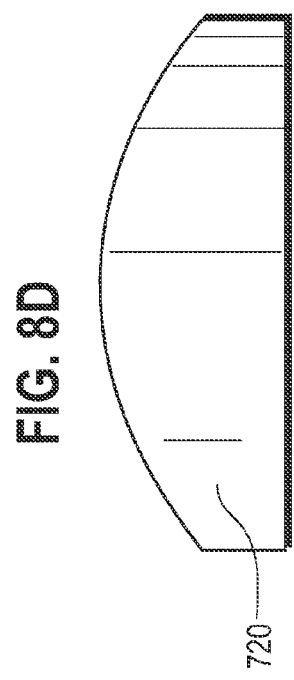

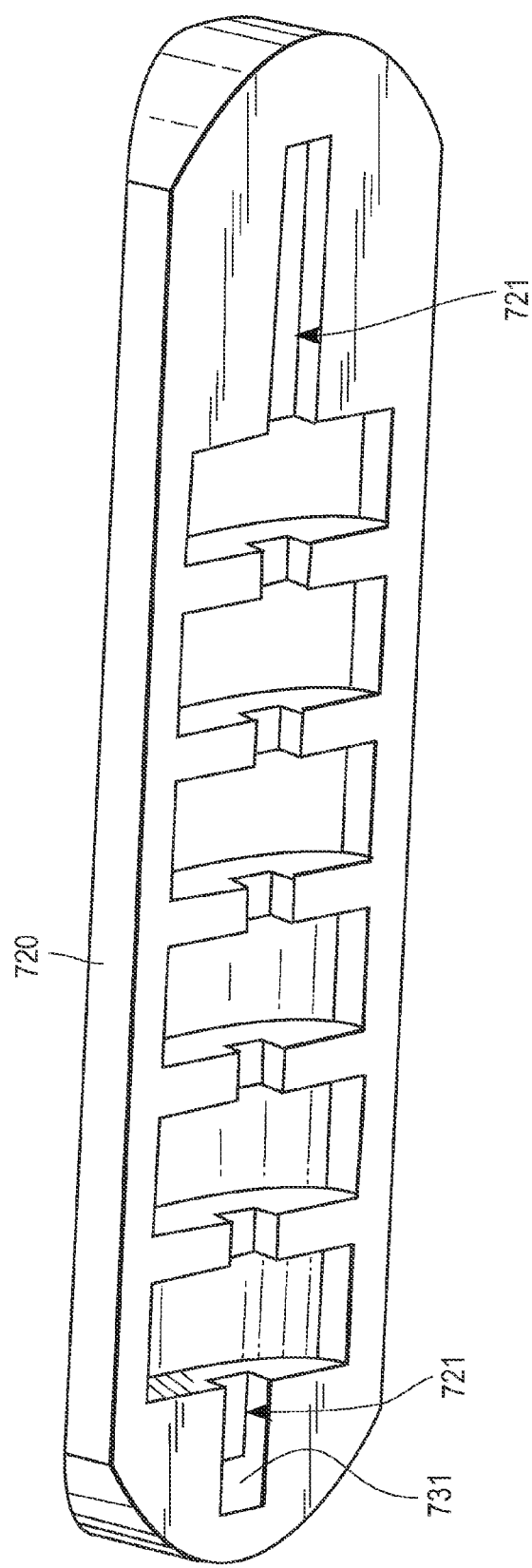

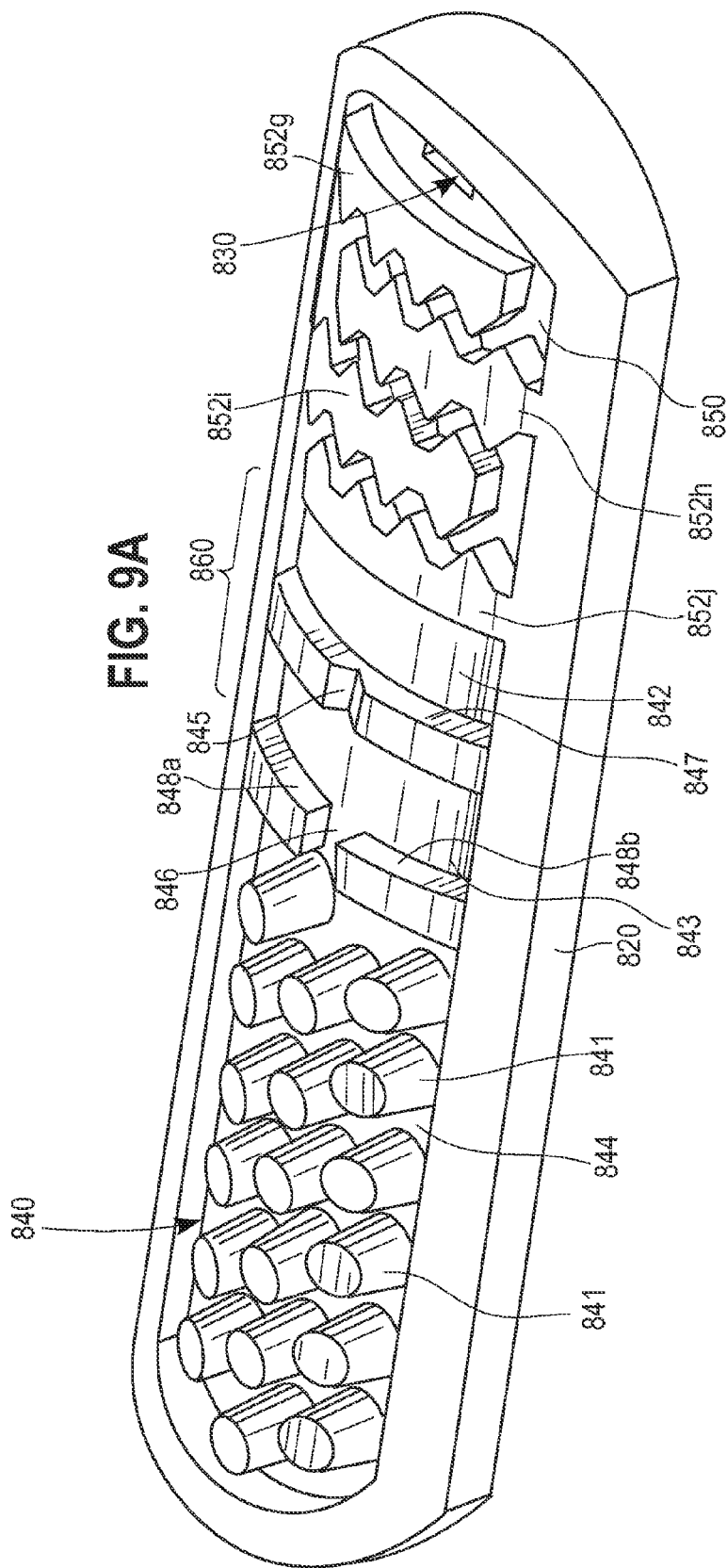

ELASTOMERIC EMITTER AND METHODS RELATING TO SAME

CROSS-REFERENCE TO RELATED APPLICATIONS

This application is a U.S. national phase application filed under 35 U.S.C. § 371 of International Application PCT/US2013/033866, filed Mar. 26, 2013, designating the United States, which is a continuation-in-part of U.S. application Ser. No. 13/430,249, filed Mar. 26, 2012, both of which are hereby incorporated by reference in their entirety herein.

FIELD

The present invention relates to irrigation drip emitters, and more particularly, to multiple irrigation drip emitters mounted to a supply tube to form an irrigation assembly or system.

BACKGROUND

Drip emitters are commonly used in irrigation systems to convert water flowing through a supply tube at a relatively high flow rate to a relatively low flow rate al the outlet of each emitter. Each drip emitter generally includes a housing defining a flow path that reduces high pressure water entering the drip emitter into relatively low pressure water exiting the drip emitter. Multiple drip emitters are commonly mounted on the inside or outside of a water supply tube, in one type of system, a large number of drip emitters are mounted at regular and predetermined intervals along the length of the supply tube to distribute water at precise points to surrounding land and vegetation. These emitters may either be mounted internally (i.e., in-line emitters) or externally (i.e., on-line or branch emitters). Some advantages to in-line emitters are that the emitter units are less susceptible to being knocked loose from the fluid carrying conduit and the conduit can be buried underground if desired (i.e., subsurface emitters) which further makes it difficult for the emitter to be inadvertently damaged (e.g., by way of being hit or kicked by a person, hit by a lawnmower or trimmer, etc.).

In addition to the advantages of in-line emitters, subsurface drip emitters provide numerous advantages over drip emitters located and installed above ground. First, they limit water loss due to runoff and evaporation and thereby provide significant savings in water consumption. Water may also be used more economically by directing it at precise locations of the root systems of plants or other desired subsurface locations.

Second, subsurface drip emitters provide convenience. They allow the user to irrigate the surrounding terrain at any time of day or night without restriction. For example, such emitters may be used to water park or school grounds at any desired time. Drip emitters located above ground, on the other hand, may be undesirable at parks and school grounds during daytime hours when children or other individuals are present.

Third, subsurface emitters are not easily vandalized, given their installation in a relatively inaccessible location, i.e., underground. Thus, use of such subsurface emitters results in reduced costs associated with replacing vandalized equipment and with monitoring for the occurrence of such vandalism. For instance, use of subsurface emitters may lessen the costs associated with maintenance of publicly accessible areas, such as parks, school grounds, and landscaping around commercial buildings and parking lots.

Fourth, the use of subsurface drip emitters can prevent the distribution of water to undesired terrain, such as roadways and walkways. More specifically, the use of subsurface drip emitters prevents undesirable "overspray." contrast, above-ground emitters often generate overspray that disturbs vehicles and/or pedestrians. The above-identified advantages are only illustrative; other advantages exist in connection with the use of subsurface drip emitters.

Although some advantages of subsurface emitters are described above, it would be desirable to provide an improved in-line drip emitter design that can be used in both subsurface and above ground applications. For both applications, there is a need to provide for a relatively constant water output from each of the emitters in the irrigation system. More specifically, it is desirable to provide pressure compensation so as to ensure that the flow rate of the first emitter in the system is substantially the same as the last emitter in the system. Without such flow rate compensation, the last emitter in a series of emitters will experience a greater pressure loss than the first. Such pressure loss results in the inefficient and wasteful use of water.

There is also a need in the irrigation industry to keep drip emitters for both subsurface and above ground applications from becoming obstructed, which results in insufficient water distribution and potential plant death. Obstruction of an emitter may result from the introduction of grit, debris, or other particulate matter from debris entering the emitter through the supply tube. It is therefore desirable to have an inlet and/or other structures that are of a design to deflect particles that might otherwise clog flow passages in the body of the emitter. The flow through area of the inlet, however, must also be large enough to allow proper functioning of the drip emitter.

It is also desirable to provide a drip emitter that minimizes parts and assembly as this will not only make the component less complicated to construct and likely save on material costs, but will also reduce the number of emitters that do not perform as desired due to misaligned parts, etc. Drip emitters are commonly formed of multi-piece components (e.g., two or more-piece housing structures with separate flexible diaphragms, etc.) that require individual manufacture of the various parts of the emitter and then assembly of the parts prior to mounting to the supply tube. Even slight misalignment of these components during assembly may result in a malfunctioning drip emitter. Thus, in addition to the above needs, it would be desirable to reduce the number of components required to make the emitter and the manufacturing steps and time it takes to create a finished product.

Lastly, it is also desirable to provide a drip emitter that minimizes the amount of disturbance the emitter causes to the fluid flowing through the drip line or conduit to which the emitter is connected. Larger cylindrical emitters are available in the marketplace for in-line emitter applications, however, these emitters interfere with the flow of the fluid traveling through the drip line or tube and introduce more turbulence to the fluid or system due to the fact they cover and extend inward from the entire inner surface of the drip line or tube. The increased mass of the cylindrical unit and the fact it extends about the entire inner surface of the drip line or tube also increases the likelihood that the emitter will get clogged with grit or other particulates (which are more typically present at the wall portion of the tube than in the middle of the tube) and/or that the emitter itself will form a surface upon which grit or particulates will build-up on inside the drip line and slow the flow of fluid through the drip line or reduce the efficiency of this fluid flow. Thus, there is also a need to reduce the size of in-line emitters and improve the efficiency of the systems within which these items are mounted.

Accordingly, it has been determined that the need exists for an improved in-line emitter and methods relating to same which overcomes the aforementioned limitations and which further provides capabilities, features and functions, not available in current bases and methods, and for an improved method for doing the same.

BRIEF DESCRIPTION OF THE DRAWINGS

The above and other aspects, features and advantages of several embodiments of the present invention will be more apparent from the following more particular description thereof, presented in conjunction with the following drawings.

FIGS. 1A-F are perspective, top, front, rear, bottom and right end views, respectively, of a drip emitter embodying features of the present invention, with the perspective and right end views illustrating the emitter bonded to the inner side of a drip line or tube (shown in broken line), the opposite end view (i.e., left end view) being a mirror image of the end view illustrated;

FIGS. 1G-H are cross-sectional views of the emitter of FIGS. 1A-F taken along line i-i illustrated in FIG. 1B, with FIG. 1G illustrating the tapered portion of the inner baffle wall at its low pressure position to show how fluid can flow over the top thereof, and FIG. 1H illustrating the tapered portion of the inner baffle wall at its high pressure position to show how fluid is prevented from flowing over the top thereof;

FIGS. 2A-D are perspective, top, rear and front views, respectively, of an alternate drip emitter embodying features of the present invention wherein a tongue and fork type arrangement is used instead of a single tapered portion to compensate for pressure fluctuations that the emitter is exposed to when inserted in a supply line, the end and bottom views of this embodiment looking similar to those of the embodiment of FIGS. 1A-F;

FIGS. 3A-D are perspective, top, front and rear views, respectively, of an alternate drip emitter embodying features of the present invention wherein inlet openings of varying heights are used to compensate for pressure fluctuations that the emitter is exposed to when inserted in a supply line;

FIGS. 3E, F and G are additional rear, bottom and perspective views, respectively, of the embodiment of FIGS. 3A-D wherein FIG. 3E illustrates the inlet opening sleeves at a higher pressure position showing at least some of the inlet openings being closed to compensate for an increase in pressure and FIG. 3G illustrates the embodiment of FIGS. 3A-D from a rear left perspective instead of the front right perspective illustrated in FIG. 3A;

FIGS. 5A-B are perspective views of an alternate drip emitter and drip line embodying features of the present invention wherein the pressure-reducing flow channel is made-up of baffles with flexible teeth that move in response to fluid flow through the emitter body;

FIG. 6A is a perspective view of an alternate drip emitter and drip line embodying features of the present invention wherein the pressure-reducing flow channel is made-up of baffles with hollow teeth or teeth that enlarge as fluid pressure increases within the supply line so that the pressure-reducing flow channel has a first cross-section at lower fluid pressures and a second cross-section, smaller than the first, at higher fluid pressures to compensate for the increase in fluid pressure so that the emitter and drip line trickle fluid at a generally constant or desired rate;

FIGS. 6B-C are perspective views of a portion of the flow channel of FIG. 6A illustrating the hollow teeth of the baffle partially enlarged and fully enlarged, respectively, in response to increasing fluid pressure showing how the cross-section of the pressure-reducing flow channel in FIG. 6B has a smaller cross-section than that illustrated in FIG. 6A due to an increase in fluid pressure and showing how the cross-section of the pressure-reducing flow channel of FIG. 6C is even smaller yet than that illustrated in FIG. 6B due to a further increase in fluid pressure;

FIG. 6D is a perspective view of a portion of the bottom of the emitter illustrated in FIG. 6A showing the underside of the hollow teeth members of the baffle and how such surfaces are exposed to the fluid and are affected by an increase in fluid pressure;

FIGS. 7A-B are perspective and perspective cross-sectional views, respectively, of another emitter embodying features of the present invention wherein a unitary body defines first and second walls interconnected together to form a pressure reduction flow channel, the cross-section being taken along lines ii-ii in FIG. 7A;

FIG. 7C-D are top plan and top cross-sectional views, respectively, of the emitter of FIGS. 7A-B, with the cross-section being taken along lines v-v of FIG. 7H;

FIG. 7E is a bottom perspective view of the emitter of FIGS. 7A-D illustrating how the first and second walls form a generally curved channel that increases of pressure will act upon to press the first and second walls toward one another to further restrict fluid flow;

FIGS. 7F-G are side elevation and side cross-sectional views, respectively, of the emitter of FIGS. 7A-E illustrating one form of the first and second walls that combine to restrict fluid flow through the emitter, the cross-section being taken along lines iii-iii in FIG. 7C;

FIGS. 8A-B are perspective and perspective cross-sectional views, respectively, of another emitter embodying features of the present invention wherein a unitary body defines a series of rows of baffles transverse to the longitudinal axis of the emitter and extending into the pressure reduction flow path, with a portion of the baffles varying in height to create a structure that compensates for pressure, the cross-section being taken along line vi-vi in FIG. 8A;

FIGS. 8C-E are top plan, front elevation and bottom perspective views, respectively, of the emitter of FIGS. 8A-B;

FIGS. 9A-B are top and bottom perspective views, respectively, of another emitter embodying features of the present invention wherein a unitary body defines a series of rows of baffles transverse to the longitudinal axis of the emitter and extending into the pressure reduction flow path, and a plurality of outlet baths with at least a portion of outlet passage being movable between first and second positions, the second position defining a fluid passage that is more constrictive than the first position.

Figure 1I:
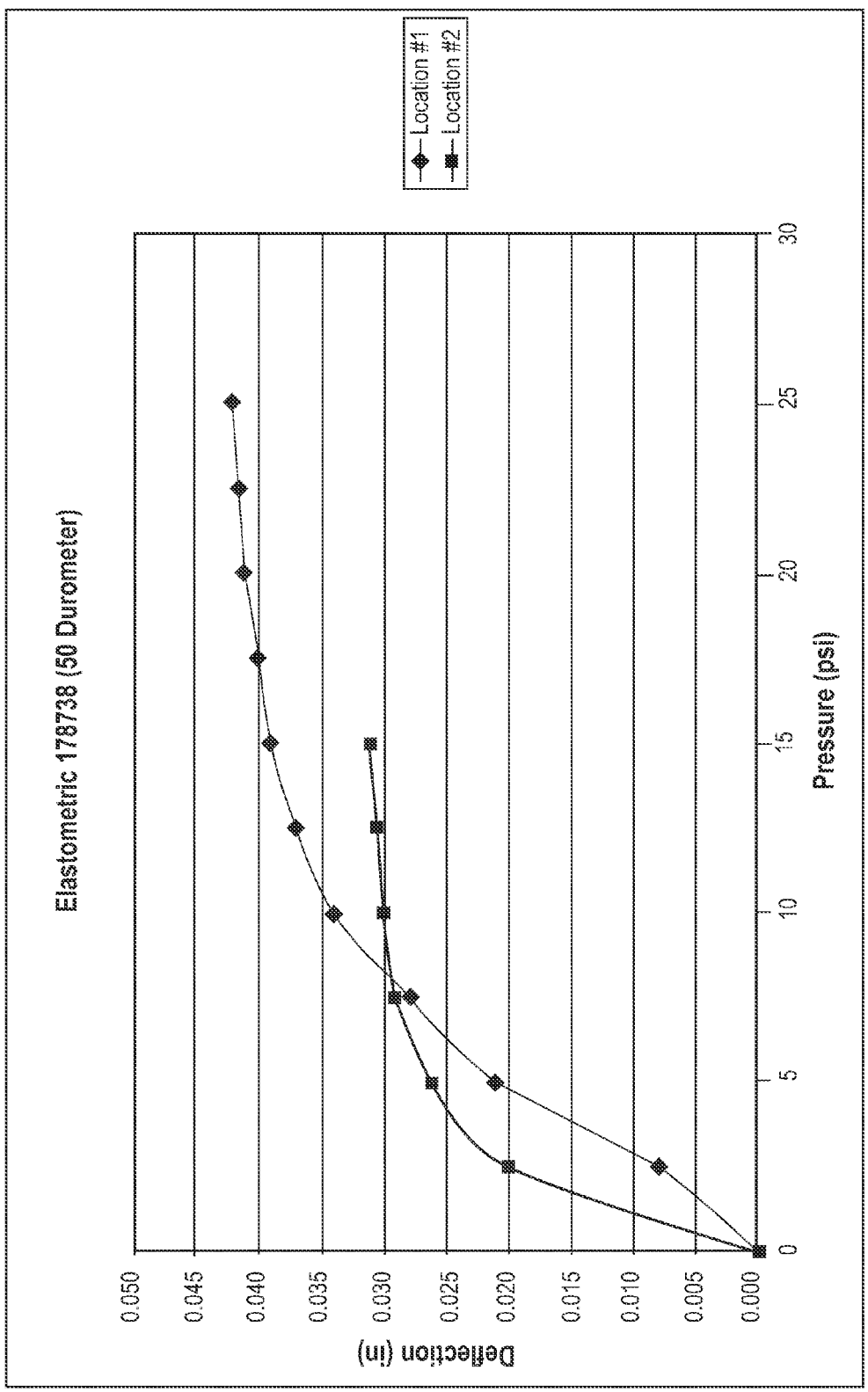
FIGS. 1I-J are charts illustrating the amount of deflection of the tapered portion of the inner baffle wall per increase in pressure at points 1 and 2 along the tapered portion as illustrated in FIG. 1B, with FIG. 1I illustrating deflection vs. pressure for an elastomeric emitter body material having a Durometer value of 50 and FIG. 1J illustrating deflection vs. pressure for an elastomeric emitter body material having a Durometer value of 75.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DESCRIPTION OF THE PREFERRED EMBODIMENTS

As shown in FIGS. 1A-F, a drip irrigation emitter 10 is provided for distributing water from a fluid supply source or conduit, such as drip line or tube 70, at a low flow rate. The drip line 70 carries pressurized fluid throughout an irrigation system and preferably includes numerous emitters 10 spaced apart at predetermined intervals in the dip line 70 in order to allow the drip line 70 to be placed above or below ground to water and/or treat grass, plants, shrubs, trees or other landscaping, or to water agricultural crops of various kinds. In the form illustrated, the emitter 10 includes an integral body 20 which defines an inlet 30 connectable to a source of pressurized fluid, an outlet 40 for discharging the fluid from the emitter body 20, and a pressure reducing flow channel or passage 50 between the inlet 30 and outlet area 40 for reducing the flow of fluid discharged through the outlet 16. In addition, the emitter body 20 defines a pressure compensating member 60 for reducing a cross-section of the flow channel in response to an increase in pressure of the pressurized supply line fluid.

In the form illustrated, the emitter body 20 is made of an elastomeric material, such as a thermoplastic or thermosetting elastomeric material like materials that use ethylene, propylene, styrene, PVC, nitrile, natural rubber, silicone, etc., to form a polymer or copolymer. In a preferred form, the elastomeric material is made of thermoplastic polyolefin (TPO) and silicone rubber. This combination helps create an emitter and drip line that is capable of withstanding the high temperatures and harsh chemicals the emitter may be subjected to while in use. In addition, the emitter is made of a singular or unitary construction rather than having a multi-part construction and/or requiring the assembly of housing parts, diaphragms, etc. This simple construction makes it easier to manufacture the emitter and makes the emitter more grit-tolerant. More particularly, the simple and flexible construction of the emitter can easily process grit or other particulates by expanding to process the grit (aka burping) due to the fact there are no additional housing portions to prevent such expansion. This simple construction also allows the emitter to be flushed more easily by allowing line pressure to be increased to process grit out of the emitter without concern for damaging the emitter because there are no additional pieces, such as multi-part housings, that limit the amount of movement the emitter can make before breaking or coming apart.

Whereas in conventional emitters, even those having two-piece housings, diaphragms and metering grooves to assist in the flushing of grit, the emitter typically reaches a state where further increases is pressure will not increase processing of grit. For example, in conventional emitters, at a certain point of fluid pressure, the pressure on both sides of the diaphragm will eventually become equal and the emitter will cease processing or burping the grit. In the form illustrated, however, the disclosed emitter will continue to process grit with increases in pressure well beyond when conventional emitters stop processing grit (e.g., when this state of equal pressures on opposite sides of the diaphragm are reached). Thus, line pressure can simply continue to be increased in order to drive grit through the emitter body. The elastomeric nature of the emitter body 20 further helps flushing or burping particulates or grit even when simply turning on and off the supply line.

As best illustrated in FIGS. 1E-F, the body 20 defines a plurality of slots 21, 22, 23 and 24, extending longitudinally along the bottom surface of the emitter body 20 which are separated by protrusions, such as guide ribs 25, 26, 27, 28 and 29. The outer most guide ribs 25 and 29 are positioned on the periphery of the bottom surface of emitter body 20 while the inner most ribs 26-28 are positioned on an interior portion separated from the periphery by inlet channel 31. In a preferred form, the inlet channel 31 is sized to deflect foreign materials from obstructing the inlet 30 or entering the emitter body 20 and guide ribs 25-29 have at least one tapered end and run parallel to the longitudinal axis of the emitter body 20 to further help deflect foreign materials from obstructing the inlet channel 31 or entering the emitter body 20. In the form illustrated, the inlet channel 31 extends continuously around or at a perimeter region of the emitter body 20 and empties into the inlet 30. More particularly, in the form illustrated, the inlet channel 31 is a generally oval shaped raceway recessed in the bottom surface of the emitter body 20 having curved ends 31a, 31b and longer straightaways 31c, 31d that run longitudinally along the bottom of body 20. The inlet channel has a generally rectangular cross-section and opens into the inlet 30 via a rectangular shaped opening.

The recessed nature and length of inlet channel 31 helps prevent grit or other particulates from entering into the inlet 30 that could clog the emitter 10 or form obstructions preventing the emitter 10 from operating in the desired manner. More particularly, once installed in the drip line 70, pressurized fluid flows along the bottom side of the emitter body 20 with some fluid entering into the raceway of inlet channel 31 and traveling about the periphery of the emitter body 20 and then, ultimately, into the inlet opening 30. In this manner, the side walls of channel 31 serve to deflect grit and other particulates in the fluid from entering into the inlet channel 31 and into the inlet opening 30. This prevents the emitter 10 from getting clogged and/or having obstructions enter the emitter 10 that might otherwise negatively affect or compromise the desired operation of the emitter. The circular flow that is created by the inlet channel 31 further helps ensure that larger particulates that might fit within the inlet channel 31 will fall out of or be flushed from the channel 31 as the fluid races about the raceway before the fluid enters into the inlet opening 30.

The guide ribs 25-29 serve the dual function of assisting with the mounting of the emitter body 20 into the irrigation drip line and further help deflect grit or particulates in the pressurized fluid away from the inlet channel 31 and inlet opening 30. More particularly, one or more of the guide ribs 25-29 may be used by an insertion tool to align and insert the emitter body 20 into the drip line 70 as the drip line is being extruded. In a preferred form, this is done as the drip line 70 is being extruded so that the upper surfaces of the emitter body 20 are bonded or welded to the drip line 70 while the drip line is hot and before it begins to cool. The guide ribs 25-29 may also be tapered or pointed to assist in the initial loading of the emitter body 20 from a bowl sorter and into the inserter or loader used to insert the emitter body 20 into the freshly extruded drip line 70. Such tapering further assists with getting fluid in the supply line to flow between the narrow passages defined by the ribs 25-29 without causing too much disturbance or adding too much turbulence to the fluid flowing through the supply line 70.

In the form illustrated, the guide ribs 25-29 also help prevent grit or other particulates in the pressurized fluid from entering into the inlet channel 31 and inlet opening 30. More particularly, like the sidewalls of inlet channel 31, the ribs 25-29 create narrowed passageways which help deflect larger particulates away from the inlet channel 31 and inlet opening 30. Thus, the ribs 25-29 deflect away larger particulates from the inlet channel 31 and inlet opening 30 and the sidewalls of inlet channel 31 deflect away smaller particulates that are capable of fitting into the narrowed passageways defined by the ribs 25-29. This prevents the emitter 10 from getting clogged and/or having obstructions enter the emitter 10 that might otherwise negatively affect or compromise the desired operation of the emitter 10.

Figure 4:
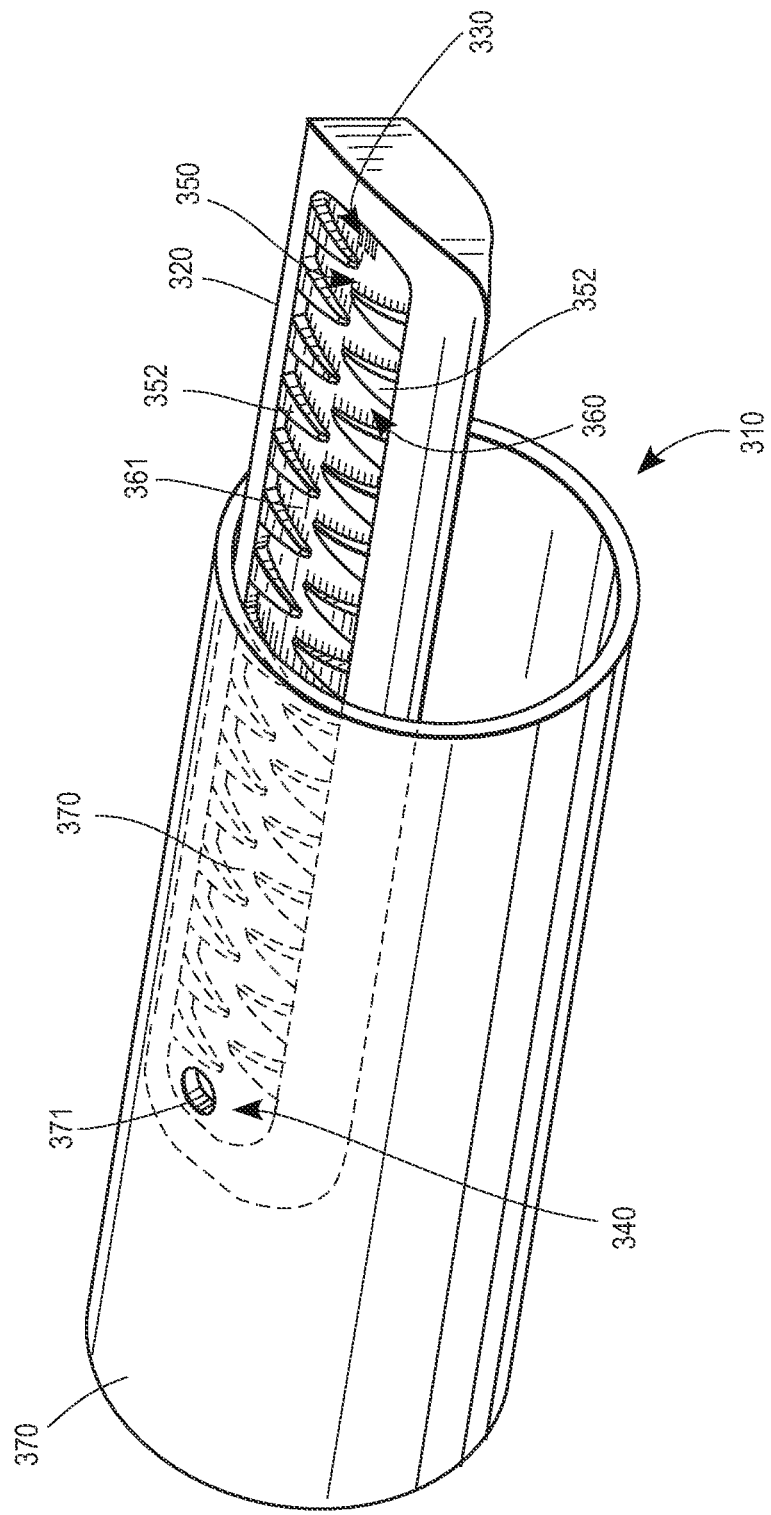
FIG. 4 is a perspective view of an alternate drip emitter and drip line embodying features of the present invention and illustrating an emitter with a baffle design which opens and closes in a non-sequential manner.

In the form illustrated, the inlet opening 30 is generally rectangular in shape and of a desired size to ensure that the emitter 10 receives a desired amount of fluid at a desired fluid flow rate in order to operate as desired. In alternate forms, however, the inlet opening 30 may be designed in a variety of different shapes and sizes to accommodate specific desires or applications. For example, in alternate forms, the inlet opening may be designed as more of an elongated slot or slit, or plurality of slot-like openings as illustrated in FIG. 4 (which will be discussed further below), for receiving fluid but further deflecting grit or particulates that are small enough to pass through the walls of inlet channel 31 or it may be designed to cooperate with the pressure-reduction flow channel 50 to start reducing the flow and pressure of the fluid as it enters the emitter body 20 (e.g., the inlet may form a tortuous passage that leads to the pressure-reduction channel 50). Similarly, the inlet channel 31 may be designed in a variety of different shapes and sizes. For example, instead of a generally oval shape, the inlet channel 31 may be designed to be a smaller slot that extends over a small portion of emitter body 20 instead of traveling about a periphery of the bottom of the emitter body 20, or may be designed with a zigzag pattern to form a tortuous path to further assist in reducing pressure of the fluid passing through the emitter body 20 (similar to that of the flow path 50, which will now be discussed in further detail).

With respect to the fluid that makes it through the passageways defined by ribs 25-29 and into the inlet channel 31, this fluid passes through the inlet opening 30 and enters a pressure-reducing flow channel 50 that produces a significant reduction in pressure between the fluid flowing in the primary lumen of the supply conduit or drip line 70 and the fluid ultimately emptying into and present in the emitter outlet area 40. In the form illustrated, the emitter body 20 defines opposed baffle walls to create the pressure-reducing flow channel and, in a preferred form, has an inner baffle wall 51 that is surrounded by an outer baffle wall 52 which extends about the inner baffle wall 51 in a generally U-shaped manner to form a flow passageway that generally directs the water in a U-shaped direction of travel. More particularly, the inner and outer baffle walls 51, 52 have alternating projections and recesses that form a tortuous passage and cause the fluid flowing therethrough to zigzag back and forth, reducing pressure with each turn the fluid makes. The outer baffle wall 52 is defined by an outer rim or peripheral wall of the emitter body 20 and the inner baffle wall 51 extends from a portion of the outer rim or peripheral wall and into to the middle of the emitter body 20 to form a peninsula about which the fluid flows from inlet 30 to outlet 40. The upper surfaces of the emitter body preferably have a radius of curvature that tracks the radius of curvature of the tube 70 so that the emitter body 20 can be bonded securely to the inner wall of the tube 70 and create an enclosed pressure reduction passage from inlet 30 to outlet 40. In the form illustrated, the tortuous passage is formed via alternating teeth extending from opposing surfaces of the inner and outer baffle walls 51, 52 and has a cross-section that is generally rectangular in shape when the emitter body 20 is bonded to the inner surface of the extruded drip line 70 (keeping in mind that the radius of curvature of the tube 70 will likely make the upper portion of the cross-section slightly curved and the side walls to be slightly wider at their top than at their bottom).

It should be understood, however, that in alternate embodiments the pressure-reducing flow channel 50 may be made in a variety of different shapes and sizes. For example instead of having projections with pointed teeth, the baffles could be made with blunt or truncated teeth, with teeth that are angled or tapered, with curved or squared projections instead of triangular shaped teeth, with projections of other geometrical shapes or geometries, symmetric or asymmetric, etc.

In the form illustrated, the pressure-reducing flow channel 50 also includes an intermediate bath 53 that the fluid pours into as it makes the turn in the generally U-shaped direction of travel which further causes pressure reduction as the water is flowing from a smaller passage to a larger passage in the bath 53. After making the turn, the fluid passes or zigzags through another section of the pressure-reducing flow channel 50 and empties into outlet pool 40.

In addition to the pressure-reducing flow path 50, the emitter 10 further includes a pressure compensating feature 60 which further allows the emitter 10 to compensate for increases in fluid pressure in the primary lumen of the tube 70. More particularly, pressure compensating feature 60 allows the emitter 10 to maintain relatively constant outlet fluid flow and pressure even though the inlet fluid pressure may fluctuate from time-to-time. In the form illustrated, the pressure compensating feature 60 is a two part pressure compensation mechanism that comprises an elastomeric portion 61 capable of deflecting under pressure to reduce the cross-section of the pressure-reducing flow channel 50 and regulate fluid flow through the emitter, and a movable baffle portion 62 capable of changing the length of the flow channel to compensate for changes in supply line 70 fluid pressure.

The elastomeric portion 61 being a deflectable portion of the emitter body 20 that is movable between a first position wherein at least a portion of the pressure-reducing flow channel 50 is of a first cross-section and a second position wherein the at least a portion of the pressure-reducing flow channel 50 is of a second cross-section, smaller than the first cross-section to regulate fluid flow through the emitter, in the form illustrated, the floor 61 of the flow channel 50 forms an elastomeric portion and raises and lowers in response to increases and decreases in supply line 70 fluid pressure, respectively. Thus, when fluid pressure increases in the supply line 70, the floor 61 of the flow channel 50 is pressed-up or deflected up into the flow channel 50 thereby reducing the cross-section of the flow channel to regulate the flow of fluid through the emitter 10. Conversely, when fluid pressure in the supply line 70 reduces, the floor of the flow channel 50 retreats from the flow channel back to a normal position wherein the floor is not deflected up into the flow channel thereby increasing the cross-section of the flow channel to allow fluid to flow more freely through the flow channel 50.

Although the above embodiment has been described with the floor of the flow path 50 deflecting up into the emitter flow path to reduce cross-section size of the flow path to compensate for increases in fluid pressure, it should be understood that in alternate embodiments other emitter surfaces could be designed to either create this deflection on their own or to cooperate with the floor or other surface so that both deflect in order to compensate for fluid pressure increases. For example, rather than having the floor deflect, the side walls and/or ceiling of the flow channel 50 could be designed to deflect either in combination with any one of these items or on their own as the sole deflecting portion.

The second part of the pressure compensation mechanism 60 comprises a movable structure, such as movable baffle portion 62, which is capable of moving between a first low pressure position wherein the length of the flow channel 50 is of a first distance and a second high pressure position wherein the length of the flow channel 50 is of a second distance wherein the length of the flow channel is longer than the first distance to compensate for increase pressure in the supply line 70. More particularly, in the form illustrated, the movable baffle portion 62 deflects up and down with the floor of the flow channel 50 to sealingly engage and disengage the movable baffle portion 62 with the inner wall of the supply line 70, respectively, and thereby lengthen or shorten the extent of the flow channel for at least some fluid flowing therethrough to compensate for changes in supply line fluid pressure.

As best illustrated in FIGS. 1C, D and G, the movable baffle portion 62 comprises a tapered portion of the central or inner baffle wall 51 that tapers down away from the inner surface of supply line 70 so that at lower fluid pressures in supply line 70, fluid flows through the inlet 30 and first section (or upstream section) of flow channel 50 and then over the top of the tapered baffle section 62, through the second section (or downstream section) of the flow channel 50 and then into outlet pool 40. Fluid may flow through the remaining portion of the flow channel 50 including intermediate bath 53 (located between the upstream and downstream sections of the flow channel 50), but it does not have to nor does all of the fluid flow through these portions of the flow channel 50 clue to the gap between the upper surface of the tapered inner baffle wall section 52 and the inner surface of tube 70. As fluid pressure increases in the fluid supply line 70 and as best illustrated in FIG. 1H, the floor of the flow channel 50 starts to deflect upwards and into the flow channel 50 moving the tapered baffle section 62 toward the inner surface of tube 70 thereby reducing the gap between these two until the upper surface of the tapered baffle section 62 sealingly engages the inner wall of the tube 70 thereby preventing fluid from flowing over the top of the tapered baffle section 62 and lengthening the amount of the flow channel 50 through which all of the fluid must flow and reducing fluid pressure and flow due to same.

The emitter body 20 further defines an outlet area 40 which forms a pool into which the fluid that passes through inlet 30 and tortuous passage 50 and pressure compensation mechanism 60 collects or gathers. An outlet in outer supply line 70, such as opening 71, provides access to the fluid collected in the outlet pool. 40 and, more particularly, provides an egress for the fluid to trickle or drip out of emitter 10.

Since the emitter 10 is made of an integral body 20, the outlet area 40 is provided with obstructions or stops, such as posts or nubs 41, that prevent the outlet are 40 from collapsing when the fluid pressure of supply line 70 raises to a level sufficient for deflecting the floor of the flow channel 50 into the flow channel 50 to reduce the cross-section of same and regulate fluid flow through the flow channel (or as the movable structure 62 moves from the first or low pressure position to the second or high pressure position). In the form illustrated, the posts 41 extend away from the body 20 and are generally frustoconical in shape to make the posts easier to mold when the body 20 is molded. In addition, in a preferred form, the upper surfaces of the posts 41 have a radius of curvature common to the radius of curvature of the upper surfaces of baffles 51, 52 and that corresponds with a second radius of curvature of the inner wall of tube 70. The solid nature of the baffle walls 51, 52 and outer rim or peripheral wall of emitter body 20 likewise prevent these portions of the emitter body 20 from collapsing when the fluid pressure of supply line 70 pushes the floor of the flow channel 50 into the flow channel.

Although the form illustrated in FIGS. 1A-D shows the outlet 71 of outer tube 70 as a round opening, it should be understood that in alternate embodiments this may be provided in a variety of different shapes and sizes. For example, in one form the outer tube outlet 71 may be provided in the form of a slit, such as an elongated narrow oval shape, instead of a round hole. In other forms, the outer tube outlet 71 may further define a pressure reducing passageway such as a tortuous or zigzag passage.

Figure 1J:
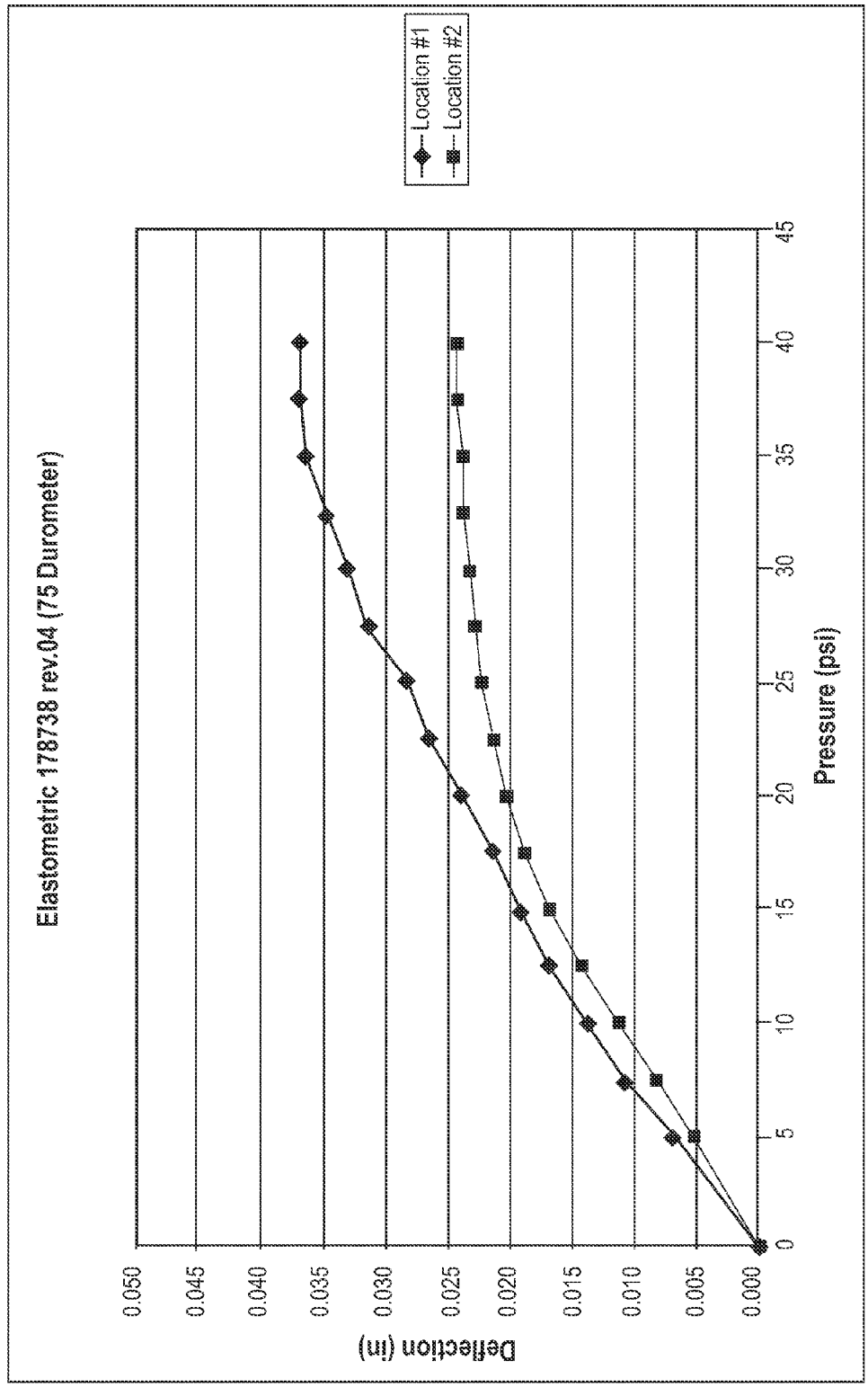

By using a unitary emitter body 20 to form the inlet 30, flow channel 50, outlet 40 and pressure compensating mechanism 60 rather than requiring multiple parts to be constructed and assembled to form such features, the emitter 10 is much easier to manufacture and provides significant cost savings due to the reduction in parts and materials, and assembly time. The body 20 may be made of any type of material capable of allowing for this type of movement for pressure compensation. In a preferred form, however, the body 20 is made of TPO having a Durometer reading ranging between 25 and 100, with the Durometer reading preferably being between 50 and 75. In FIGS. 1I-J, data is provided for the amount of deflection per increase in pressure for materials having Durometer readings of 50 and 75, respectively. In these examples, data was collected at location points 1 and 2, as indicated in FIG. 1B, with the distance (or gap) between the inner surface of tube 70 and the upper surface of the tapered inner baffle wall portion 62 being thirty thousandths of an inch (0.030") at location point 1 and thirteen thousandths of an inch (0.013") at location point 2, and the floor thickness of flow channel 50 being eight thousandths of an inch (0.008"). These distances being calculated when the tapered baffle wall portion 62 is at its normal position (or low pressure/non-deflected position) as illustrated in FIG. 1G.

As can be seen in comparing FIGS. 1I-J, a quicker movement of the tapered baffle wall portion 62 and corresponding lengthening of the flow channel 50 can be achieved using a material with a lower Durometer reading (e.g., a softer material), whereas a more constant movement (almost linear at times) of the tapered baffle wall portion 62 may be achieved by using a material with a higher Durometer reading (e.g., a harder material). Thus, the specific application the emitter 10 is intended for may play a role in the material selected for emitter body 20 (e.g., if a quicker lengthening of the flow channel 50 is desired a material with a lower Durometer reading will be used, whereas if a more gradual closing of the tapered baffle wall portion 62 and more gradual lengthening of the flow channel 50 is desired a material with a higher Durometer reading will be used, etc.).

In order to ensure the consistency of operation for each emitter 10 mounted to the extruded supply line 70, care is taken to make sure that the various portions of body 20 are constructed with consistent thickness and density from one emitter to the next and that the distances between location points 1 and 2 and the inner surface of supply line 70 are maintained consistently from one emitter to the next. In doing so, the emitters 10 mounted to the supply line 70 should operate in a uniform manner and produce common low pressure fluid flow and flow rates at their respective outputs 40 (e.g., the flow rate of the first emitter mounted in the supply line should operate the same as the last emitter mounted in the supply line).

In an alternate form, the emitter and drip line may be made-up of a multi-part construction and/or use a multi-step manufacturing or assembly process. For example an emitter body of a first type of material may be combined with another type of material (e.g., a structure, a layer, a coating, etc.) that is more easily bonded to conventional drip tubing so that emitter can be bonded to the tubing in a more consistent manner and each emitter is ensured to work similar to one another. More particularly, since soft materials, such as silicon, do not always bond easily to the various types of conventional drip line tubing used in the industry, which is typically polyethylene tubing, the emitter body may be made-up of a combination of soft and hard materials to assist in the bonding of the emitter to the extruded tubing and to provide a process that can repeatedly bond such emitters to extruded tubing so that there is no significant (if any) variance in bonding between the emitters bonded to the tubing.

For example, by combining a soft material like silicon with a hard material like a polyethylene, the hard portion of the emitter may more easily be bonded to the extruded tubing in a uniform and repeatable fashion. Although this form of emitter and tubing may be considered by some to be a two-part construction, it would preferably remain housingless and the soft portion of the emitter would make up the majority of the component. For example, in one form the hard portion of the emitter would simply comprise a polyethylene coating applied to an upper surface of the emitter to assist in consistently bonding the emitter to the inner surface of the drip line tubing in a manner that can be repeated easily from emitter to emitter. Not all of the upper surfaces of the emitter body need to be coated with the polyethylene coating and/or connected to the inner surface of the drip line tubing. Thus, in this example, the emitter continues to comprise a singular or uniform structure through which fluid flows that simply has a bonding layer or agent of polyethylene which assists in connecting the emitter to the inner surface of the drip line tubing. In addition, this configuration would still produce an emitter that can process grit better than conventional emitters, including those with multi-part housings, diaphragms and metering grooves. In alternate forms, true two-piece constructions may be used to form the emitter body if desired with either piece making up a majority of the structure or both making-up equal portions of the structure and/or either piece or both making up portions of the inlet, flow channel or outlet as desired.

Turning now back to FIGS. 1A-F, a housingless irrigation drip emitter 10 is provided for attachment to only a portion of an inner circumference of an inner surface of an irrigation drip line tube 70 having an elastomeric emitter body 20 integrally defining an inlet 30 for receiving pressurized fluid from a fluid supply source, an outlet area 40 for discharging the fluid from the body 20, a pressure reducing flow path 50 extending between the inlet 30 and the outlet area 40 for reducing the pressure and flow of fluid received at the inlet 30 and discharged through the outlet area 40, and a pressure compensating portion 60 for automatically adjusting the pressure and fluid flow reducing effect of the flow channel 50 in response to a change in pressure of the fluid supply source 70, wherein the pressure reducing flow channel 50 includes an inner baffle wall 51 and an outer baffle wall 52 that extends about the inner baffle wall 51 in a generally U-shaped manner. The baffle walls 51, 52 having upper surfaces that have a first radius of curvature that corresponds with a second radius of curvature of an inner wall of the irrigation drip line tube 70, and the inner baffle wall 51 having a first portion of constant height and a second portion 62 of tapering height, the second portion 62 being movable between a first position wherein the upper surface of the second portion 62 is not level with the upper surface of the first portion such that fluid can flow over the upper surface of the second portion at predetermined low fluid pressures and a second position wherein the upper surface of at least a portion of the second portion 62 is level with the upper surface of the first portion and fluid cannot flow over the level upper surfaces of the second portion 62 such that the cross-section of the flow channel is reduced and the length of the flow channel is effectively lengthened.

In the form illustrated, the baffles of the inner and outer baffle walls 51, 52 do not close sequentially when the second portion 62 of inner baffle 51 moves from the first position to the second position, but rather, the teeth of the baffle walls 51, 52 on opposite ends of the flow passage 50 (i.e., some on the inlet end and some on the outlet end) close at the same time. This allows the moving portion 62 of inner baffle 51 to gradually lengthen the extent of the flow passage 50 as supply line fluid pressure increases and to gradually shorten the extent of the flow passage 50 as supply line fluid pressure decreases without having to worry about trying to sequentially close the baffles of the pressure-reducing passage 50.

In alternate embodiments, it should be understood that alternate portions of the emitter body 20 may be moved to compensate for increases in fluid line pressure, either in conjunction with or in lieu of those discussed above. For example, in one alternate form, the emitter body 20 may be designed so that additional sections of the baffle walls 51, 52 may be moved to compensate for pressure increases in the supply line 70. More particularly and as illustrated in FIGS. 2A-D, both the inner baffle wall and outer baffle wall may be designed to move and lengthen the flow path to compensate for increases in supply line fluid pressure. For convenience, items which are similar to those discussed above with respect to emitter 10 in FIGS. 1A-F will be identified using the same two digit reference numeral in combination with the prefix "1" merely to distinguish one embodiment from the other. Thus, the emitter body identified in FIGS. 2A-D is identified using the reference numeral 120 since it is similar to emitter body 20 discussed above. Similarly, the inlet, outlet and pressure-reducing flow channel are identified using reference numerals 130, 140 and 150 since they are similar to the above-mentioned inlet, outlet and flow channel 30, 40 and 50.

While the emitter body 120 of FIGS. 2A-F defines both a pressure-reducing flow channel 150 and a two part pressure compensating mechanism 160 having an elastomeric portion 161 and movable baffle portion 162 like the embodiment of FIGS. 1A-H, the movable baffle portion 163 in FIGS. 2A-F is made up of portions of the inner and outer baffle walls 151, 152 rather than just the inner baffle wall 151. More particularly, the inner and outer baffle walls 151, 152 move to compensate for fluid pressure increases and decreases in the supply line fluid. In the form illustrated, the central or inner baffle wall 151 tapers at its distal end into a tapered tongue-type structure or projection 163 to form a first movable structure and the outer baffle wall 152 defines a mating fork or groove-type structure 164 that corresponds in shape to the tongue-type structure 163 to form a second movable structure.

Figure 2A:
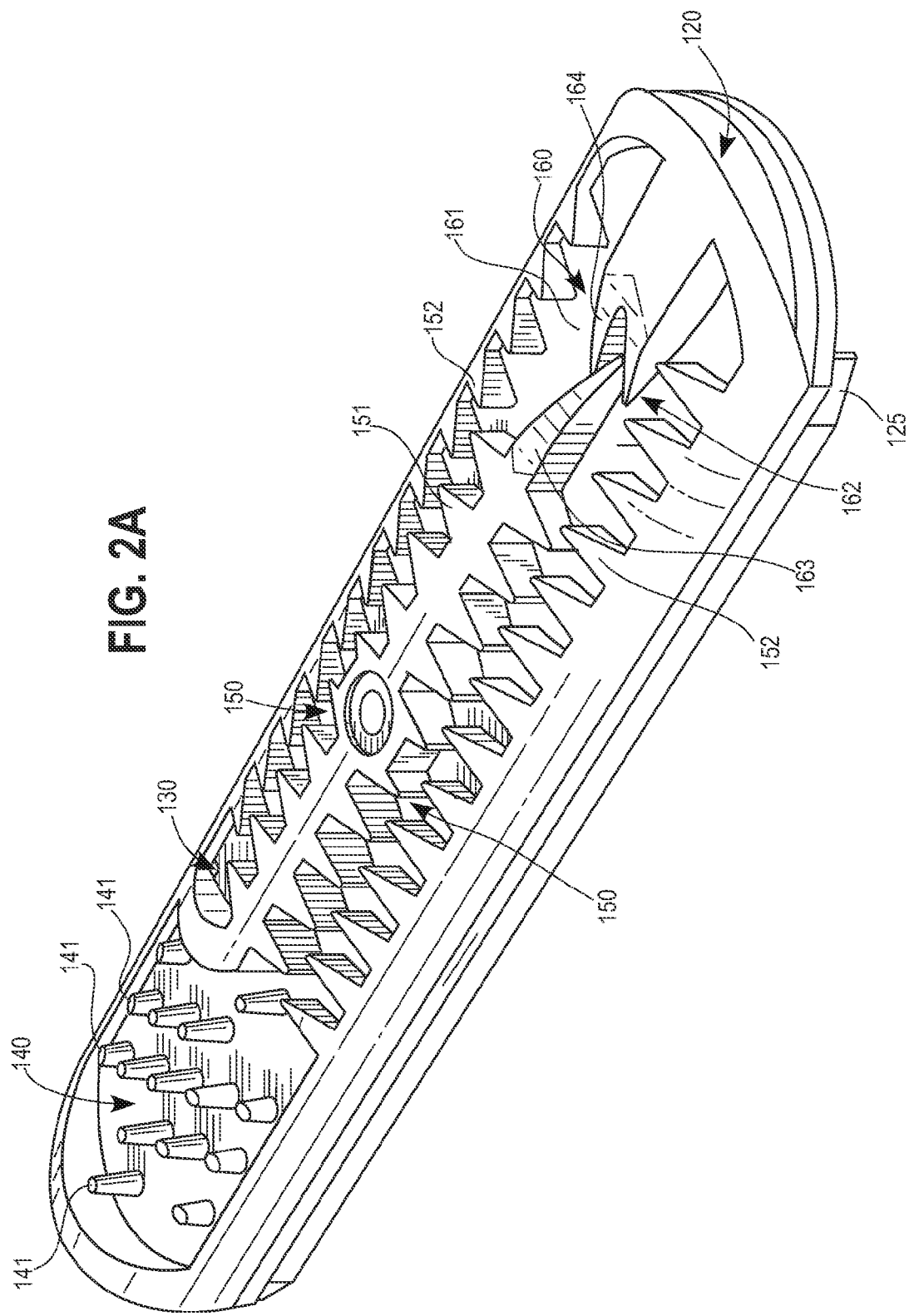
Figure 2D:
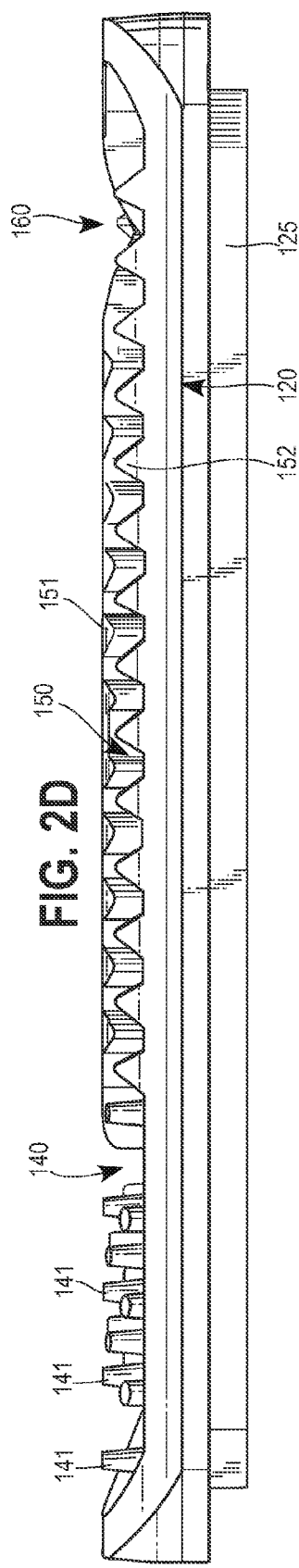
Figure 2F:
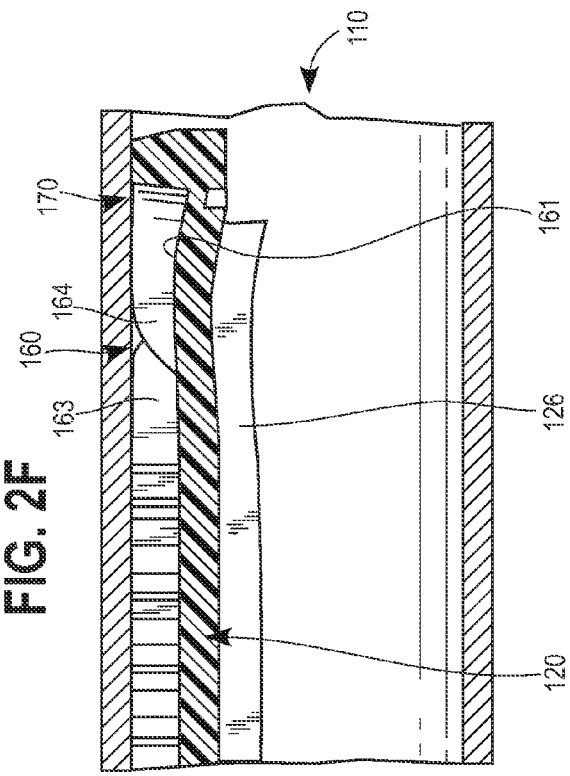
FIGS. 2E-F are cross-sectional views of the emitter of FIGS. 2A-D taken alone line i-i illustrated in FIG. 2B, with FIG. 2E illustrating the tongue and fork arrangement as their low pressure position to show how fluid can flow over the top thereof, and FIG. 2F illustrating the tongue and fork arrangement at their high pressure position to show how fluid is restricted from flowing over the top thereof.
Figure 2E:
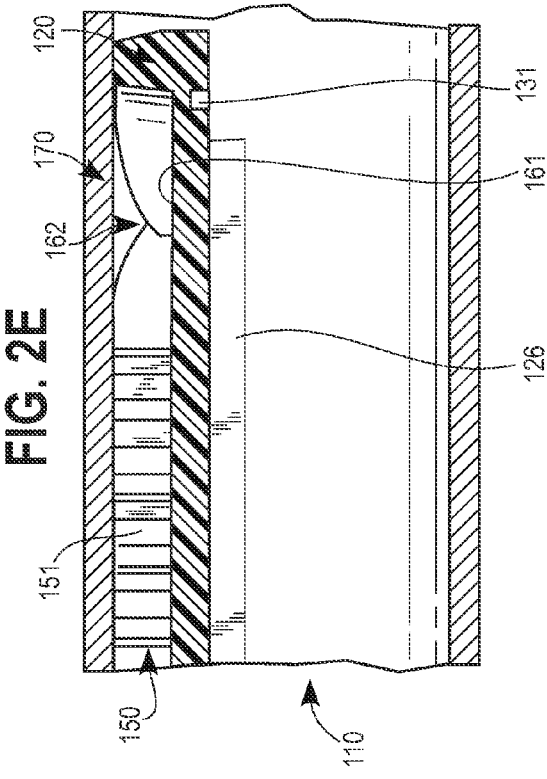
Figure 3F:
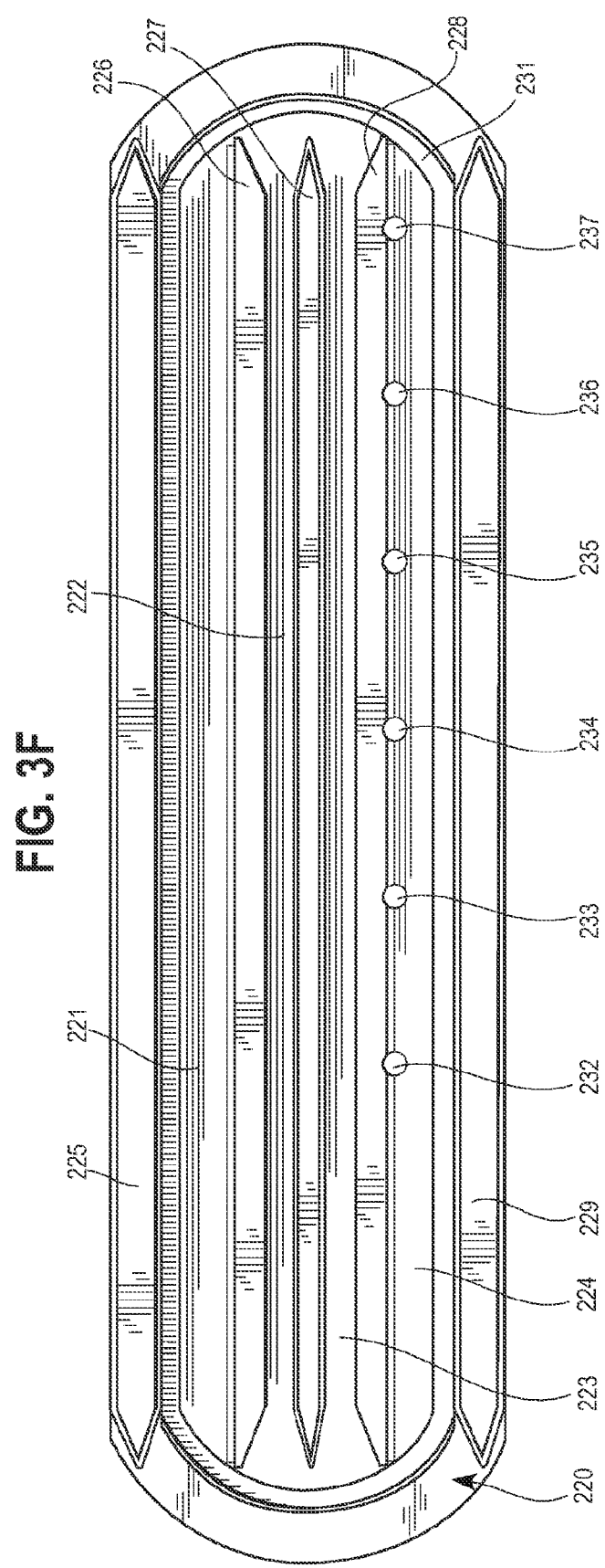

As best illustrated in FIG. 2F, the tongue and fork or groove structures 163, 164 cooperate with one another so that when the floor 161 of the flow channel 150 rises in response to increases in supply line pressure, the tapered structures 163, 164 both rise toward the inner surface of the tube 170 thereby reducing the amount of fluid that can flow over the upper surfaces of the tapered structures 163, 164 and effectively lengthening the flow channel 150 and reducing the cross-section of the flow channel 150 to compensate for the increase in supply line fluid pressure. Similarly, when the floor 161 of flow channel 150 falls in response to a decrease in supply line pressure, the tapered structures 163, 164 both move away from the inner surface of the tube 170 thereby increasing the amount of fluid that can flow over the top of the upper surfaces of the tapered structures 163, 164 and effectively shortening the length of the flow channel 150 and increasing the cross-section of the flow channel 150 to compensate for the decrease in supply line fluid pressure as illustrated in FIG. 2E.

In the form illustrated, the upper surfaces of the tapered structures 163, 164 never fully seal against the inner wall of the tube 170 when moved to their high pressure position, however, in alternate forms, the tapered structures 163, 164 could be designed such that this occurs if desired. Similarly, the embodiment of FIGS. 1A-H could be designed so that the upper surface of the tapered baffle section 62 does not seal completely against the inner surface of the tube 70, if desired.

It should be understood that in alternate embodiments the first and second movable structures 163, 164 of the inner and outer baffle walls 51, 52 could be swapped so that the inner baffle wall 51 terminated in a groove-type structure and the outer baffle wall 52 defined a tongue-type structure, or in yet other forms both could define other structures meant to correspond with one another or mesh with one another to achieve the same effect of lengthening and shortening the flow channel 50 in response to increases and decreases in supply line fluid pressure, respectively, and if desired, reducing and increasing the cross-section of the flow channel 150 in response to increases and decreases in supply line fluid pressure, respectively. For example, in alternate forms, both the inner and outer baffle walls 51, 52 could define structures that correspond in shape with one another including but not limited to intermeshing U- or V-shaped structures that lengthen the flow channel 150 and reduce the cross-section of the flow channel 150 in response to increases in fluid pressure and that shorten the flow channel 150 and increase the cross-section of the flow channel 150 in response to decreases in fluid pressure.

Thus, with this configuration an irrigation drip emitter 110 is provided for attachment to only a portion of an inner circumference of an inner surface of an irrigation drip line tube 170 having an elastomeric emitter body 120 integrally defining an inlet 130 for receiving pressurized fluid from a fluid supply source, an outlet area 140 for discharging the fluid from the body 120, a pressure reducing flow path 150 extending between the inlet 130 and the outlet area 140 for reducing the pressure and flow of fluid received at the inlet 130 and discharged through the outlet area 140, and a pressure compensating portion 160 for automatically adjusting the pressure and fluid flow reducing effect of the flow channel 150 in response to a change in pressure of the fluid supply source 170, wherein the pressure reducing flow channel 150 includes an inner baffle wall 151 and an outer baffle wall 152 that extends about the inner baffle wall 151 in a generally U-shaped manner. At least some of the upper surfaces of the baffle walls 151, 152 having a first radius of curvature that corresponds with a second radius of curvature of an inner wall of the irrigation drip line tube 170 and the inner baffle wall 151 defines a first tapered baffle structure 163 and the outer baffle wall 152 defines a second tapered baffle structure 164 positioned proximate the first baffle structure 163, with the first and second tapered baffle structures 163, 164 cooperating to form part of the pressure reducing flow channel 150 and the first and second tapered baffle structures 163, 164 tapering in height toward one another and being variably movable between a first position wherein the upper surfaces of the first and second tapered baffle structures 163, 164 are not level with the upper surfaces of the baffle walls with the first radius of curvature so that fluid can flow over the first and second tapered baffle structures 163, 164 and a second position wherein the upper surfaces of the tapered baffle structures 163, 164 move toward and/or are at the same level as the other upper surfaces of the baffle walls with the first radius of curvature and fluid is restricted from flowing over at least a portion of the first and second tapered baffle structures 163, 164 and the cross-section of the flow channel 150 proximate the first and second baffle structures 163, 164 is reduced and the length or extent of the flow channel 150 is lengthened.

In yet other embodiments, the two part pressure compensating mechanism may use other types of movable walls in combination with a deflecting member to compensate for changes in fluid pressure. For example, in the alternate embodiment illustrated in FIGS. 3A-G, the emitter body is designed with a plurality of fluid inlet openings with sleeves or annular walls extending therefrom, which can move in response to increases and decreases in supply line fluid pressure. For convenience, items which are similar to those discussed above with respect to emitter 10 in FIGS. 1A-F and emitter 110 in FIGS. 2A-F will be identified using the same two digit reference numeral in combination with the prefix "2" merely to distinguish this embodiment from the others. Thus, the emitter body identified in FIGS. 3A-F is identified using the reference numeral 220 since it is similar to emitter bodies 20 and 120, and defines an inlet 230, outlet 240 and pressure-reducing flow channel 250, which are similar to those discussed above (i.e., inlet 30, 130, outlet 40, 140, and pressure-reducing flow channel 50, 150). In addition, the upper surfaces of the peripheral wall of emitter body 220, inner and outer baffle walls 251, 252, and nubs 241 all have a first common radius of curvature that corresponds with a second radius of curvature of an inner wall of the irrigation drip line tube 270.

Unlike the embodiments discussed above, however, the inlet 230 of emitter body 220 comprises a plurality of inlet openings 232, 233, 234, 235, 236 and 237. In the form illustrated, the inlet openings 232-237 vary in height, with the initial inlet opening 232 being flush to the floor 261 of the pressure-reducing flow channel 250 and the remaining inlet openings 233-237 having annular walls, such as sleeves or bosses 233a, 234a, 235a, 236a and 237a, respectively, that have terminal ends that progressively extend further into the pressure reducing flow channel 250 with the terminal end of each boss moving variably from an open position wherein the terminal end of the boss is not generally level or flush with the first common radius of curvature of the upper surfaces of the baffle walls 251, 252 so that fluid can flow through the boss and into the flow channel 250, and a closed position wherein the terminal end of the boss is generally level or flush with the first common radius of curvature of the upper surfaces of the baffle walls 251, 252 so that fluid is prevented from flowing through the boss and into the flow channel 250.

In a preferred form, the upper surfaces of the terminal end of the bosses 233a-237a have a radius of curvature that is the same as the first common radius of curvature of the upper surfaces of baffle walls 251, 252 which corresponds with the second radius of curvature of the inner wall of the irrigation drip line tube 270 so that the bosses 233a-237a can close flush against the inner wall of tube 270 and prevent fluid from flowing through the boss and into the flow channel 250 when raised into engagement with the inner wall of tube 270. In addition, the height of the bosses 233a-237a are varied so that the inlets 233-237 close sequentially starting with the inlet furthest from the initial inlet opening 232 (i.e., which in the illustrated example is inlet 237) and then moving to the inlet that is the next furthest (i.e., 236), then the next furthest (i.e., 235) and so on. By closing the inlets 233-237 in this order (i.e., starting with the inlet furthest downstream and moving upstream), the emitter body 220 actually lengthens the pressure-reducing passage 250 with each sequential closing for all fluid flowing therethrough which allows the emitter to compensate for increases in the supply line fluid pressure. Conversely, as supply line fluid pressure decreases, the emitter body opens the inlets 233-237 beginning with the inlet furthest upstream and moving downstream, which allows the emitter to shorten the pressure-reducing passage 250 for some of the fluid flowing through the emitter to compensate for the reduction in supply line fluid pressure.

In the form illustrated, it is contemplated that each of inlet openings 233-237 will close during normal operation of the emitter 210 or that the emitter body 220 will be designed such that inlet openings 233-237 will normally close at some point during the operation of the emitter due to expected increases in supply line fluid pressure (i.e., that enough pressure is expected to be reached that will cause inlets 233-237 to close at some point or another. However, it should be understood that in alternate embodiments the emitter body 220 may be designed to only shut one or more of the inlets 233-237 during normal or expected supply line fluid pressure conditions and only having the remaining inlets 233-237 close under extraordinary conditions (e.g., when supply line fluid pressures are reached that are much greater than normal or expected pressures). This can either be done by altering the size of the emitter body 220 or any of its features (e.g., inlet opening, floor thickness, baffle wall size, flow path cross-section, etc.) or by using different materials for body 220 (e.g., materials with different Durometer values, different compositions that make the body 220 harder or less flexible, etc.). Conversely, the emitter body 220 may be made of materials that allow for inlets 233-237 to close more rapidly if desired (e.g., by altering body features and/or selecting different materials as discussed above). In this way, the emitter 10 can be customized for specific applications.

Thus, with this configuration an irrigation drip emitter 210 is provided for attachment to only a portion of an inner circumference of an inner surface of an irrigation drip line tube 270 having an elastomeric emitter body 220 integrally defining an inlet 230 for receiving pressurized fluid from a fluid supply source, an outlet area 240 for discharging the fluid from the body 220, a pressure reducing flow path 250 extending between the inlet 230 and the outlet area 240 for reducing the pressure and flow of fluid received at the inlet 230 and discharged through the outlet area 240, and a pressure compensating portion 260 for automatically adjusting the pressure and fluid flow reducing effect of the flow channel 250 in response to a change in pressure of the fluid supply source 270, wherein the pressure reducing flow channel 250 includes an inner baffle wall 251 and an outer baffle wall 252 that extends about the inner baffle wall 251 in a generally U-shaped manner. With at least some upper surfaces of the baffle walls 251, 252 having a first common radius of curvature that corresponds with a second radius of curvature of an inner wall of the irrigation drip line tube 270, and the inlet 230 includes a plurality of inlet passages 232-237 with each passage 232-237 extending from a surface of the body exposed to the pressurized fluid to the pressure reducing flow channel 250, with at least some of the inlet passages 233-237 extending through bosses each having a terminal end progressively extending further into the pressure reducing flow channel 250, the terminal end of each boss being movable variably from an open position wherein the terminal end of the boss is not level with the upper surfaces of the baffle walls having the first radius of curvature so that fluid can flow through the boss and into the flow channel 250 and a closed position wherein the terminal end of the boss is generally level with the upper surfaces of the baffle walls having the first radius of curvature so that fluid is prevented from flowing through the boss and into the flow channel 250.

It should be understood that in alternate embodiments the sleeves or bosses 233a-237a may take on other shapes and sizes as may be desired for specific applications. For example, in some applications inlets with rectangular cross sections may be desired over the round inlets depicted in FIGS. 3A-G. In yet other forms, inlet passages that serve some form of pressure reduction, such as passages that define tortuous paths, may be desired. In still other embodiments, fewer or more inlet openings or bosses may be provided than those shown in FIGS. 3A-G if desired. For example, in FIG. 4, an alternate drip emitter and drip line is illustrated having an inlet made-up of a plurality of inlet openings. In keeping with the above practice, features that are common to those discussed above will use the same two-digit reference numeral, but having the prefix "3" merely to distinguish one embodiment from another.

In the form illustrated in FIG. 4, the plurality of inlets are shaped like elongated openings, such as slits or slots 330, which not only allow fluid to flow through the inlet of the emitter 310, but also help filter or deflect particulates such as grit away from the emitter 310 to help ensure the fluid flowing through the emitter 310 is free of such particulates so that the particulates do not interfere with the operation of the emitter 310. The plurality of openings 330 have longitudinal axes that parallel the longitudinal axis of the emitter 310, however, in alternate forms it should be understood that the plurality of openings may take on a variety of different shapes and sizes and may be oriented in different ways so as not to have longitudinal axes parallel to the longitudinal axis of the emitter 310 (if even having longitudinal axes).

In alternate forms, it should be understood that the inlet or inlets of the emitter may be placed in certain positions to help determine how the emitter will operate. For example, in some forms, an inlet opening may be positioned further upstream to effectively shorten the length of the pressure-reducing flow channel and create an emitter that has a higher fluid flow rate (e.g., four gallons per hour or 4 GPH). In another form the inlet opening may be positioned further downstream to effectively lengthen the pressure-reducing flow channel and create an emitter that has a lower flow rate (e.g., 1 GPH). In still another form, the inlet opening may be positioned somewhere in-between the above mentioned locations to create an emitter with an intermediate pressure-reducing flow channel length that has a flow rate somewhere in-between the other flow rates (e.g., 2 GPH). The changing of this inlet location could be accomplished by having a readily adjustable mold (e.g., one where the location of the inlet opening can be slid or moved between the desired locations) or, alternatively, separate molds could be made for each embodiment (i.e., one for the low flow rate emitter, another for the intermediate flow rate emitter, and another for the high flow rate emitter).

The same may be true for outlet openings. For example, when manufacturing the drip line, the location of the outlet opening may be altered to affect how the emitter will operate. The outlet opening could be located further upstream to effectively shorten the pressure-reducing flow channel and create an emitter with a higher flow rate (e.g., 4 GPH). In another form the outlet opening may be located further downstream to effectively lengthen the pressure-reducing flow channel and create an emitter with a lower flow rate (e.g., 1 GPH). In another form, the outlet opening may be positioned somewhere between the above mentioned locations to effectively create an emitter with an intermediate pressure-reducing flow channel length that operates with a fluid flow rate somewhere between the above-mentioned flow rates (e.g., 2 GPH). The outlet opening may be formed in the drip line tubing before or after the emitter is bonded to the inner surface of the tubing, however, in a preferred form the opening will be formed after the emitter is bonded to the inner surface of the tubing. The opening is typically formed via a die, press, awl or the like. Thus, adjustments to the location of where the outlet opening can be made by adjusting where this puncture occurs in the tubing.

In addition, in some forms color may be added to the individual emitters and/or the drip line and methods of manufacturing same to distinguish these products or product lines from one another or to signify something relating to the items intended use or application. For example, one color may be used to identify an emitter or dip line that drips at a rate of one gallon per hour (1 GPH), another color may be used to identify an emitter or drip line that drips at a rate of two gallons per hour (2 GPH), another color may be used to identify an emitter or drip line that drips at four gallons per hour (4 GPH). In one form, emitters of different flow rates are distinguished by color so that workers can more easily determine which emitters are to be inserted into extruded tubing during assembly in order to obtain a drip line with common emitter drip rates. In another form, the extruded tubing may be made in a specific color or have a marking of a specific color to designate the flow rate of the drip emitters located therein in order to help workers and/or end users distinguish drip lines of different drip rates. In still other forms, both the emitters and the tubing may include color to specify the drip rate or intended application, in other forms, colors may be used to signify the source of fluid to be used with the emitter or drip line or the particular application for which the emitter or drip line is to be used. For example, the color purple is often used to indicate that reclaimed or recycled water is being used. Thus, the emitter or drip line could be marked with this color to indicate that the emitter or drip line is intended for these types of applications or to indicate the type of fluid that is suppose to travel through these types of emitters/drip lines. If desired, any of the embodiments and methods disclosed herein could include the addition of color for such purposes.

Turning back to the embodiment of FIG. 4, it should be appreciated that in this form, the emitter 310 includes a baffle design having teeth extending from the sides of the emitter body 320 toward one another to form the tortuous flow passage 350 without a central baffle portion. The height of each tooth is higher at the sides of the emitter body 320 than at the distal end of each tooth and, as fluid pressure increases, the floor 361 of flow channel 350 moves up toward the inner surface of the tube 370 causing the portions of the teeth closest to the sides of the emitter body 320 to close against (e.g., touch, engage, etc.) the inner surface of the tube 370 first, before gradually closing more and more of each tooth against the inner surface of tube 370 simultaneously until the floor 361 cannot move any further. Thus, rather than closing the baffle teeth consecutively or sequentially against the inner surface of tube 370 to lengthen the pressure-reducing flow passage 350 and compensate for the increase in pressure, this configuration allows each tooth to gradually close against the inner surface of tube 370 simultaneously in response to increases in line pressure thereby lengthening the pressure-reducing flow passage 350 and reducing the cross-section of the pressure-reducing flow channel 350 to form a pressure compensating mechanism 360 that compensates for increases and decreases in line pressure. For convenience, only a portion of tube 370 is illustrated in FIG. 4 so that a portion of the emitter body 320 remains visible, however, it should be understood that the tube 370 would extend over the entire emitter body 320 and that the emitter body 320 would be bonded to the inner surface of the tube in a manner similar to that discussed above.

In the form illustrated, fluid flowing through the drip line 370 enters the emitter 310 via inlet openings 330, travels through the tortuous passage 350 and then exits the emitter 310 via outlet opening 371. The pressure compensating mechanism 360 reduces the cross-section of the flow channel 350 by raising the floor 361 of flow channel 350 and pressing more of the upper surfaces of the baffle teeth into engagement with the inside surface of the tubing 370 as fluid pressure increases, and increases the cross-section of the flow channel 350 by allowing the floor 361 of flow channel 350 to move away from the inner surface of tubing 370 as fluid pressure decreases. This configuration also provides a large central flow path down the middle of the pressure-reducing flow channel 350 which allows for easier processing of grit or other particulates, particularly at start-up and shutdown of fluid flow due to the low pressures associated with same and due to the fact the portion of the flow channel 350 with the largest cross-sectional area will always remain in the middle of the emitter 310 and, specifically, at the longitudinal axis of the flow channel 350.

FIGS. 5A-B are perspective views of an alternate drip emitter and drip line embodying features of the present invention wherein the pressure-reducing flow channel is made-up of baffles with flexible teeth that move in response to fluid flow through the emitter body. In keeping with above practices, items that are common to those discussed above will use the same two digit reference numeral but with the addition of the prefix "4" to distinguish one embodiment from another. In the form illustrated, only a portion of the tube 470 is illustrated in FIG. 5A so that the details of emitter body 420 may be seen, however, it should be understood that the entire emitter body 420 would be inserted within the tube 470 and connected to an inner surface of tube 470.

The emitter 410 includes a plurality of flexible baffle walls extending from opposite sides of the emitter body 420 toward one another and in a staggered arrangement so one wall is not directly opposite a wall on the other side of the emitter body 420. In the form illustrated, the baffle walls form flexible teeth that are much narrower than those discussed above and form generally rectangular walls connected at their base to the floor 461 of the pressure-reducing flow channel 450 and on one side to the side of the emitter body 420. Thus, when fluid flows through the supply line 470, at least a portion of the fluid flows through the inlet opening 430, through the tortuous passage 450 defined by the baffle walls 452, to the outlet 440 and through outlet opening 471. As the supply line fluid pressure increases, the floor of the flow channel 461 moves toward the inner surface of tube 470 driving the tops of the baffle walls into engagement with the inner surface of the supply line tubing 470 and, thereby, restricting or reducing the cross-sectional area of the flow channel 450 and/or increasing the length of the flow channel 450 in response to the increase in pressure in order to compensate for the supply line fluid pressure increase. As the fluid pressure in the supply line continues to increase, the baffle walls 452 closest to inlet 430 flex or bend over in the direction of the fluid flow. This occurs because the pressure of the fluid is always greater than the pressure of the floor 461 raising the baffle walls 452 into engagement with the inner surface of the tube 470. As fluid pressure increases further within tube 470, more and more of the flexible baffle walls 452 will flex or bend in the direction of the fluid flow which can also help the emitter process obstructions such as grit or other particulates by allowing the baffle walls to bend so that the obstructions can be carried through the flow channel and out of the emitter 410. Conversely, when fluid pressure decreases in the supply line 470, the baffle walls cease bending and return to their normal positions (e.g., as illustrated in FIG. 5A) and the floor 461 lowers, allowing the walls 452 to move away from the inner surface of tube 470 and thereby increasing the cross-sectional area of the flow path 450 and/or reducing the length of the flow channel 450 to account for the decrease in fluid pressure. In this way, emitter 410 is equipped with a pressure compensating mechanism 460 like some of the other embodiments discussed herein.

Although the embodiment illustrated shows circular inlets and outlet openings 430 and 471, it should be understood that in alternate embodiments these inlet and outlet openings may take on a variety of different shapes and sizes. In addition, in alternate forms the emitter body 420 may be designed with larger pools or baths located at the inlet 430 and outlet 440 (like the embodiment of FIGS. 1A-H), instead of directly transitioning to the tortuous flow passage 450 as illustrated in FIGS. 5A-B. Furthermore, the flexible baffle walls 452 disclosed in this embodiment could easily be used in any of the other embodiments disclosed herein, just like any of the features of the various embodiments discussed herein could be mixed and matched together to form another embodiment regardless of which embodiment the specific feature is currently illustrated in. Thus, in one form, the flexible teeth 452 may be used in an embodiment more like that shown in FIGS. 1A-H (e.g., with a U-shaped tortuous passage). In still other forms, the flexible teeth 452 may be attached to the emitter body 420 in such a way as to be predisposed to flex or bend in a preferred direction. For example, rather than having the flexible teeth 452 bend in the same direction the fluid flows through the emitter 410, the teeth 452 could be predisposed with an angle causing the teeth 452 to bend in a direction opposite the fluid flow in order to cause more turbulence and interference with the fluid flowing through the emitter 410. As mentioned above, however, in a preferred form of the embodiment of FIGS. 5A-B, the baffle walls 452 will bend in the same direction as the fluid flow.

Yet another embodiment of an alternate drip emitter and drip line in accordance with the invention is illustrated in FIGS. 6A-D. As with the other embodiments discussed herein, this embodiment will use the same two digit reference numeral to refer to items similar to those discussed above, but will include the prefix "5" to distinguish one embodiment from the others. Thus, in the form illustrated in FIGS. 6A-D, the emitter 510 includes an emitter body 520 having an inlet 530, outlet 540 and tortuous flow path 550 extending therebetween; however, unlike the previous embodiments discussed herein, the baffle walls 552 include at least one hollow portion which fills with fluid as the supply line fluid pressure increases in order to reduce the cross-sectional area and/or increase the length of the flow channel 550 to compensate for an increase in fluid pressure.

More particularly, in the form illustrated in FIGS. 6A-D, the teeth 552 of the baffle walls are hollowed-out or define an opening or void 554 in order to allow supply line fluid to fill the void 554 of the hollow teeth 552 (or the space 554 defined by each hollow tooth) and, as supply line fluid pressure increases, to swell or enlarge the size of each tooth 552 by filling this void with pressurized fluid and thereby causing the size of the teeth to grow/expand and reduce the cross-sectional area of the flow channel 550 to compensate for the increase in the fluid pressure. A view of the bottom of emitter body 520 (which is the side of the emitter facing the fluid flowing through supply line 570) is illustrated in FIG. 6D showing the void 554 and illustrating how some of the supply line fluid is able to flow along the bottom surface of the emitter body 520, fill the voids 554 of the hollow teeth, enter the inlet 530 of the emitter and/or continue flowing down the supply line 570.

As fluid pressure increases, the floor of the emitter 561 will also move upwards and, thus, the upper surfaces of the baffle walls 552 will gradually engage more and more of the inner surface of tube 570 thereby increasing the length of the tortuous passage 550 that the fluid must flow through in order to compensate for the increase in fluid pressure. Conversely, when fluid pressure decreases, the floor 561 will drop, gradually disengaging the baffle walls 552 from the inner surface of the tube 570 and the teeth 552 will shrink or reduce in size to effectively increase the cross-sectional area of the flow path 550 and reduce the length of the tortuous passage that the fluid must flow through to compensate for the reduction in fluid pressure. Thus, like the previous embodiments discussed herein, the emitter 510 is equipped with both a pressure-reducing flow path 550 and a pressure compensating mechanism 560 for ensuring that each emitter operates uniformly and as desired.

In FIG. 6A, the supply line fluid pressure is low and, thus, the teeth of baffle walls 552 are not enlarged and the upper surfaces of the baffle walls are not fully engaged with the inner surface of the supply line tube 570. This reduces the length of the flow channel 550 that the fluid must flow through and allows for the flow channel 550 to have a maximum cross-sectional area. In FIG. 6B, the supply line fluid pressure has increased some to a generally intermediate level of pressure such that the teeth of baffle walls 552 have enlarged a bit and the upper surfaces of the baffle walls nearest the side of emitter body 520 begin to engage the inner surface of supply line tube 570. This increases the length of the flow channel 550 that the fluid must flow through and reduces the cross-sectional area of the flow channel 550 to account for or compensate for the increase in fluid pressure. In FIG. 6C, the supply line fluid pressure has increased further to a high level of pressure such that the teeth of the baffle walls 552 have grown or enlarged to their maximum size (or close to their maximum size) and the upper surfaces of the baffles fully engage the inner surface of the supply line tube 570. This further increases the length of the flow channel 550 that the fluid must flow through (thereby maximizing the amount of pressure-reduction taking place via flow channel 550) and reduces the cross-sectional area of the flow channel 550 to its smallest cross-sectional area to compensate for the increase in fluid pressure. In addition, the baffle teeth 552 in FIG. 6C are shown tipping or bending in the direction of the fluid flow (similar to that shown with respect to the embodiment of FIGS. 5A-B). Thus, with this configuration, the pressure-reducing flow channel has a first cross-sectional area at lower fluid pressures, a second cross-sectional area, smaller than the first, at higher fluid pressures to compensate for the increase in fluid pressure so that the emitter and drip line trickle fluid at a generally constant or desired rate, and a plurality of gradually decreasing cross-sectional areas as the fluid pressure increases from the pressure that exists at the first cross-sectional area to the pressure at the second cross-sectional area.

FIGS. 6B-C are perspective views of a portion of the flow channel of FIG. 6A illustrating the hollow teeth of the baffle partially enlarged and fully enlarged, respectively, in response to increasing fluid pressure showing how the cross-sectional area of the pressure-reducing flow channel in FIG. 6B has a smaller cross-sectional area than that illustrated in FIG. 6A due to an increase in fluid pressure and showing how the cross-sectional area of the pressure-reducing flow channel of FIG. 6C is even smaller than that illustrated in FIG. 6B due to a further increase in fluid pressure.

Another emitter embodying features of the present invention is shown in FIGS. 7A-I. In keeping with the above practices, this embodiment will use the same latter two-digit reference numerals to describe items that are similar to those discussed above, but will include the prefix "6" merely to distinguish one embodiment from another (e.g., emitter body will be referenced as 620 indicating it is similar to prior emitter bodies 520, 420, 320, 220, 120 and 20).

In this embodiment, the emitter 620 is made of an elastomeric material and defines a single pressure reducing flow channel or passage 650 laid out in a generally straight pattern like those illustrated in FIGS. 4-6D above, rather than a curved or U-shaped pattern like those illustrated in FIGS. 1A-3G. The flow channel 650 has a plurality of teeth extending from outer baffle walls 552 that move in response to changes in fluid pressure in order to provide a pressure compensating emitter. In this particular embodiment, however, the unitary emitter body 620 defines first and second outer baffle walls 652a, 652c that are interconnected via hinge or joint 652e. The baffles of first wall 652a extend into the flow path via teeth 652b and the baffles of wall 652c extend out into the flow path via teeth 652d. When fluid pressure increases, the walls 652a, 652c and their respective teeth 652b, 652d are moved from a first or static position wherein the walls and teeth are spaced apart from one another to a second, higher or high pressure position wherein the walls and teeth are squeezed closer together to one another thereby reducing the cross-section of the fluid passage 650 and restricting the amount of fluid that is allowed to flow through emitter 620 and reducing the flow rate of same. In this way, the entire fluid passage 650 is capable of serving as the pressure compensating member 660.

More particularly and as best shown in FIGS. 7B, 7C-E, 7G and 7I, the unitary emitter body 620 defines an inlet 630, outlet 640 and having first wall 652a and second wall 652c between the inlet 630 and the outlet 640. The first and second walls 652a, 652c define a pressure reduction or reducing flow channel 650 and having interconnecting member or interconnection 650e between one another. In this way, emitter 620 operates similar to emitter 520 (FIGS. 6A-D) in that increases in fluid pressure result in lateral or sideways movement or growth of teeth 652b, 652d to reduce the size of the flow path 650 and, in particular, the effective cross-section of the flow passage 650.

Figure 7H:
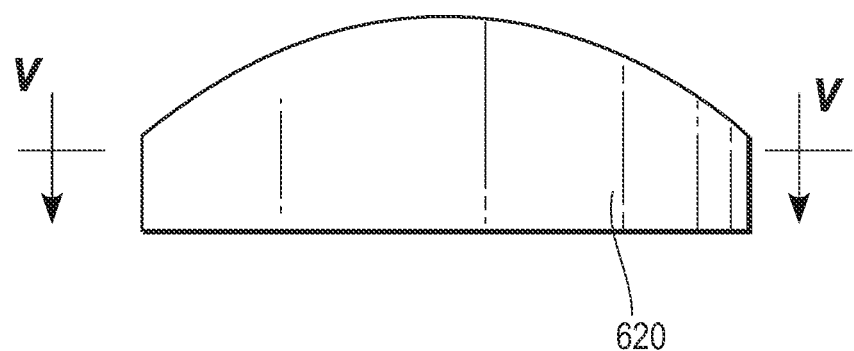
FIGS. 7H-I are front elevation and front cross-sectional views, respectively, illustrating the emitter body shape and shape of the first and second walls and the interconnection therebetween, the cross-section being taken along lines iv-iv in FIG. 7F.
Figure 7I:
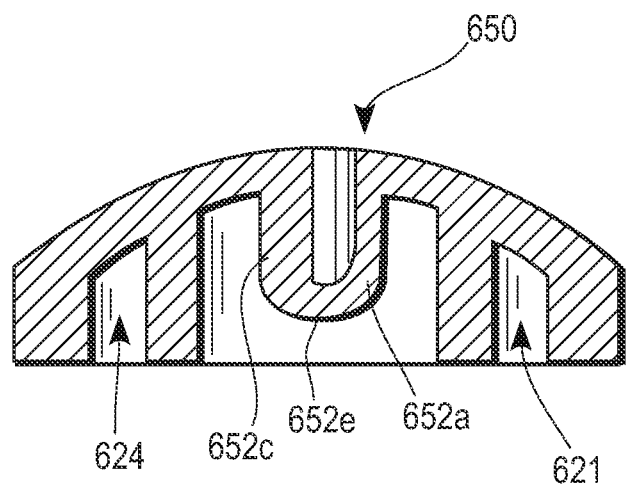
Figure 8F:
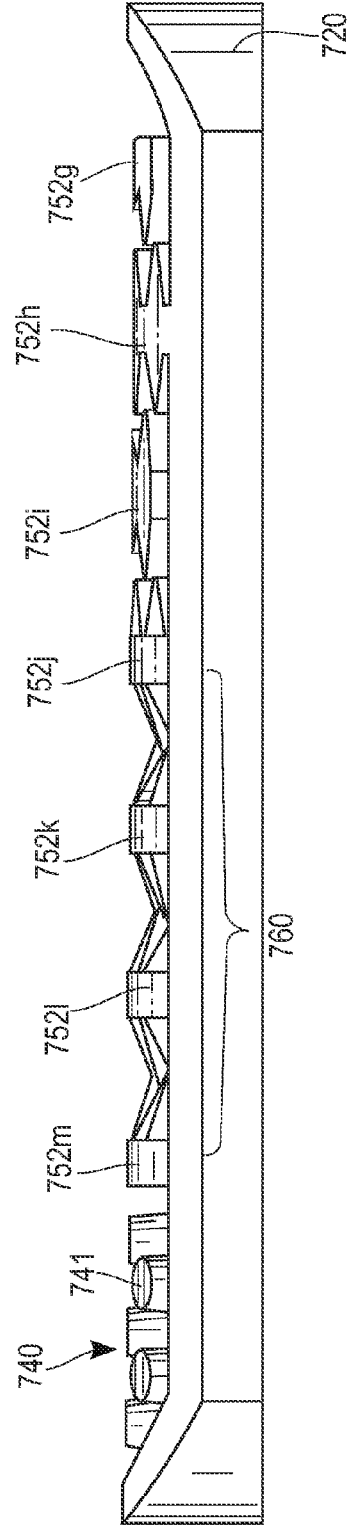
FIGS. 8F-G are side elevation and side cross-sectional views, respectively, of the emitter of FIGS. 8A-E, the cross-section being taken along line in FIG. 8C.
Figure 8G:
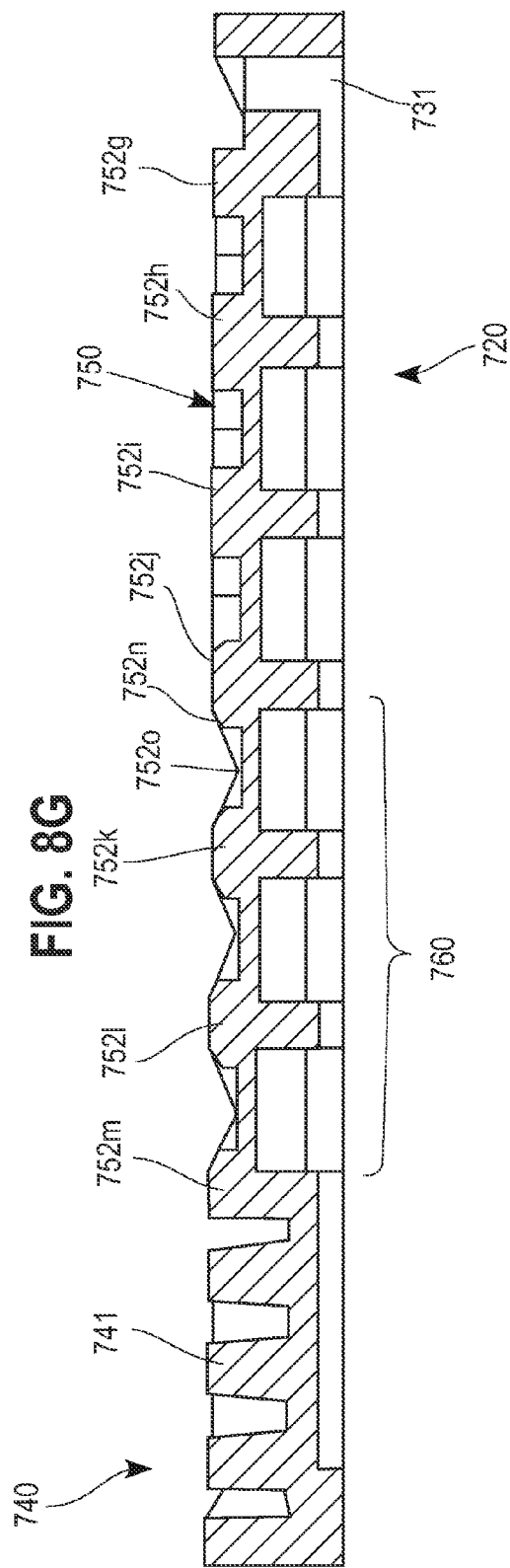

In the form illustrated in FIGS. 7E and 7I, the side walls 652a, 652c and interconnecting member 652e form an arcuate cross-sectional shape (e.g., a generally U-shape) extending down from the top of emitter 620 and running along the longitudinal axis of the emitter 620. In addition and as best illustrated in FIGS. 7D and 7E, the flow channel or passage 650 further increases in height from the inlet side or end 630 of the emitter 620 to an intermediate point of the emitter 620, but then decreases in height from the intermediate point of the emitter 620 to the outlet end 640 of the emitter 620. More particularly, the walls 652a, 652c increase in height from the inlet end of the emitter 630 to the general middle or center of the emitter 620 and then decrease in height from the middle/center of emitter 620 to the outlet portion 640 of emitter 620. Thus, the pressure reducing channel 650 has a varying cross-sectional area along its longitudinal axis and the maximum cross-sectional area of the flow channel 650 is in the intermediate portion of the flow channel 650.

In a preferred form, the alternating series of baffles 652b, 652d extending from first and second walls 652a, 652c vary in length or height in a manner corresponding with the varying length or height of walls 652a, 652c giving the first and second walls a cross-section that appears as an oval at certain planes as illustrated in FIG. 7D. This configuration means that the intermediate portion 650f of the flow channel 650 will have the maximum length or height for baffles 652b, 652d and that this portion of the flow channel 650 will be affected first in relation to fluid pressure increases due to it offering more surface area than other portions of the flow channel 650. Thus, the flow channel 650 will be squeezed or pinched in the intermediate area 650f of the emitter first, before elsewhere along the flow channel (e.g., before the portions at or near the input and output ends 630, 640).

As best illustrated in FIGS. 7C and 7D, the baffles 652b, 652d are preferably tooth shaped, having the edges of the baffles 652b for the first wall 652a overlap with the edges of baffles 652d for the second wall 652c. In the form illustrated, the overlap is approximately twenty-thousandths of an inch (0.020") with the teeth 652b, 652d varying in length or height from thirty-thousandths of an inch (0.030") to one hundred-thousandths of an inch (0.100") and having a maximum flow gap when the first and second walls 652a, 652c are in their static or non-moved position of thirty-thousandths of an inch (0.030") (the bridge gap between first and second walls 652a, 652c being approximately fifty-thousandths of an inch (0.050"). It should be understood, however, that in alternate embodiments these dimensions may be changed and instead of having an overlap between teeth 652b, 652d, a gap may be maintained to assist with flushing the emitter 650 of obstructions such as grit as discussed above).

Another difference with respect to emitter 620 of FIGS. 7A-I and prior embodiments is that the emitter 620 defines an outlet bath 640 that has projections such as walls or posts/stanchions 641 to prevent the outlet pool 640 from collapsing under increases in fluid pressure. In this way, these structures 641 are similar to the nubs discussed above (e.g., 41, 141 and 241), however, they connect to the outer wall of the emitter 620, the wall that defines the bath 640, rather than rising up from the surface of the floor of the outlet 640.

As with earlier embodiments, the emitter 620 has a top surface that is capable of being attached to the inside surface of a conduit (not show) at predetermined intervals thereof in order to form a drip line using said emitter. Unlike prior embodiments which used guide ribs (e.g., 25-29), the emitter body 620 uses guide recesses or slots 621 and 624 for aligning the emitter 620 and inserting same into the conduit during constructions, preferably as the conduit is extruded. The inlet 630 also preferably has a recessed opening or inlet, such as channel 631 which helps to prevent large obstructions from entering into the emitter 620 during operation within a fluid-filled drip line.

Turning now to FIGS. 8A-G, in which there is illustrated yet another emitter embodying features of the present invention, this emitter defines a series of rows of baffles transverse to the longitudinal axis of the emitter and extending into the pressure reduction flow path, with a portion of the baffles varying in height to create a structure that compensates for pressure. In keeping with the above, items that are similar to those discussed in earlier embodiments will be referenced using the same last two-digit identifier, but using the prefix "7" to distinguish one embodiment from others. Thus, in the form illustrated, the emitter body is referenced by reference numeral 720.

In the form illustrated in FIGS. 8A-G, the unitary emitter body 720 is made of an elastomeric material and defines a single pressure reducing flow channel or passage 750 laid out in a generally serpentine pattern. The body 720 has a longitudinal axis and defines an inlet 730 and outlet 740 in addition to the pressure reduction flow path 750 which connects both the inlet 730 and outlet 740. The body 720 has a series of rows of baffles 752g-m, extending transverse to the longitudinal axis of the emitter 720 and into the pressure reduction flow path 750. A first series of baffles, 752g, 752h and 752i have constant height, whereas, a second series of baffles, 752j, 752k, 752l and 752m vary in height. The baffles having a varying height, 752j-752m, have a static or normal position and a pressurized elevated position (or elevated pressure position).

In the embodiment depicted, the baffles are shaped in the form of teeth positioned about a wall wherein each varying height baffle tooth has a base 752n and a distal or terminal end 752o with the varying height being at a maximum height at the base 752n and at a minimum height at the distal or terminal end 752o. The baffle teeth are staggered or positioned to alternate with one another so that the teeth align opposite gaps between teeth members on the opposite wall defining the fluid flow passage 750.

In FIGS. 8A-G, at least two rows of the series of baffles (e.g., 752k, 752l) include varying height teeth members. An additional two rows of the series of baffles (e.g., 752j, 752m) include varying height teeth members on one side of the baffle. Baffle row 752j includes teeth of continuous height extending from one side of the row (e.g., the side facing the inlet 730) and teeth of varying height on the opposite side of the row (e.g., the side facing outlet 740). Baffle rows 752h and 752i having continuous height (including all teeth). Baffle rows 752g and 752m have teeth extending from only one side of their respective row, with the baffle row 752g being of continuous height and baffle row 752m being of varying height. Thus, with this configuration, the baffles with varying height 752j-m server as the pressure compensating member 760 for emitter 720.

Thus, when a plurality of emitters 720 are installed in a conduit to form a drip line, fluid will flow through the conduit, into the inlet of the drip emitter 720 and through pressure reducing flow passage 750. As fluid pressure increases in the conduit, the passage floor of passage 750 will push up into the flow passage 750 in at least the areas where baffles of varying height are provided (e.g., compensation portion 760) due to the spacing that exists and allows for baffle movement. This will cause the baffle teeth to move to their elevated pressure position, preferably forcing their upper surfaces to engage the inside surface of the conduit (or approaching such engagement), thereby, reducing the cross-section of the flow passage 750 in this area and restricting the amount of fluid that can flow through this region in order to compensate for the fluid pressure increase. In this way, the emitter operates similar to the emitter embodiments discussed above with respect to FIGS. 1A-I and 2A-F.

Although the embodiment depicted in FIGS. 8A-G shows specific series of baffles having continuous height and varying height, it should be understood that in alternate embodiments more or less of the baffles 752g-m may have varying heights. In fact, in some forms all of the baffles may be provided in constant height (for example, in situations where no pressure compensation feature is required or desired for the emitter). Alternatively, in other embodiments all of the baffles may have some form of varying height component.

In FIGS. 8A-G, the emitter 720 preferably includes a guide recess, such as channel 721, which serves the dual role of helping position or align the emitter 720 for insertion into the conduit and helps recess the inlet 730 of emitter 720 into a recessed opening 731 which helps block larger obstructions From entering into the emitter 720 or at least blocking all flow of fluid into the inlet 730.

The emitter body 720 further defines an outlet bath 740 and the pressure reduction flow path 750 includes an outlet end at the outlet bath. In a preferred form, the unitary emitter body 720 will include at least one projection 741 in the outlet bath 740 to prevent the outlet bath from collapsing under increased fluid pressure. In the form illustrated a plurality of projections or nubs 741 extend up from the floor of the outlet 740 to prevent collapse of the bath 740. Additional rectangular notches or voids are illustrated in FIG. 8E which show how the emitter body 720 may be designed to use less elastomeric material, which not only will have a material cost savings, but also will reduce the amount of time it takes to manufacture the emitter 720 and may potentially improve the operation of the pressure compensating portion 760 of the emitter 720 due to the fact thinner portions of elastomeric material will be more responsive to pressure increases than larger portions of elastomeric material.

Figure 9B:
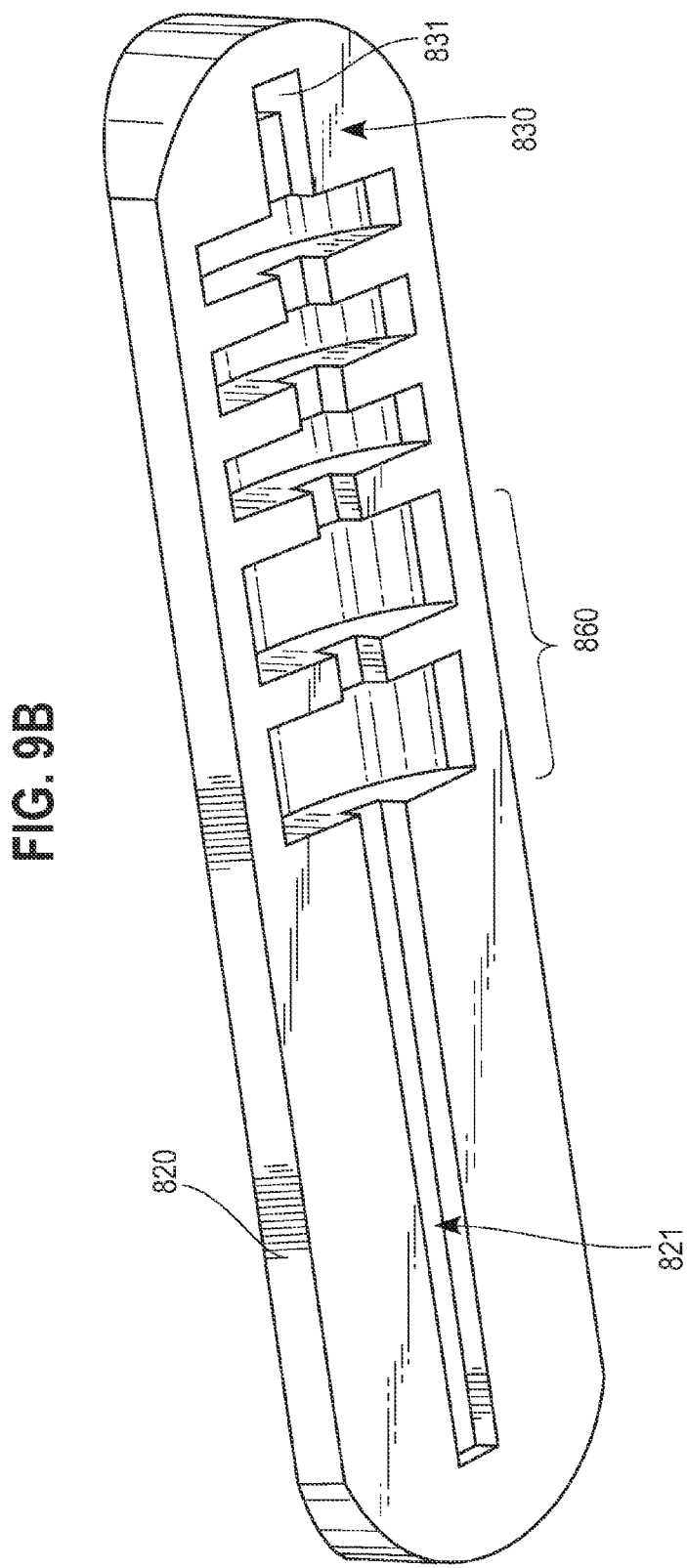

Turning now to FIGS. 9A-B, there is illustrated yet another emitter embodying features of the present invention wherein a unitary emitter body defines a series of rows of baffles transverse to the longitudinal axis of the emitter and extending into the pressure reduction flow path, and a plurality of outlet baths with at least a portion of outlet baths being movable between first and second positions, the second position being more constrictive for fluid flow than the first position. In keeping with the above, portions of this embodiment that are similar to those discussed above will use the same last two-digit reference numerals as those discussed above, but using the prefix "8" simply to distinguish one embodiment from the others. Thus, in FIGS. 9A-B, the emitter body will be referred to as body 820.

In the form illustrated in FIGS. 9A-B, the unitary emitter body 820 is made of an elastomeric material and has a longitudinal axis. The body 820 further defines a pressure reduction flow path 850 and an inlet 830 to the pressure reduction flow path 850. The body 820 includes a series of rows of baffles 852g, 852h, 852i and 852j, which are positioned transverse to the longitudinal axis of the emitter 820 and extend into the pressure reduction flow passage 850 to form a tortuous passage that is further laid out in a serpentine manner. In addition, however, the emitter body 820 further defines a plurality of outlet baths. In the form illustrated, the body 820 defines a first outlet bath 842, a second outlet bath 843 and a third outlet bath 844. The pressure reduction flow passage 850 includes an outlet end that opens to the first outlet bath 842, and a first passage 845 extends between the first and second outlet baths 842, 843. In a preferred form, at least a portion of the first outlet bath or first passage have a first position and a second position, the second position being more constrictive to fluid flow than the first position.

More particularly, in the form shown, first passage 845 is defined by wall member 847 and moves between a first non-pressurized position wherein the passage remains in its normal state and the cross-section of the passage 845 is at its initial size, and a second pressurized position wherein the first passage is elevated or moved toward the inner conduit surface to which the emitter is mounted thereby decreasing the cross-section of the first passage 845 to form a more constrictive passageway and compensate for the fluid pressure increase experienced by the emitter 820. The first passage 845 is in the shape of a notch, however, it should be understood that various different size notches or grooves could be used as desired while still maintaining the pressure compensation capabilities discussed above. One advantage to smaller configurations, however, is that a small surface area is being used to accomplish the pressure compensation and, thus, the pressure compensation member can be controlled more easily and can be produced in a way that yields more consistent results emitter to emitter.

In alternate embodiments, it should be understood that the floor of the first outlet bath 842 may alternatively be made movable rather than first passage 845. For example, the floor of first outlet bath 842 may be configured to move between a first non-pressurized position wherein the floor remains in its normal state and the cross-section of the bath opening formed by first bath 842 is at its initial size, and a second pressurized position wherein at least a portion of the floor is pushed or extended into the first bath 842 via increased fluid pressure within the conduit to which the emitter 820 is mounted thereby decreasing the cross-section of the bath opening formed by first bath 842 to compensate for this fluid pressure increase. In still other embodiments, both the first passage 845 and first outlet bath 842 may be movable between such positions. However, as mentioned above, in a preferred form only the first passage 845 will be designed to move in such a way because the movement of such a small surface is easier to control and produce repeatable results from emitter to emitter.

Turning back to FIGS. 9A-B, the emitter 820 further defines a third outlet bath 844 and a second passage 846 extending between the second outlet bath 843 and the third outlet bath 844. The second passage 846 is defined by wall members 848a, 848b and differs in shape from that of first passage 845. In a preferred form, neither the second outlet bath 843 nor second passage 846 are setup to compensate for pressure and fluid flowing through the second outlet bath 843 is simply allowed to pass through to the third outlet bath 844. The conduit to which the emitter 820 is connected will define an outlet opening like drip line outlet opening 71 (mentioned with respect to FIG. 1 above) and this opening may be positioned above either the second or third outlet baths 843, 844. In alternate embodiments, it should be understood that if the desired flow rate may be accomplished through the first passage 845, the emitter 820 may be designed with only one additional outlet bath which may either result in combining the second and third outlet baths 843, 844 to provide only a second outlet bath, or result in the manufacturer being able to reduce the size of the emitter to terminate after the second outlet bath 843.

In yet other embodiments it should be understood that at least a portion of the second outlet bath 843 or second passage 846 may also be configured to move between a third position and a fourth position, the fourth position being more constrictive to fluid flow than the third position in order to further compensate for fluid pressure changes if desired. For example, in the form illustrated, the floor of the second bath 843 could be made movable between a third non-pressurized position wherein the floor remains in its normal state and the cross-section of the bath opening formed by second bath 843 remains at an initial size, and a fourth pressurized position wherein at least a portion of the floor is pushed or extended into the second bath 843 via increased fluid pressure within the conduit to which the emitter 820 is mounted thereby decreasing the cross-section of the bath opening formed by second bath 844 to compensate for this fluid pressure increase. Alternatively, the second passage 846 between the second and third outlet baths 843, 844, respectively, could be configured to move so that the cross-section of the passage opening reduces in size when moved from a third position to a fourth position. In still other forms, both the second outlet bath 843 and second passage 846 could be configured to move in response to increases in fluid pressure to compensate for same.

In yet other embodiments and as mentioned with respect to the first passage 845 above, the second passage 846 may be provided in a variety of different shapes and sizes. It is preferred, however, to maintain a smaller size and shape for this passage (if setup to compensate for pressure) so that the passage's operation is easier to control and to reproduce on a repeatable results from emitter to emitter. Alternatively and as mentioned above, no second passage 846 may be provided as the first outlet bath 842 may be configured to outlet fluid directly into the second and final outlet bath.

Turning back to FIGS. 9A-B, the third outlet bath 844 is connected to the second outlet bath 843 via second passage 846 and further includes projections or nubs 841 for preventing the third outlet bath 844 from collapsing in response to fluid pressure increases. As with the embodiment of FIGS. 8A-G, the rows of baffles 825*g-j* of emitter 820 of FIGS. 9A-B are preferably formed with teeth extending from wall members with the teeth being staggered with respect to one another so that the teeth at least partially align with the gaps created between opposing baffle teeth members to form the tortuous pressure reducing flow passage 850 therebetween. Lastly, the emitter 820 preferably includes guide recess 821 for aligning and inserting the emitter 820 into conduit and for creating a recessed inlet 831 that is protected from larger obstructions traveling through the conduit in a manner similar to that discussed above in prior embodiments.

As mentioned above, in alternate embodiments other portions of the first, second and third outlet baths 842, 843 and 844 (including first and second passages 845 and 846) may be configured to move to compensate for fluid pressure changes. In addition, it should be understood that other features of earlier embodiments may be incorporated into the embodiment illustrated in FIGS. 9A-B and vice versa. More particularly, any of the above-mentioned features with respect to the various embodiments discussed herein may be combined or mixed and matched with one another to come-up with alternate embodiments intended to be covered herein.

In addition to the above embodiments, it should be understood that various methods of manufacturing or assembling irrigation drip lines, methods of compensating for pressure in a supply line (e.g., increases or decreases in supply line fluid pressure), methods of manufacturing an emitter and methods of reducing fluid flow pressure are also disclosed herein. For example, a method of assembling an irrigation drip line is disclosed which comprises providing a drip emitter according to any of the above mentioned embodiments where at least one of the inner and outer baffle walls include a tapered baffle wall section, extruding a drip line tube and inserting the provided drip emitter into the drip line tube as it is extruded such that upper surfaces of the emitter other than the tapered baffle wall section are bonded with an inner surface of the extruded drip line tube to form a sealed engagement so that a pressure reduction flow channel is formed between the inlet and outlet area of the emitter. In a preferred form, the upper surfaces of the non-tapered baffle walls are bonded to the inner surface of the extruded drip line tube to form this sealed engagement so that an elongated tortuous passage is formed between the inlet and outlet of the emitter.

In addition to this method, there are disclosed several methods of compensating for pressure in irrigation drip emitters. For example, a method of compensating for pressure in an irrigation drip emitter is disclosed comprising providing a drip emitter according to any of the above-mentioned embodiments wherein the baffle walls have upper surfaces with a first radius of curvature and the inner baffle wall has a first portion of constant height and a second portion of tapering height that is variably movable between a first low pressure position wherein the upper surface of the second portion is not generally level with the upper surface of the first portion and fluid can flow over the upper surface of the second portion at low fluid pressures and a second high pressure position wherein the upper surface of the second portion is level with the upper surface of the first portion such that fluid is prevented from flowing over the upper surface of the second portion and the cross-section of the flow channel is reduced and the extent of the flow channel is effectively lengthened, and moving the second portion of the inner baffle wall between the first low pressure position wherein the upper surface of the second portion is not level with the upper surface of the first portion and fluid can flow over the upper surface of the second portion at low fluid pressures and the second high pressure position wherein the upper surface of the second portion is level with the upper surface of the first portion so that fluid is prevented from flowing over the upper surface of the second portion to reduce the cross-section of the flow channel and effectively lengthen the extent of the flow channel the fluid has to pass through at high fluid pressure in order to compensate for an increase in fluid supply pressure, and moving variably the second portion of the inner baffle wall toward and/or to the second high pressure position to compensate for an increase in fluid pressure and toward and/or to the first low pressure position to compensate for a decrease in fluid supply pressure.

Alternatively, a method of compensating for pressure in an irrigation drip emitter is disclosed which comprises providing a drip emitter according to any of the above-mentioned embodiments wherein the baffle walls have upper surfaces with a first radius of curvature and the inner baffle wall terminates in a first structure and the outer baffle wall includes a second structure that generally corresponds in shape and/or meshes with the first structure and is positioned proximate the first structure, with the first and second structures tapering in height toward one another and being variably movable between a first low pressure position wherein the upper surfaces of the tapered structures are not level with the upper surfaces of the baffle walls and fluid can flow over the tapered structures at low fluid pressure and a second high pressure position wherein the upper surfaces of the tapered structures are level with the upper surfaces of the baffle walls and fluid is prevented from flowing over the tapered structures to reduce the cross-section of the flow channel proximate the first and second structures and effectively lengthen the extent or amount of the flow channel the fluid has to pass through at high fluid pressure, and moving variably the first and second structures toward and/or to the second high pressure position to compensate for an increase in fluid supply pressure and toward and/or to the first low pressure position to compensate for a decrease in fluid supply pressure.

Alternatively, another method of compensating for pressure in an irrigation drip emitter is disclosed comprising providing an irrigation drip emitter according to any of the embodiments disclosed herein, wherein the baffle walls have upper surfaces with a first radius of curvature and the inlet includes a plurality of inlet openings or passages extending from a surface of the body exposed to the pressurized supply fluid to the pressure reducing flow channel, each inlet passage extending through a boss with a terminal end extending progressively further into the pressure reducing flow channel, each of the terminal ends movable variably between an open position wherein the upper surface of the terminal end of the boss is not at the same general level as the baffle walls (or with the upper surfaces of the terminal end and baffle walls not being at a common radius of curvature) so that fluid can continue to flow through the boss and into the flow channel and a closed position wherein the terminal end of the boss is generally level with the upper surfaces of the baffle walls and has a generally common radius of curvature as the first radius of curvature of the baffle walls so that fluid is prevented from flowing through the boss or inlet sleeve and into the flow channel, and moving variably the inlet openings or terminal ends of the bosses toward and/or to the second high pressure closed positions to compensate for a increase in fluid supply pressure and toward and/or to the first low pressure open positions to compensate for a decrease in fluid supply pressure.

In the above examples, it should be clear that movement of the movable walls or structures to compensate for fluid pressure increases and decreases can either be complete movements from a first limit of travel to a second limit of travel (i.e., from a furthest most open position to a furthest most closed position and vice versa), or alternatively, may simply be movements toward one or more of those limits of travel without those limits actually having been reached (i.e., movement toward a furthest most open position to a furthest most closed position and vice versa). In addition, the material chosen for the emitter body (e.g., 20, 120, 220 above), may be selected such that such movement happens at a desired pace. For example, if a quick opening and closing is desired, a material that is more flexible or has a lower Durometer value may be selected. Whereas, if a slower or more gradual opening and closing (or transitioning from one or the other) is desired, a material that is less flexible or that has a higher Durometer value may be selected.

There also are disclosed herein various methods for processing grit through an emitter or clearing emitters and/or drip lines of obstructions. For example, one method for processing grit comprises providing an emitter of the type discussed above, adjusting the fluid pressure that the emitter is subjected to in a supply line to alter the size or shape of the flow channel to expel any obstructions clogging the emitter (e.g., obstructions clogging an inlet, flow channel, outlet, etc.). In one form this is done by decreasing the fluid pressure to maximize the cross-sectional area of the flow channel and/or create a central flow channel through which any obstructions such as grit or other particulates may be flushed. In another form this is done by increasing the fluid pressure to cause the baffle walls of the flow channel to deflect, bend or tip so that obstructions can pass through the flow channel or be carried out of the emitter via the high pressure fluid passing therethrough.

Thus it is apparent that there has been provided, in accordance with the invention, an elastomeric emitter and methods relating to same that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fail within the spirit and broad scope of the appended claims.

What is claimed is:

1. A discrete irrigation drip emitter for insertion into a drip line tube capable of carrying pressurized fluid comprising:
   a unitary body of elastomeric material being substantially planar, having a longitudinal axis and defining an inlet, an outlet and a flow path between the inlet and the outlet, the unitary body forming a discrete emitter having an open-face configuration wherein the inlet is positioned on a first side of the unitary body and the flow path and the outlet are positioned on a second side of the unitary body different than the first side, with the flow path being defined at least partially by constant height baffles extending transverse to the longitudinal axis having longitudinally extending teeth and varying height baffles extending transverse to the longitudinal axis; and
   wherein the varying height baffles are configured to deflect to an elevated position to compensate for changes in supply line fluid pressure.

2. An irrigation drip emitter according to claim 1 wherein the flow path includes a first baffle wall and a second baffle wall positioned opposite at least a portion of the first baffle wall to form a tortuous path portion of the flow path, and the varying height baffles deflect between a first position wherein fluid is allowed to flow over a top of the varying height baffles and a second position wherein fluid is restricted from flowing over the top of the varying height baffles thereby effectively constricting the flow path.

3. An irrigation drip emitter according to claim 2 wherein the varying height baffles correspond in shape with one another.

4. An irrigation drip emitter for insertion into a conduit carrying pressurized fluid comprising:
   a unitary body of elastomeric material having a longitudinal axis and defining a pressure control flow path and an inlet to the pressure control flow path;
   the unitary body having a plurality of rows of baffles arranged to form at least a portion of the pressure control flow path in a serpentine pattern, the plurality of rows of baffles extending transversely to the longitudinal axis;
   at least one row of the plurality of rows of baffles including varying height teeth members;
   at least one row of the plurality of rows of baffles including constant height teeth members extending with the longitudinal axis;
   wherein the unitary body forms a discrete emitter having an open-face configuration wherein the inlet is positioned on a first side of the unitary body and the pressure control flow path is positioned on a second side of the unitary body different than the first side; and
   wherein the unitary body is substantially planar.

5. The irrigation drip emitter of claim 4 wherein at least a portion of each of the varying height tooth members are movable between a static position and a pressurized outward position.

6. The irrigation drip emitter of claim 5 wherein each of the varying height tooth members has a base and a terminal end, the varying height of each of the varying height tooth members varying continuously between the base and the terminal end and being at a maximum height at the base and a minimum height at the terminal end.

7. The irrigation drip emitter of claim 6 wherein at least two rows of the plurality of rows of baffles have varying height teeth members.

8. The irrigation drip emitter of claim 4 wherein each row of the plurality of rows of baffles being staggered relative to one another.

9. The irrigation drip emitter of claim 4 wherein the unitary body defines an outlet bath and the pressure control flow path includes an outlet end at the outlet bath.

10. The irrigation drip emitter of claim 9 wherein the unitary body includes at least one projection in the outlet bath.

11. An irrigation drip emitter for insertion into a conduit carrying pressurized fluid comprising:
    a unitary substantially planar body of elastomeric material having a longitudinal axis and defining an inlet, an outlet and a flow path extending between the inlet and outlet, with the inlet positioned upstream of the outlet relative to the longitudinal axis of the unitary body and being located on a first side of the unitary body, and the outlet and flow path being located on a second side of the unitary body opposite the first side and having an open-face configuration;

the unitary body having a plurality of rows of baffles transverse to the longitudinal axis of the unitary body and having fixed height teeth members; and a plurality of movable, varying height teeth members extending with the longitudinal axis of the unitary body and downstream of the plurality of rows of baffles having fixed height teeth members between the plurality of rows of baffles having fixed height teeth members and the outlet and along the longitudinal axis of the unitary body, with the plurality of movable, varying height teeth members being tapered in height in a substantially longitudinal direction and movable between a first position and a second position, the second position constricting the flow path more than the first position.

12. The irrigation drip emitter of claim 11 wherein each tooth member of the plurality of rows of baffles being staggered relative to one another.

13. A drip line comprising:
a tube having an inner surface;
a plurality of unitary, substantially planar bodies of elastomeric material, each unitary body having a longitudinal axis and defining an inlet, an outlet and a flow path between the inlet and the outlet, the unitary bodies each defining a discrete emitter having an open-face configuration wherein the inlet is positioned on a first side of the unitary body and the flow path and outlet are positioned on a second side of the unitary body different than the first side, with the flow path being defined at least partially by baffles with constant height teeth members and baffles with varying height teeth members, the baffles extending transverse the longitudinal axis and the teeth members extending longitudinally;
wherein the varying height teeth members are configured to deflect to an extended position to reduce a cross section of the flow path and constrict the flow path to compensate for changes in supply line fluid pressure.

* * * * *

UNITED STATES PATENT AND TRADEMARK OFFICE
CERTIFICATE OF CORRECTION

PATENT NO. : 9,877,440 B2
APPLICATION NO. : 14/385564
DATED : January 30, 2018
INVENTOR(S) : Mark M. Ensworth et al.

It is certified that error appears in the above-identified patent and that said Letters Patent is hereby corrected as shown below:

In the Claims

Column 30, Line 42, in Claim 5, delete "tooth" and insert --teeth-- therefor.

Column 30, Line 46, in Claim 6, delete "tooth" and insert --teeth-- therefor.

Column 30, Line 47, in Claim 6, delete "tooth" and insert --teeth-- therefor.

Signed and Sealed this
Tenth Day of April, 2018

Andrei Iancu
*Director of the United States Patent and Trademark Office*